Aug. 4, 1953 E. W. GARDINOR ET AL 2,647,581
RECORD CARD PUNCHING MACHINE
Filed July 6, 1949 32 Sheets-Sheet 1

INVENTORS
ELLIOTT W. GARDINOR
ARNOLD B. CROWELL
William Lang
ATTORNEY

INVENTORS
ELLIOTT W. GARDINOR
ARNOLD B. CROWELL
BY
William Lang
ATTORNEY

INVENTORS
ELLIOTT W. GARDINOR
ARNOLD B. CROWELL
BY
ATTORNEY

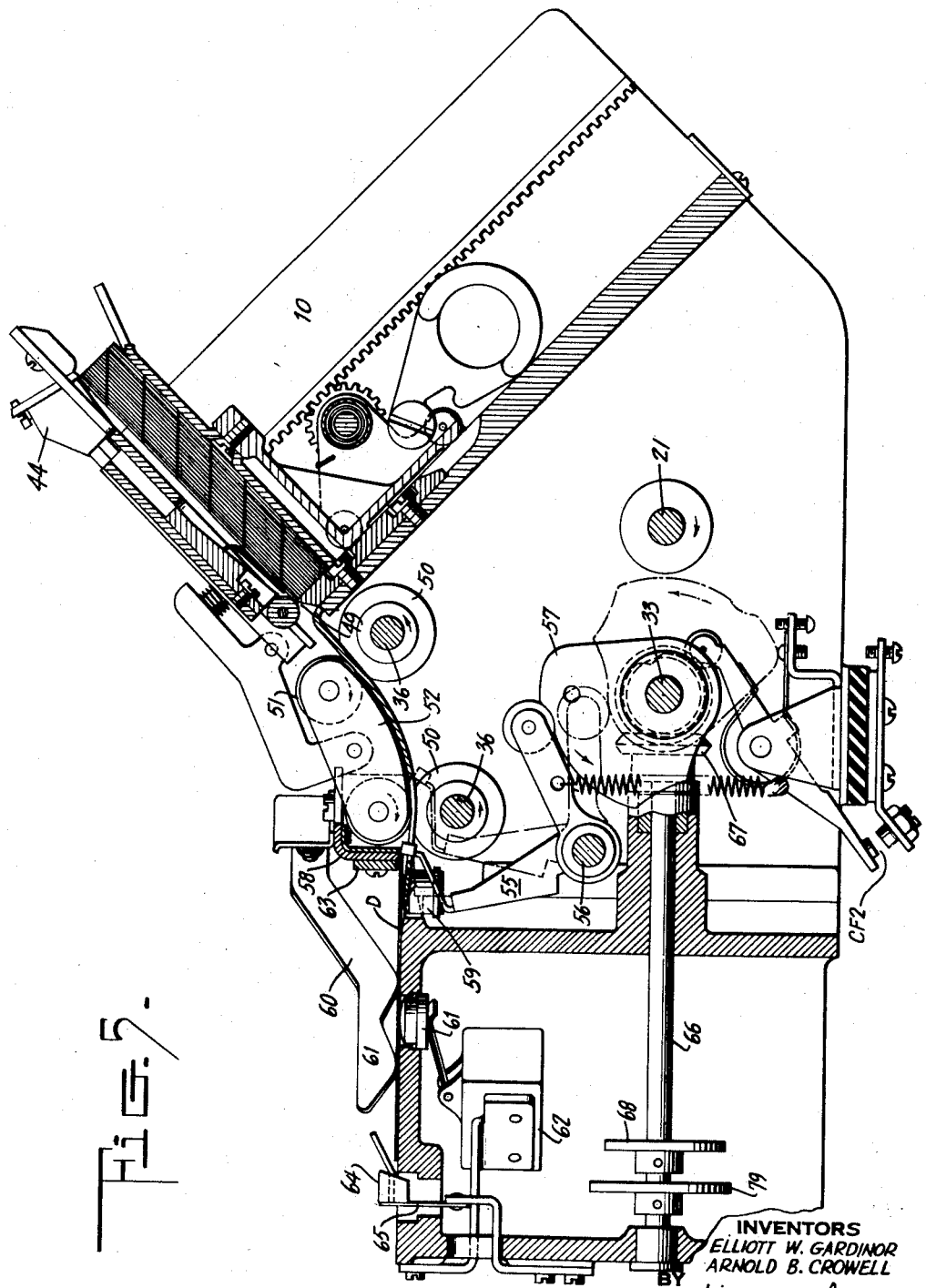

Aug. 4, 1953     E. W. GARDINOR ET AL     2,647,581
RECORD CARD PUNCHING MACHINE
Filed July 6, 1949     32 Sheets-Sheet 5
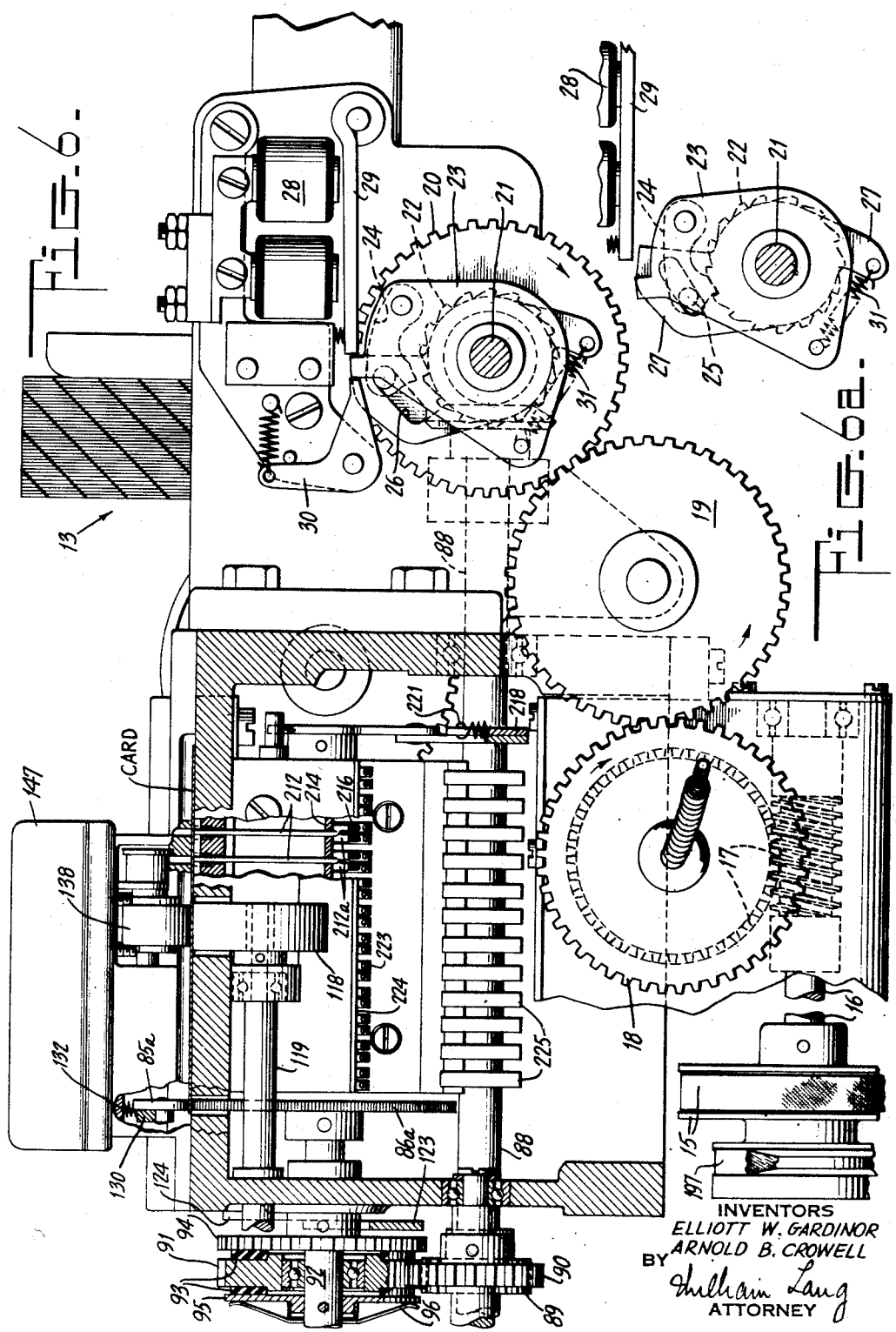
INVENTORS
ELLIOTT W. GARDINOR
ARNOLD B. CROWELL
BY
*William Lang*
ATTORNEY Aug. 4, 1953
E. W. GARDINOR ET AL
2,647,581
RECORD CARD PUNCHING MACHINE
Filed July 6, 1949
32 Sheets-Sheet 6
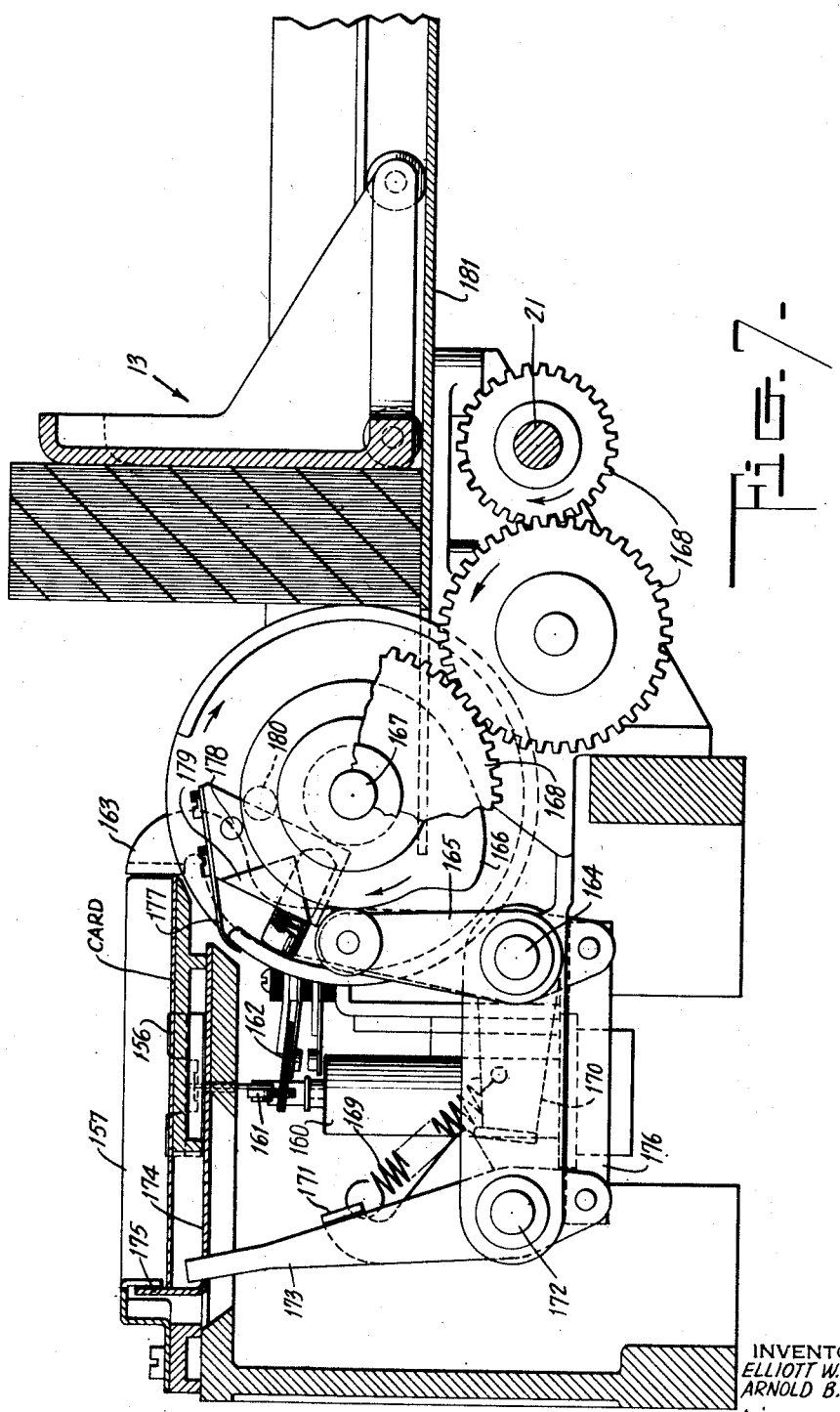
INVENTORS
ELLIOTT W. GARDINOR
ARNOLD B. CROWELL
William Lang
ATTORNEY

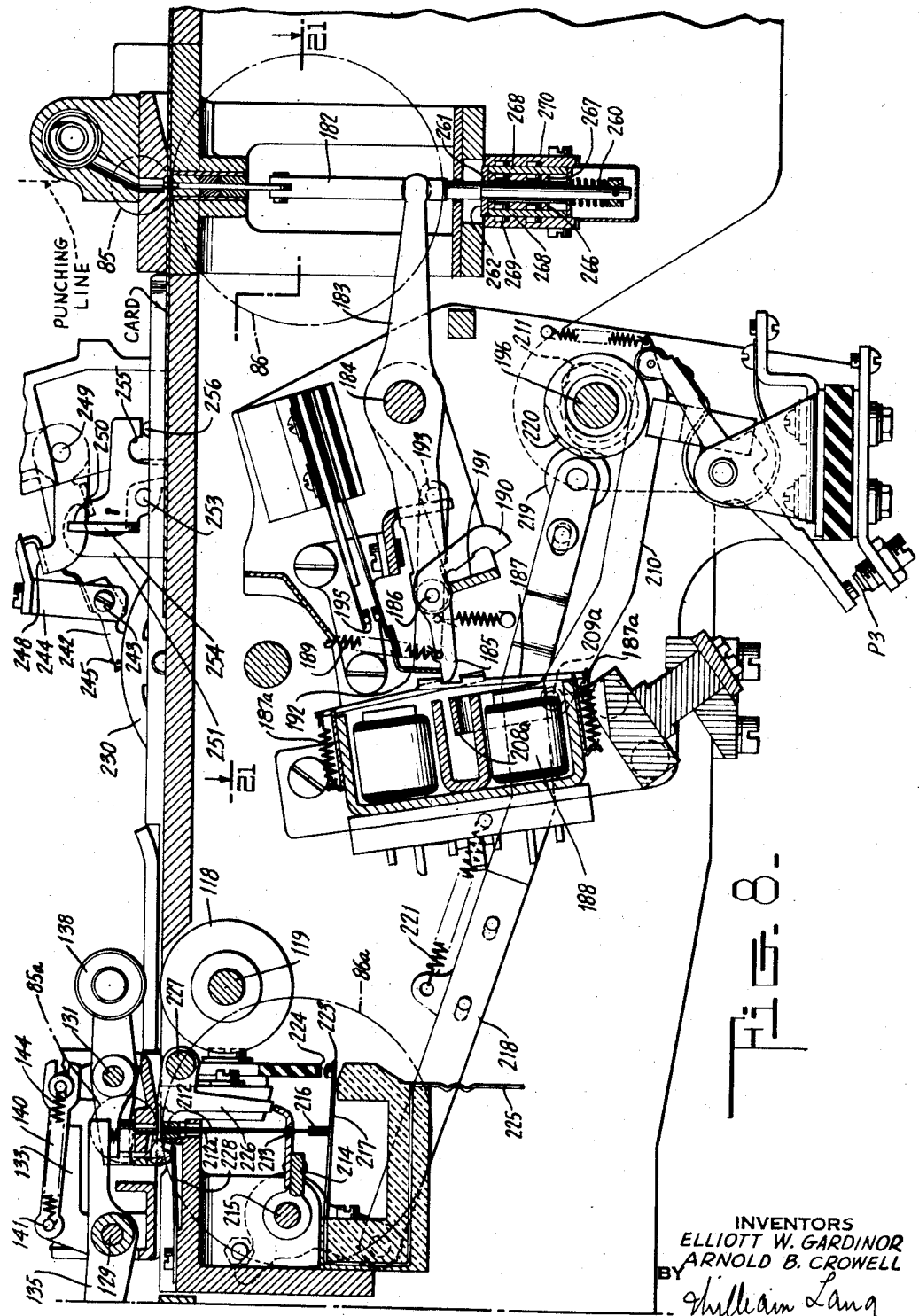

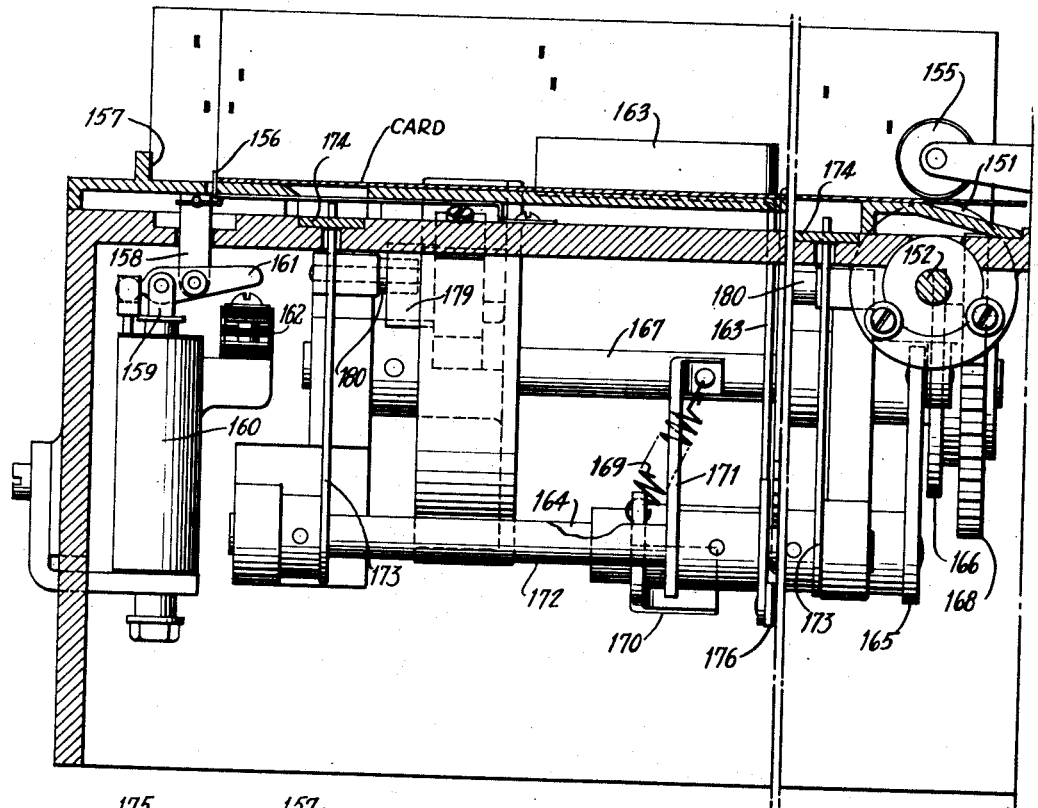
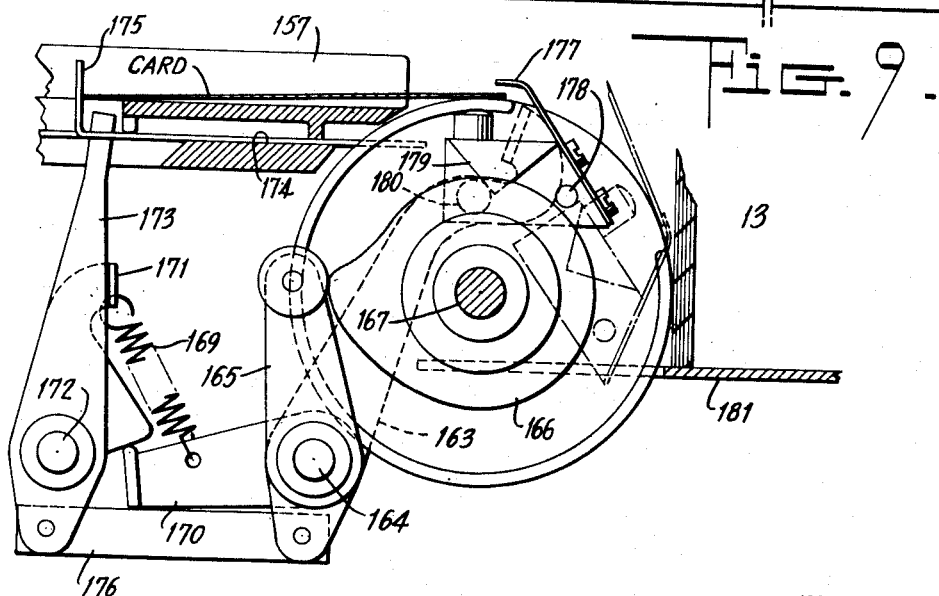
INVENTORS
ELLIOTT W. GARDINOR
ARNOLD B. CROWELL
BY
ATTORNEY

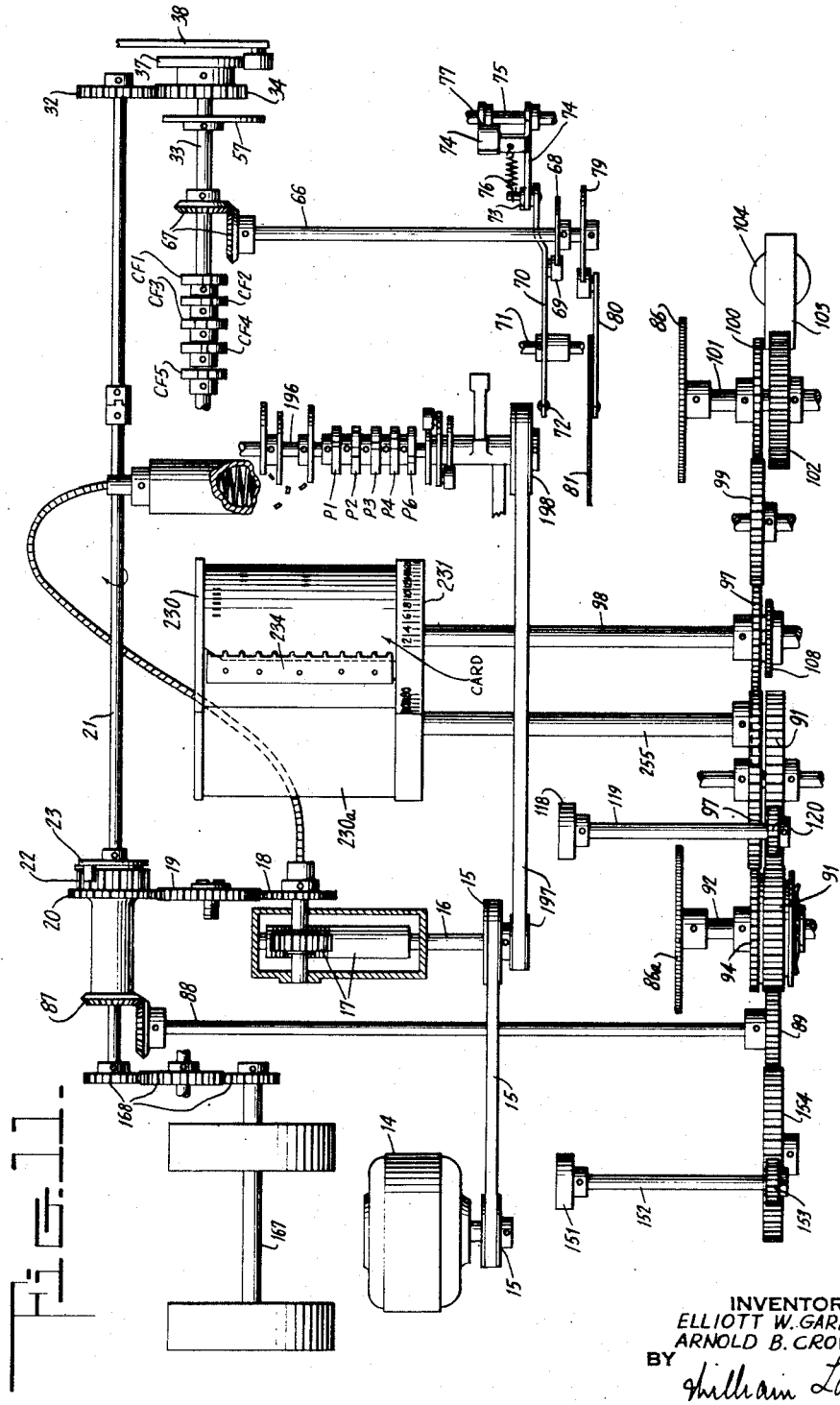

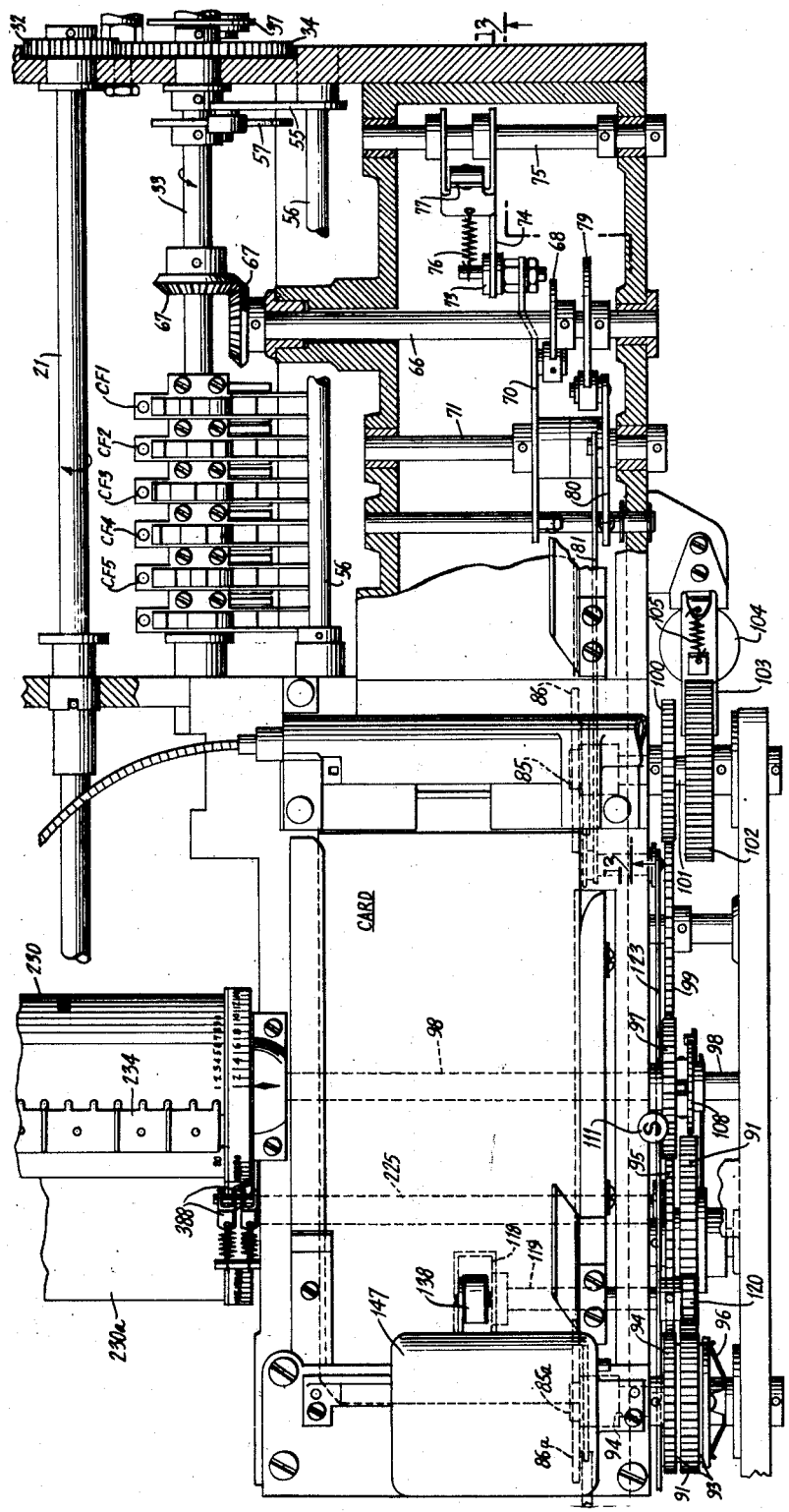

Aug. 4, 1953    E. W. GARDINOR ET AL    2,647,581
RECORD CARD PUNCHING MACHINE

Filed July 6, 1949    32 Sheets-Sheet 11

INVENTORS
ELLIOTT W. GARDINOR
ARNOLD B. CROWELL
BY
William Lang
ATTORNEY

Aug. 4, 1953 E. W. GARDINOR ET AL 2,647,581
RECORD CARD PUNCHING MACHINE
Filed July 6, 1949 32 Sheets-Sheet 12
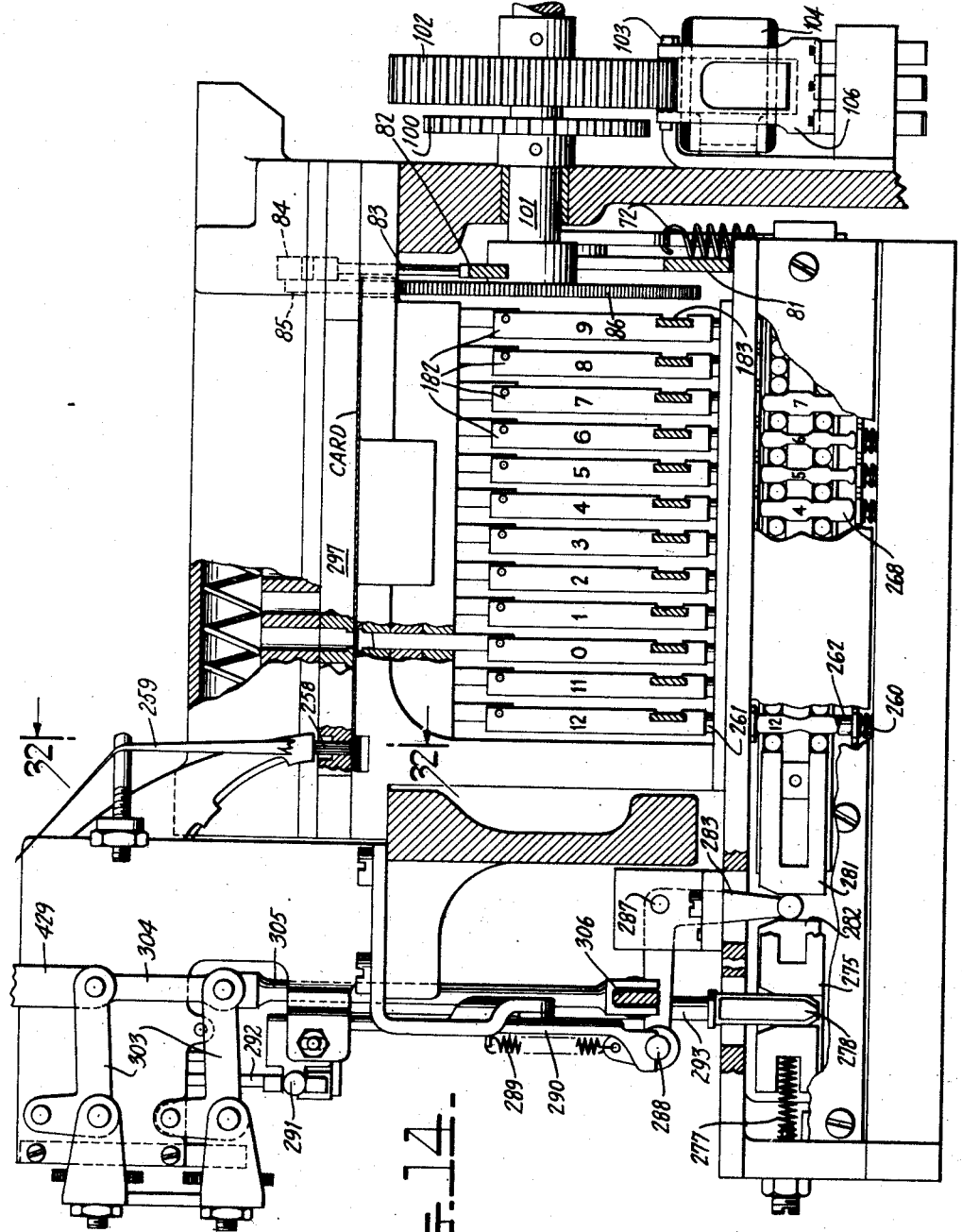
INVENTORS
ELLIOTT W. GARDINOR
ARNOLD B. CROWELL
BY
William Lang
ATTORNEY

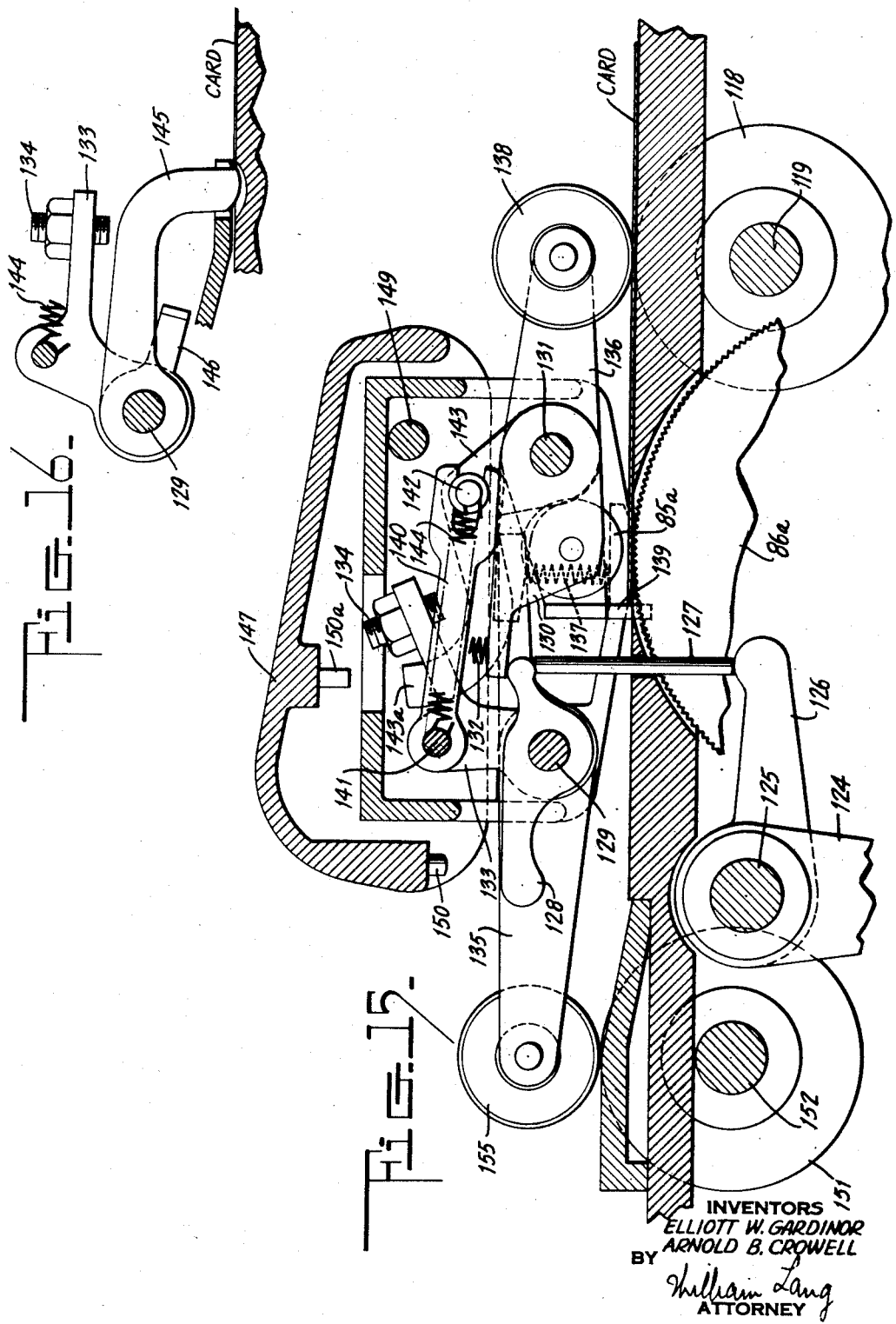

Aug. 4, 1953  E. W. GARDINOR ET AL  2,647,581
RECORD CARD PUNCHING MACHINE
Filed July 6, 1949  32 Sheets-Sheet 14
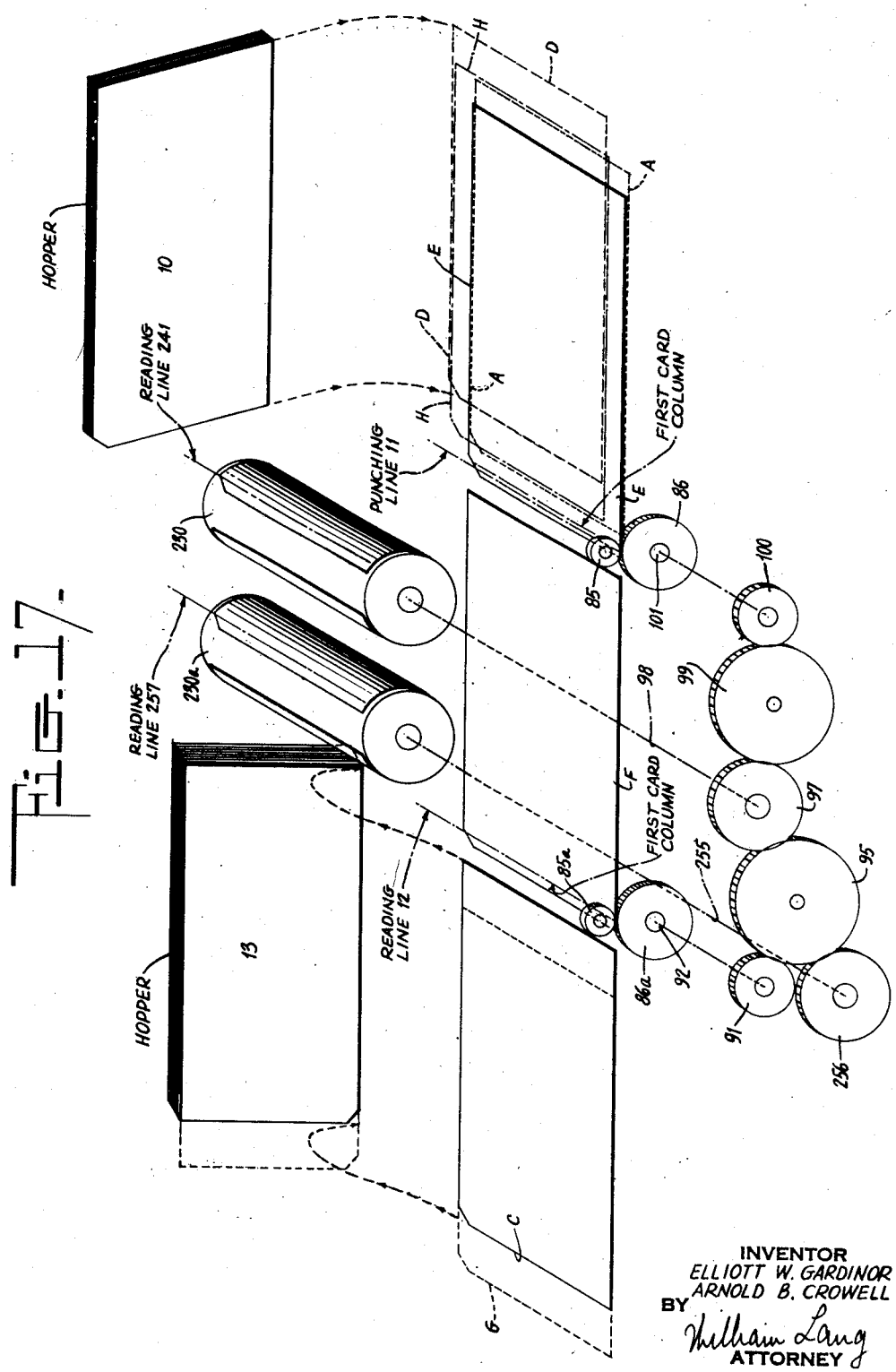
INVENTOR
ELLIOTT W. GARDINOR
ARNOLD B. CROWELL
BY William Lang
ATTORNEY

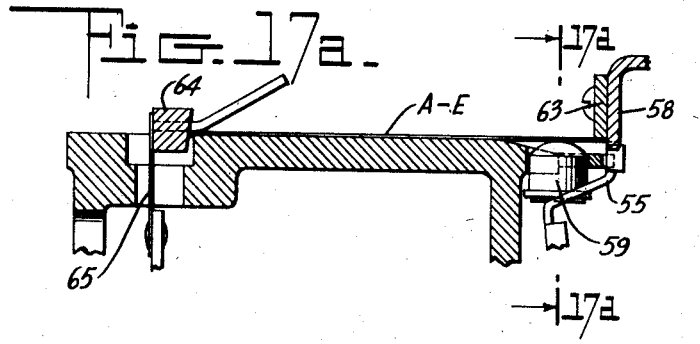
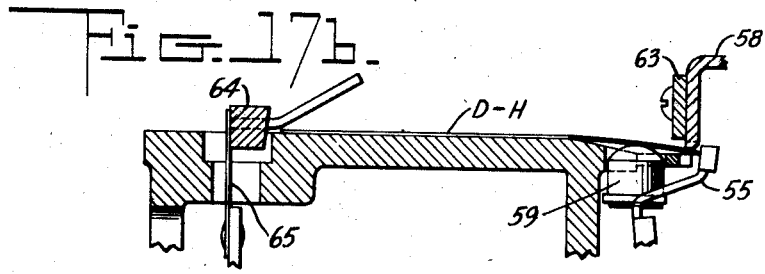
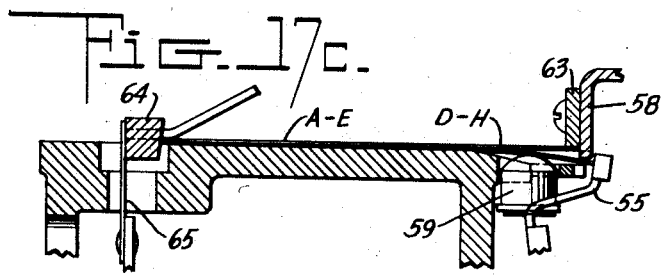
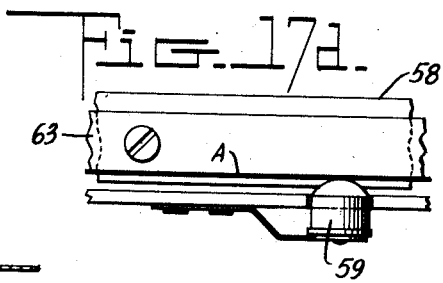
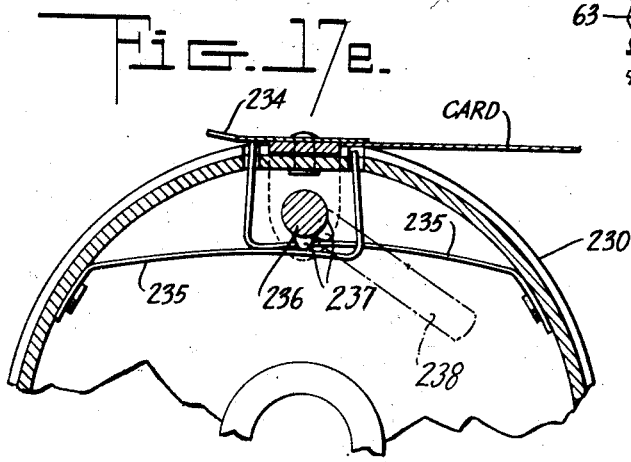

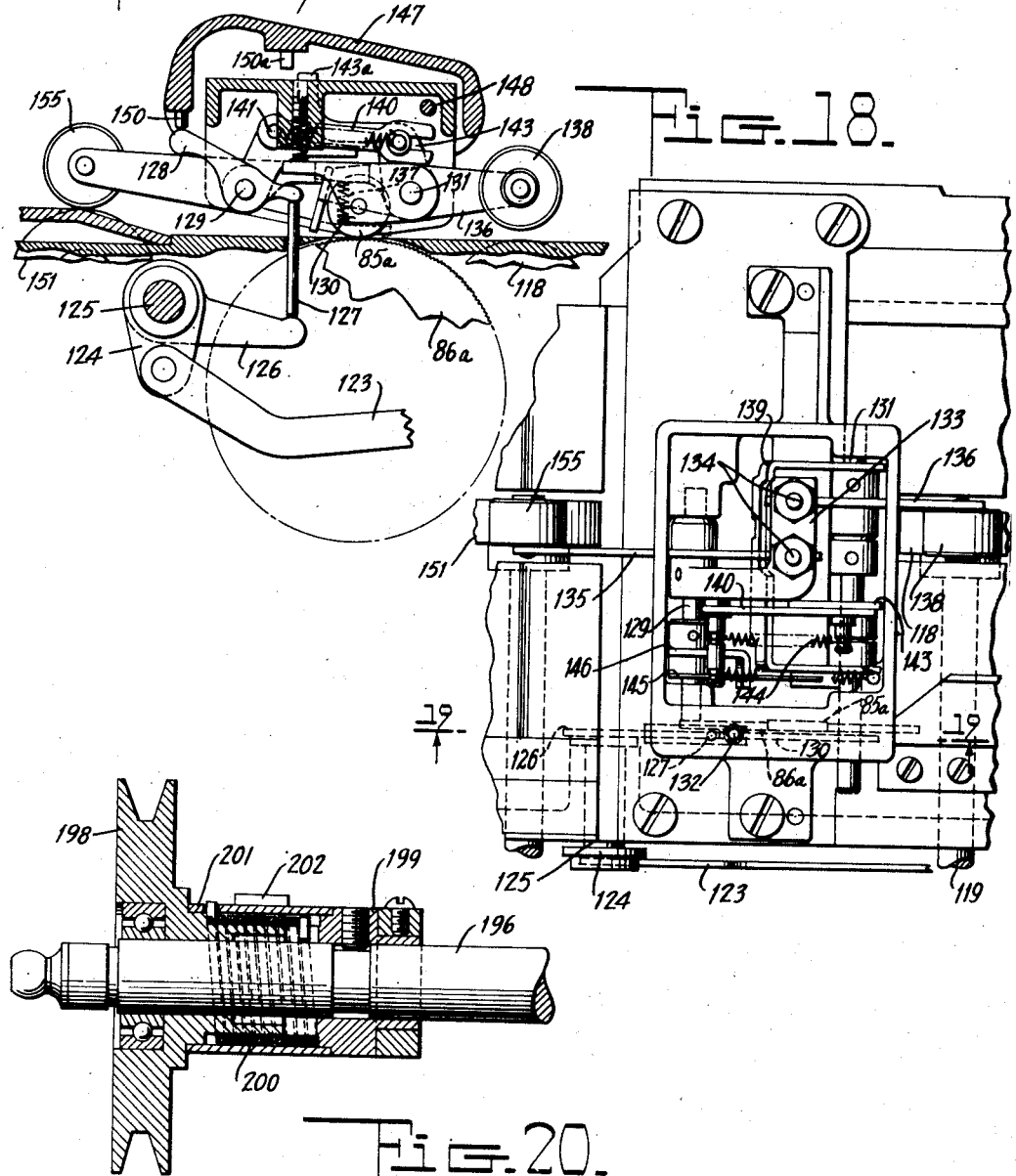

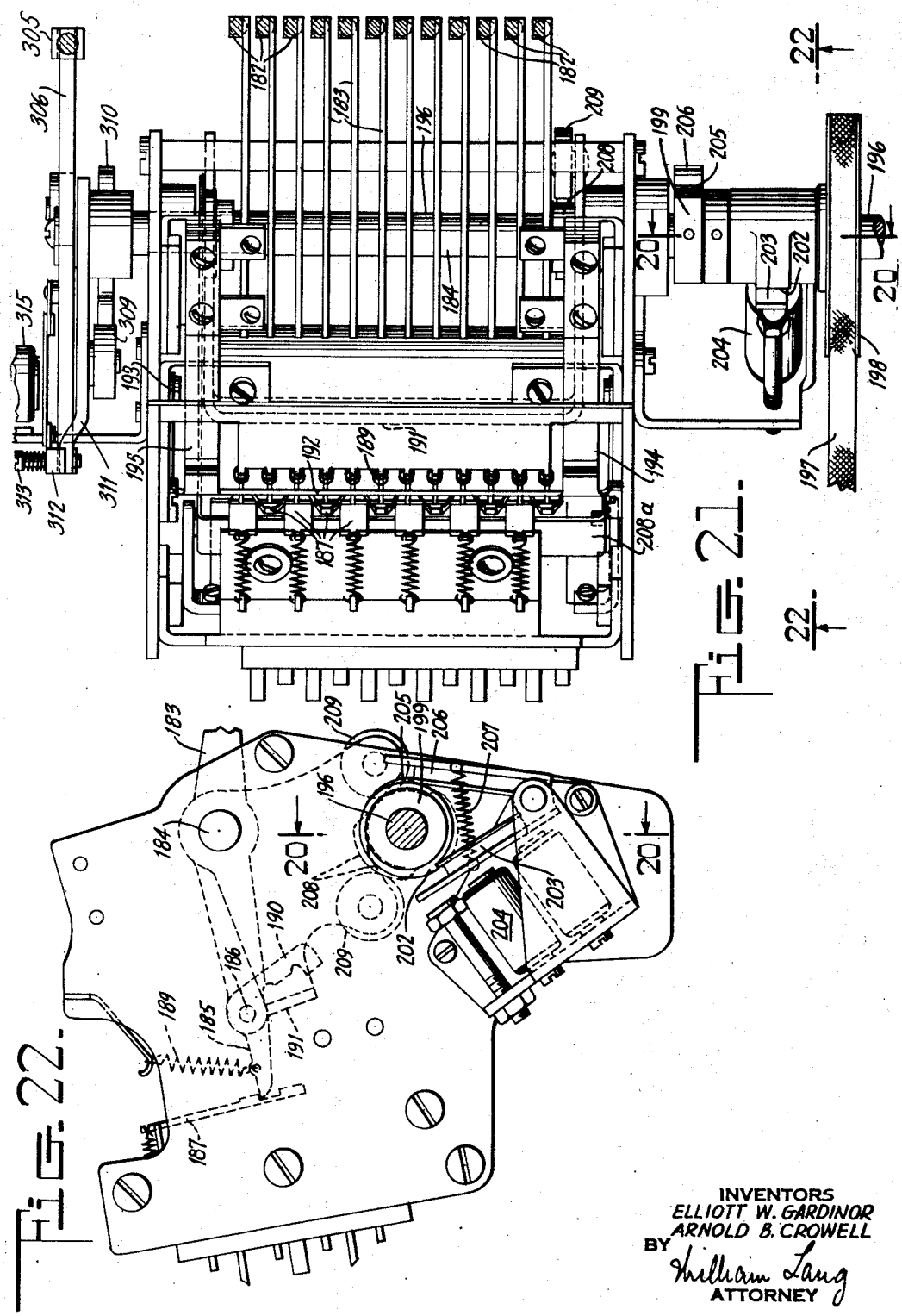

Aug. 4, 1953 E. W. GARDINOR ET AL 2,647,581
RECORD CARD PUNCHING MACHINE
Filed July 6, 1949 32 Sheets-Sheet 18
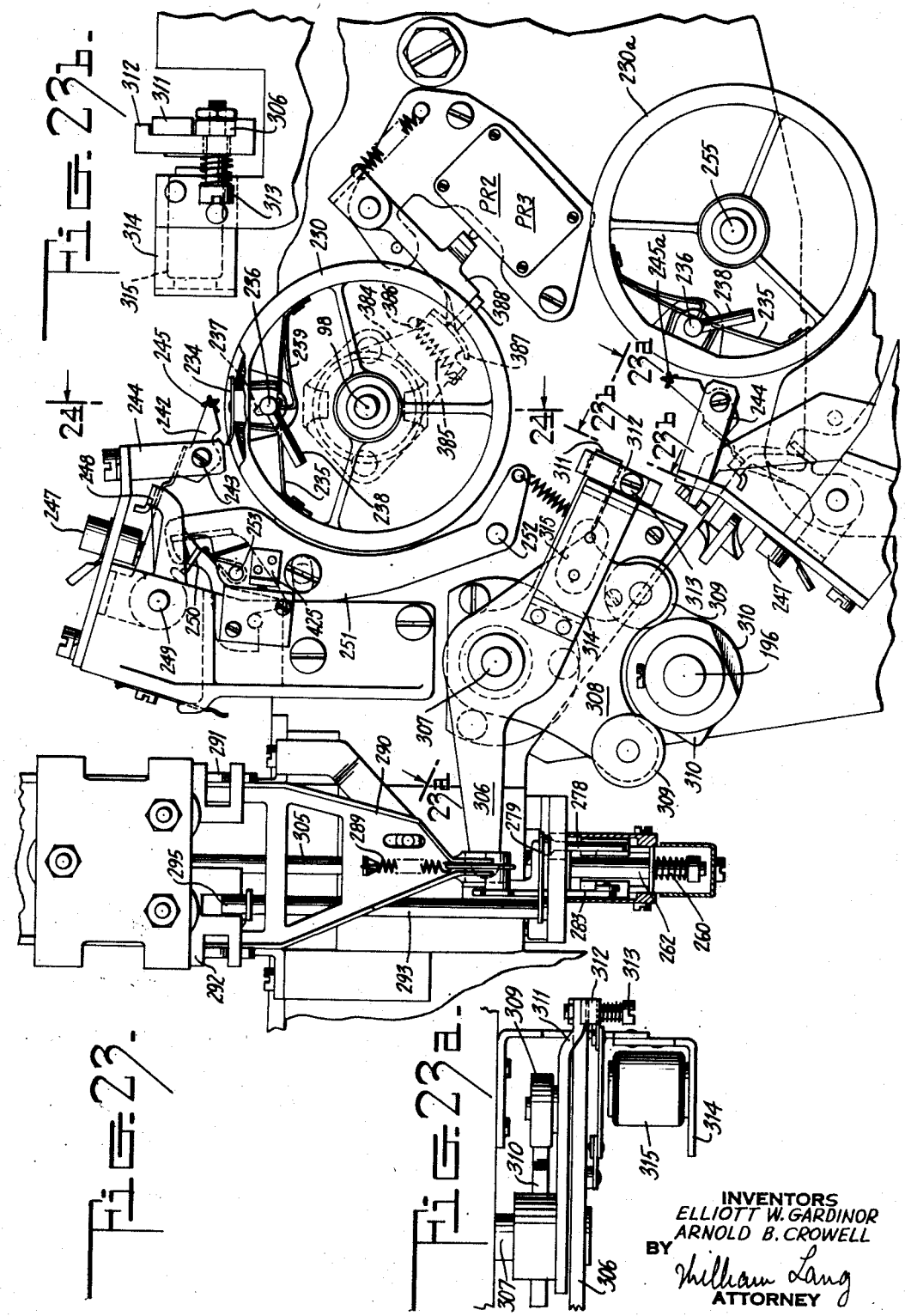
INVENTORS
ELLIOTT W. GARDINOR
ARNOLD B. CROWELL
BY
William Lang
ATTORNEY

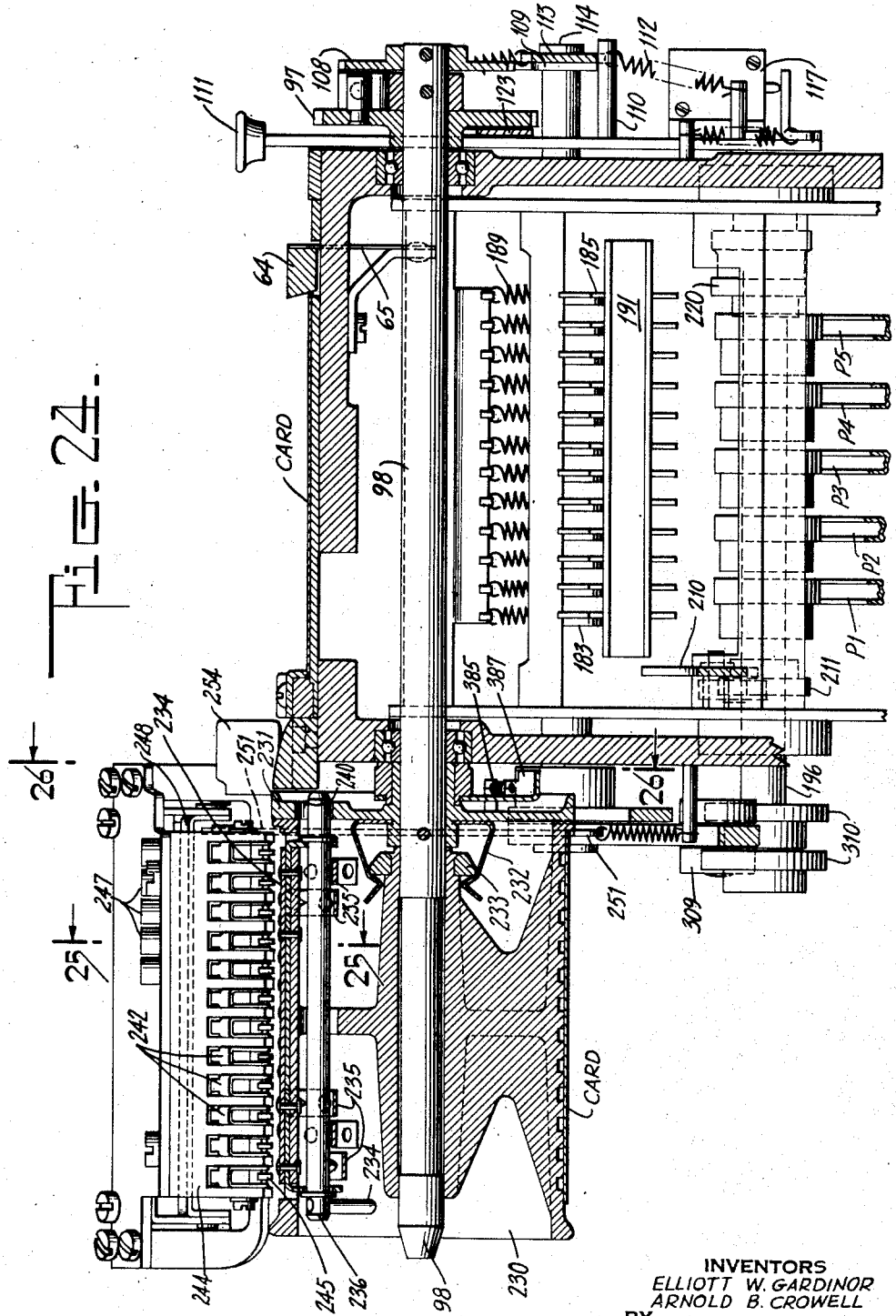

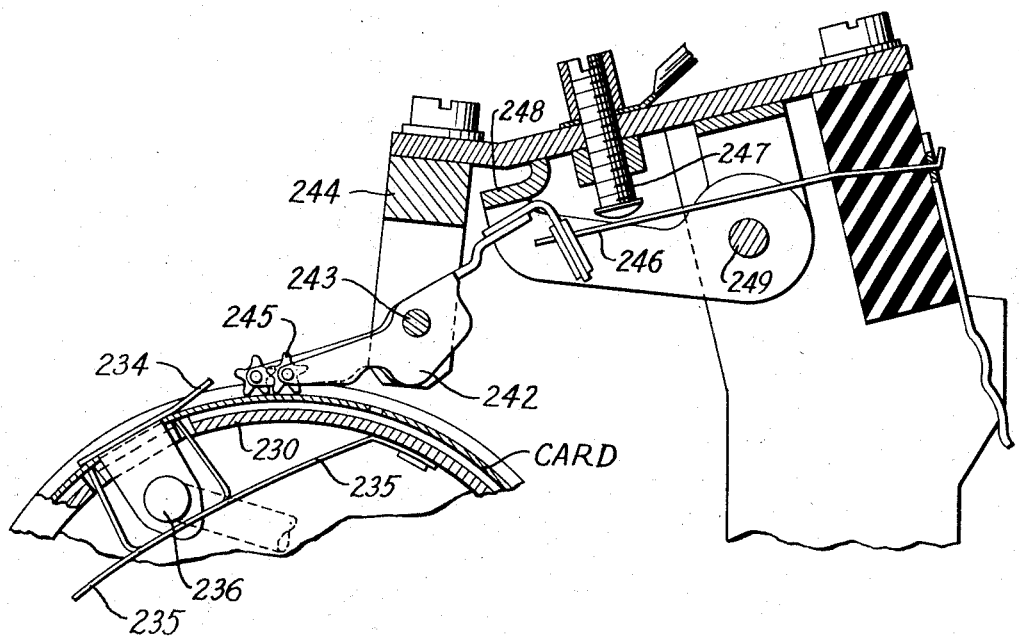

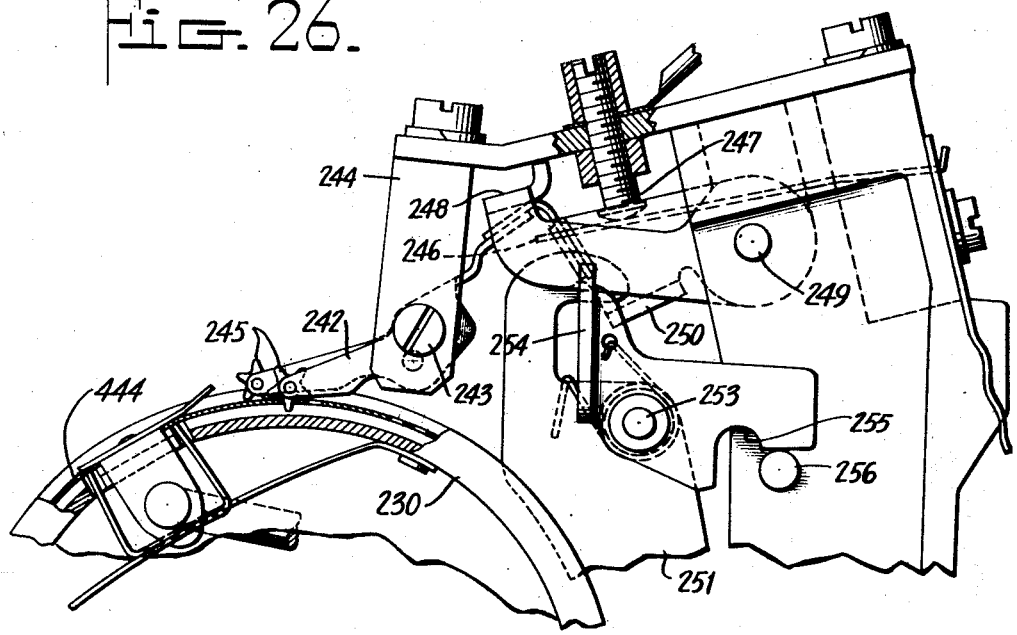
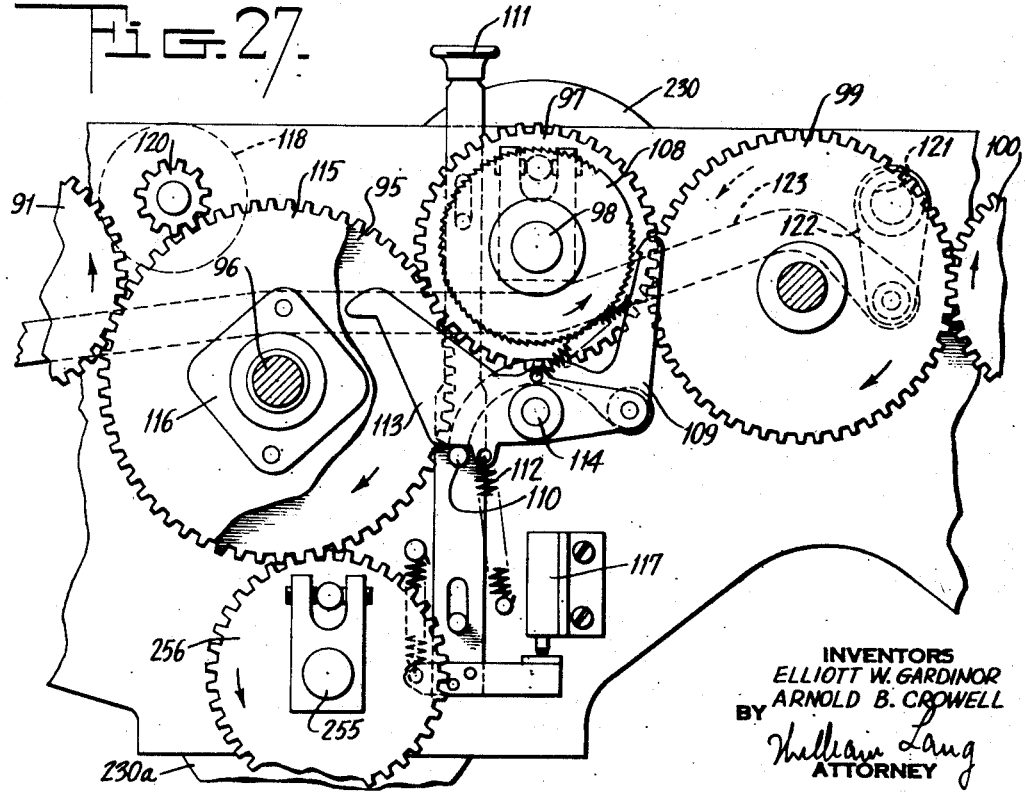

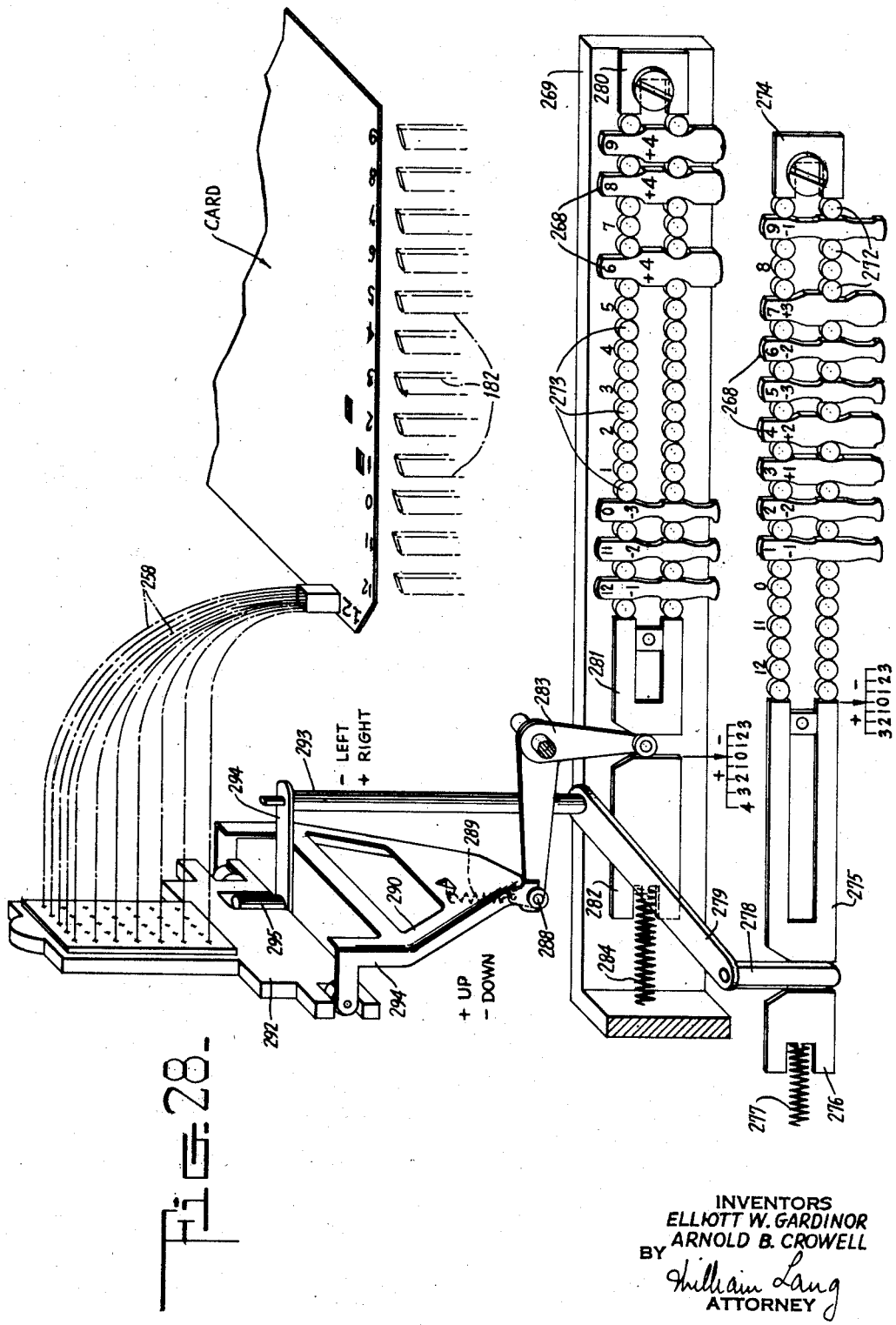

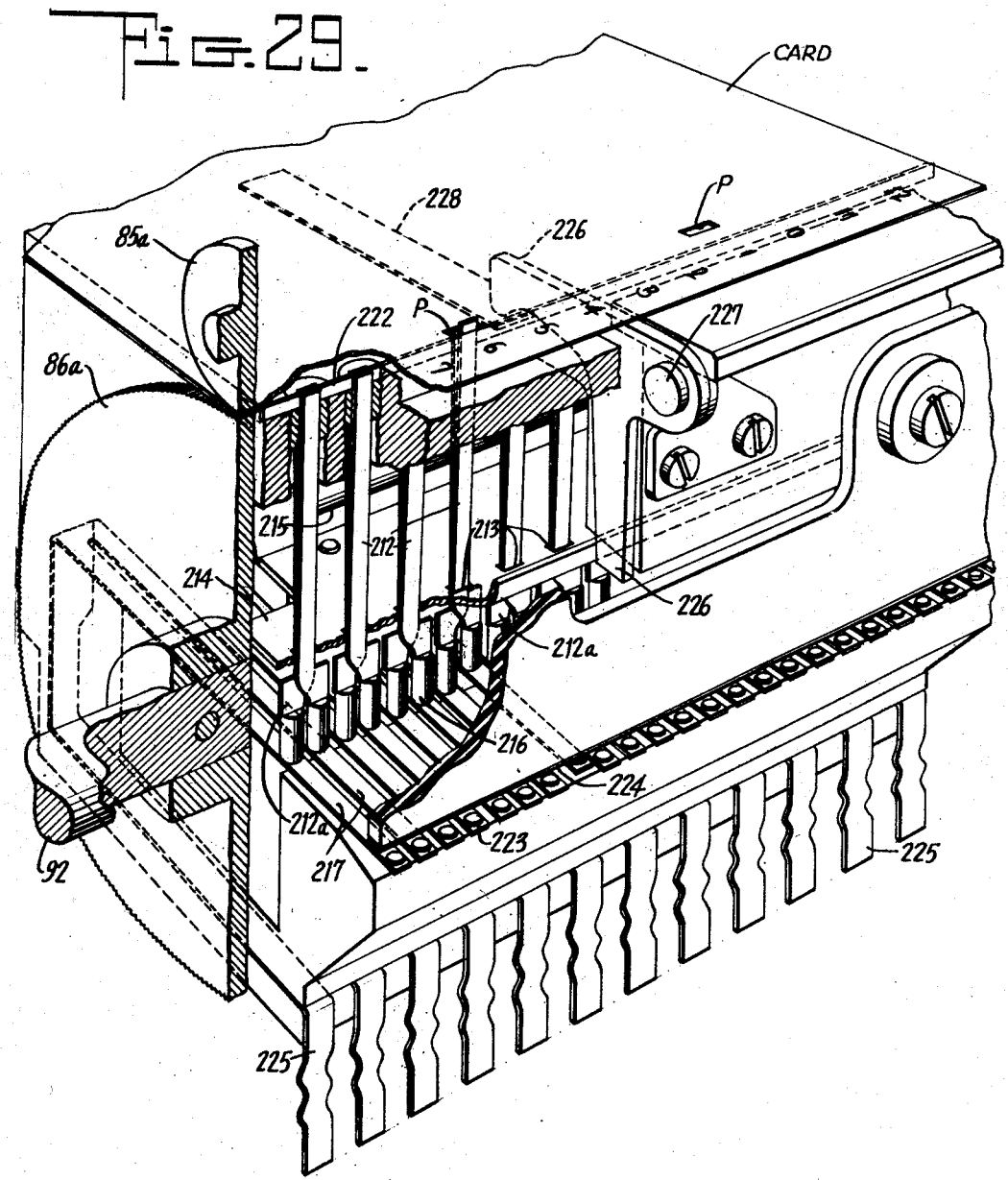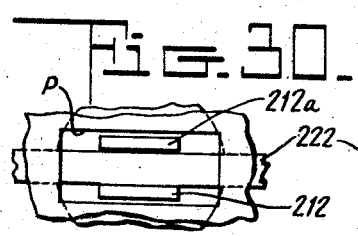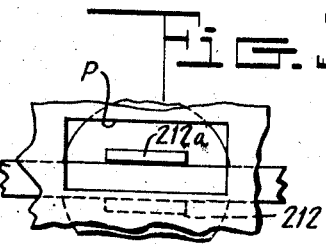

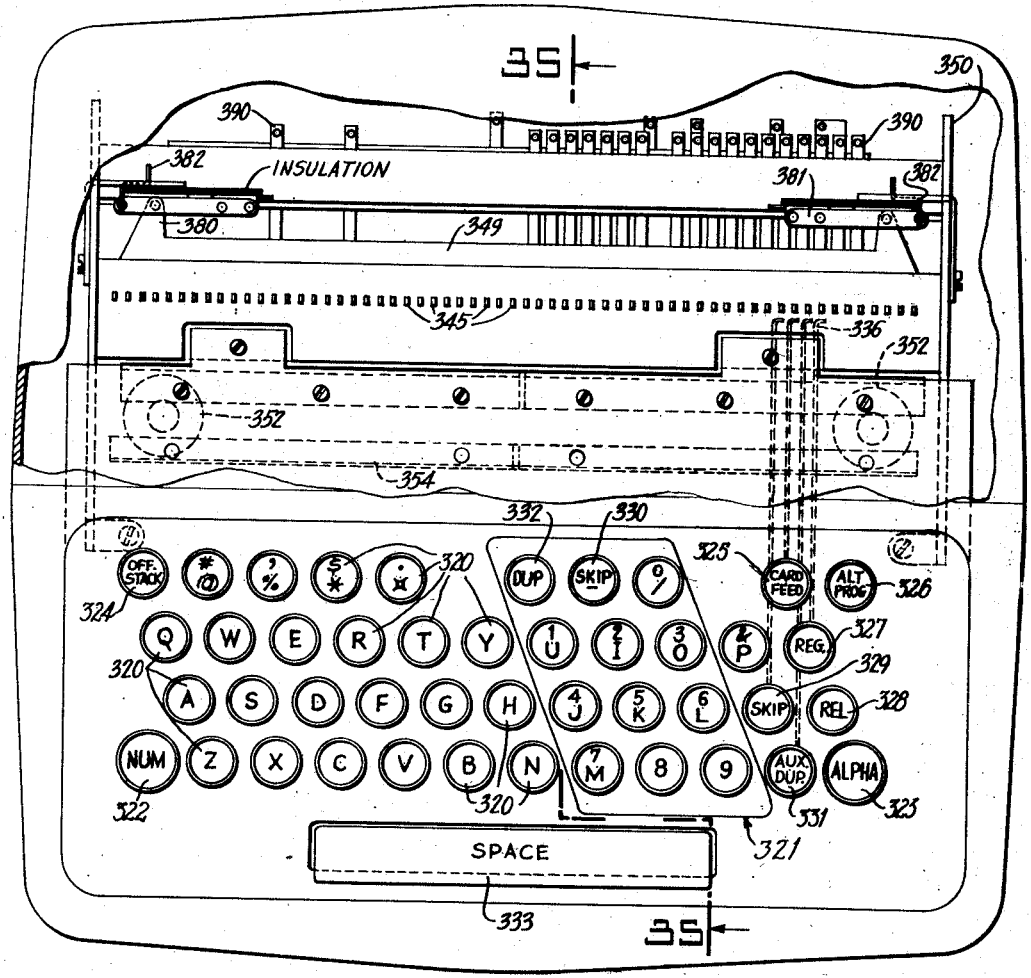
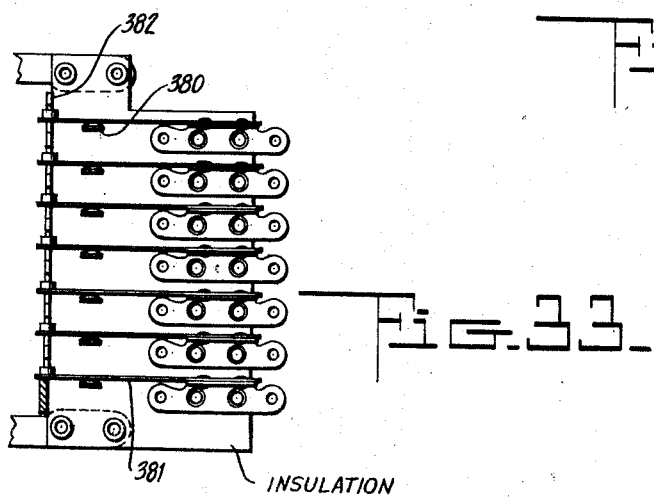

Aug. 4, 1953 E. W. GARDINOR ET AL 2,647,581
RECORD CARD PUNCHING MACHINE
Filed July 6, 1949 32 Sheets-Sheet 25

INVENTORS
ELLIOTT W. GARDINOR
ARNOLD B. CROWELL
BY
William Lang
ATTORNEY

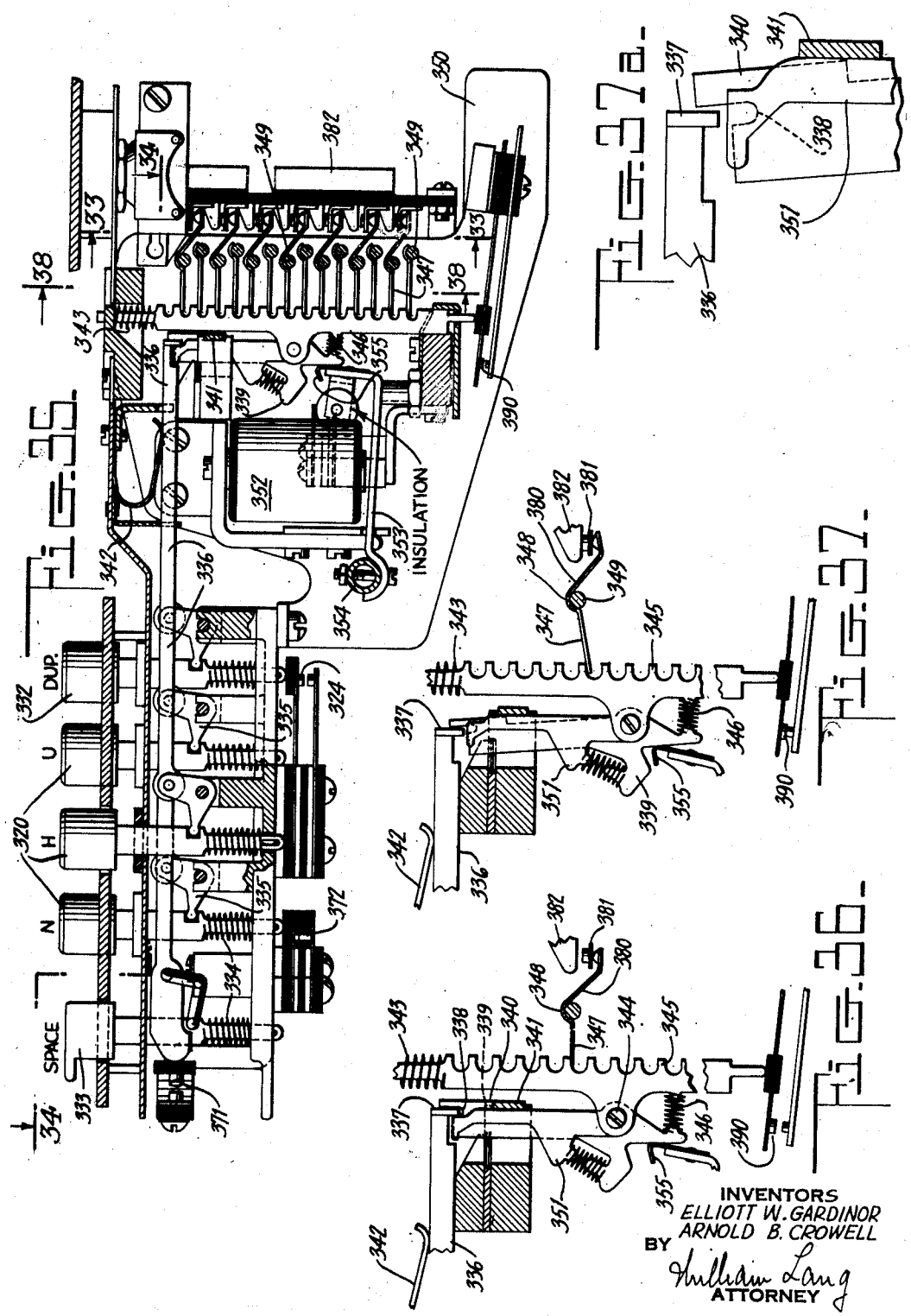

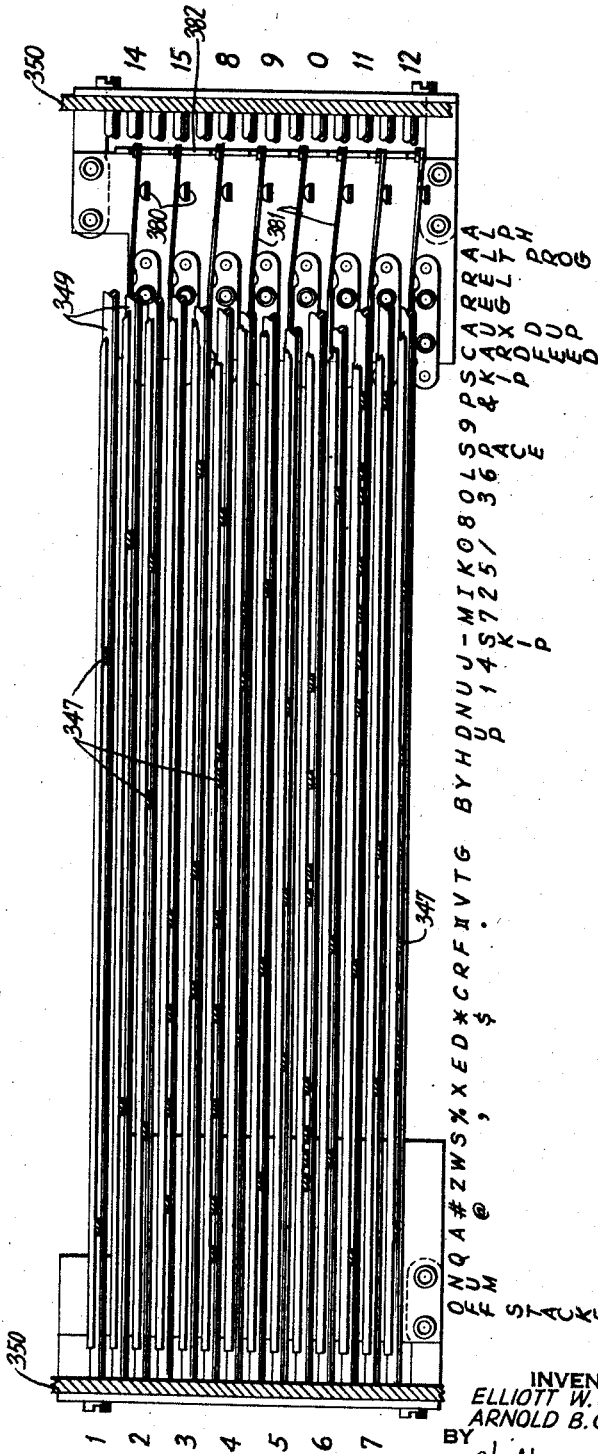

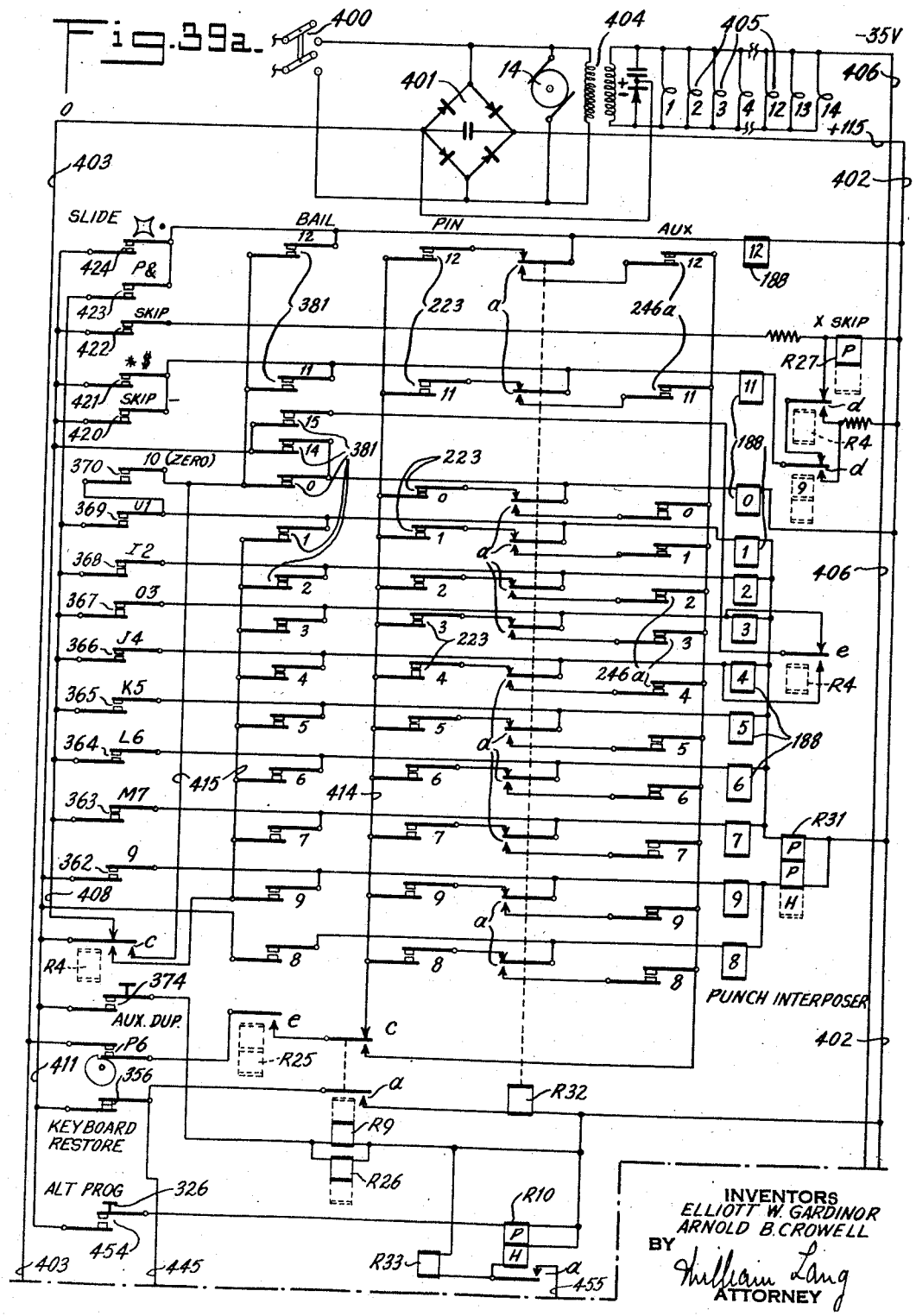

Aug. 4, 1953

E. W. GARDINOR ET AL 2,647,581

RECORD CARD PUNCHING MACHINE

Filed July 6, 1949

INVENTORS
ELLIOTT W. GARDINOR
ARNOLD B. CROWELL
BY
William Lang
ATTORNEY

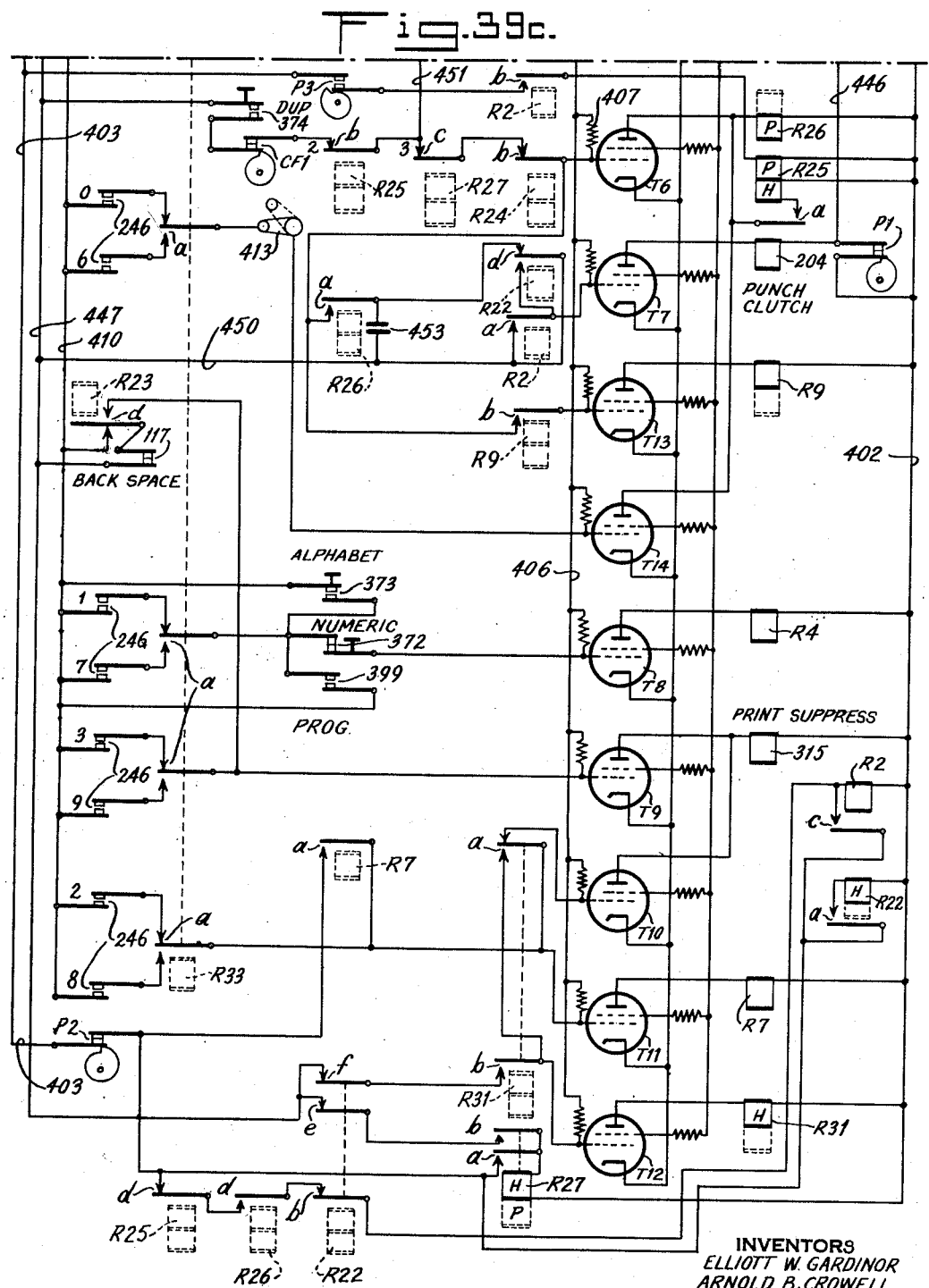

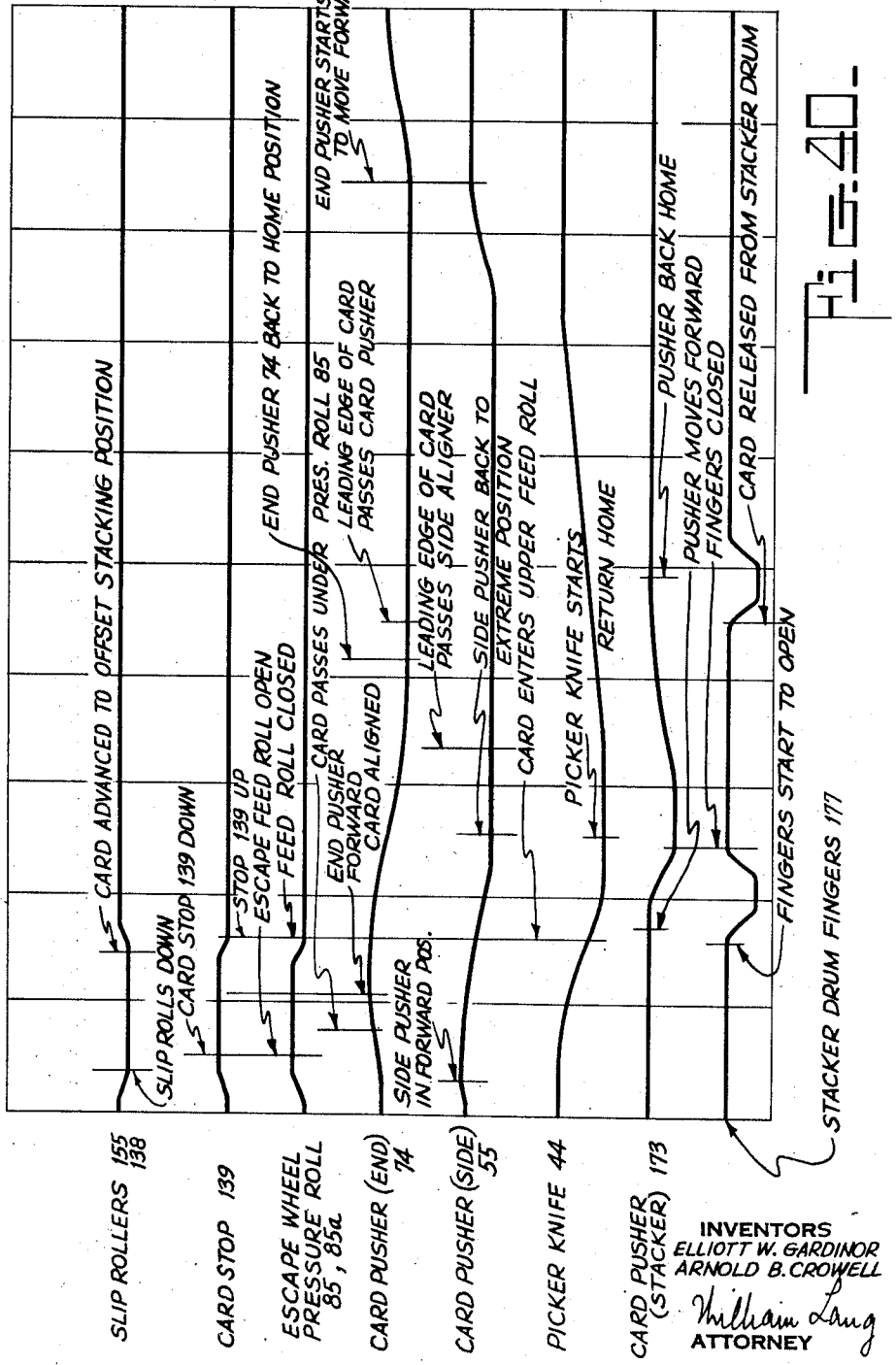

Aug. 4, 1953  E. W. GARDINOR ET AL  2,647,581
RECORD CARD PUNCHING MACHINE
Filed July 6, 1949  32 Sheets-Sheet 32

INVENTORS
ELLIOTT W. GARDINOR
ARNOLD B. CROWELL
BY
William Lang
ATTORNEY

Patented Aug. 4, 1953

2,647,581

UNITED STATES PATENT OFFICE 2,647,581

RECORD CARD PUNCHING MACHINE

Elliott W. Gardinor, Conklin, and Arnold B. Crowell, Endicott, N. Y., assignors to International Business Machines Corporation, New York, N. Y., a corporation of New York Application July 6, 1949, Serial No. 103,224

17 Claims. (Cl. 164—113)

The present invention relates to record card perforating machines and more particularly to perforating machines in which record cards provided with columns of punching positions are perforated column by column under control of manually operated keys.

The principal object of the invention is to provide a new card punch of the column-by-column type in which improved flexibility of control and increased speed of operation are attained. In addition to the selective control by manual keyboard, the perforating machine herein contemplated may be controlled by perforations in a card passing the reading station or by a card wrapped around a so-called duplicating drum. Furthermore, alternate functional controls of the perforating machine may be effected either by manual keyboard or under the control of a prepunched card wrapped around a so-called program drum.

In carrying out the broad object of the invention, the machine is provided with a supply hopper in which a stack of cards is placed, a punching station, a reading station and a discharge hopper. The cards are fed singly from the supply hopper to the punching station, past which each card is traversed column by column under control of selectively operated keys, or under control of a prepunched card on a duplicating drum, and perforations are made in the columns in accordance with alphabetic or numeric data. The punching mechanism is so arranged for speed of operation that the punch actuating means is not restored to a home position when the same characters are successively selected. Printing mechanism is provided at the punching station and arranged so that, as punching is effected in each column, a printed designation corresponding to the punching is made in the margin of the card.

After each card, to be punched, has been advanced past the punching station, it is traversed past the reading station column by column, while the next following card is concurrently advanced past the punching station. Controls are provided so that, as each column at the reading station is sensed, the perforations therein may be caused to effect duplicate punching in the corresponding column of the next following card.

It is an object of the invention to provide improved record card advancing mechanism in which the blank card advanced from the supply hopper to the punching station is first brought to an intermediate station in which the leading edge of the card is in close proximity to the punching station, so that during the card advancing operation the card is fed from the intermediate station a short distance to the punching station and, while this is taking place, the next following card is advanced from the hopper to the intermediate station. This arrangement permits the first card to receive punching while the second card is being advanced to the intermediate station, thereby saving time.

A further object of the invention is to provide improved duplicating controls, at the station wherein the first card punched by this device acts as a master card to each succeeding card at that station, whereby as a column of the card is being punched the next higher column, at the left, of the preceding card at the reading station is sensed and controls set up for punching the next following column of the following card. Thus, there is an overlap of the reading and punching operations which is conducive to greater overall speed of operation of the machine. This overlap of reading and punching operations is effective both for keyboard control and for duplicating drum control.

Another object of the invention is to provide improved functional control devices for the machine which take the form of a perforated card wrapped about a so-called program drum. This card is provided with columns of punching positions and is advanced past a row of sensing elements column by column as the punched cards are advanced. Appropriate designations made in the columns of the program card will bring about automatic operations such as auto-skip, manual field, auto duplicate, alphabet field, zero print eliminate, print suppression and other operations incidental to record card punching.

A further object of the invention is to provide improved mechanism for advancing a record card past punching and reading stations which includes the provision of a single pair of feed rollers at each of these stations and frictionally driven escapement mechanism.

A further object of the invention is to provide improved power driven back space mechanism for the card feeding devices.

Another object of the invention is to provide automatic control of the printing mechanism, whereby printing of zeros to the left of a first significant figure is eliminated when an amount punched has zeros to the left, so that the printing mechanism prints only the significant portion of the amount.

Another object of the invention is to provide improved offsetting mechanism, whereby selected cards may be fed to the discharge hopper in offset relation with respect to the remaining cards, whereby such cards may readily be identified and removed from the stack of cards in such hopper.

A further object of the invention resides in the provision of improved power operating mechanism for the punches. The improved arrangement of the power operating mechanism for the punches comprises a rocking interposer actuated by a rocking bail, there being a coupling means or latch carried by the rocking interposer and controlled by selecting electromagnets. The rocking interposer also controls contacts to control the card feed and the punch hammer actuation.

Other objects of the invention will be pointed out in the following description and claims and illustrated in the accompanying drawings, which disclose, by way of example, the principle of the invention and the best mode, which has been contemplated, of applying that principle.

In the drawings:

Figs. 2 and 3 are arranged so that, when placed side by side, they constitute a continuous front elevation of the machine.

Fig. 5 is a sectional elevation through the card feeding mechanism taken on lines 5—5 of Fig. 1.

Fig. 6 is a sectional elevation taken on lines 6—6 of Fig. 1.

Fig. 6a is a detail of clutch mechanism shown in Fig. 6 in operated position.

Fig. 7 is a sectional elevation of the card stacking mechanism taken on lines 7—7 of Fig. 1.

Fig. 8 is a sectional elevation on lines 8—8 of Fig. 1 showing the card reading and punching mechanisms.

Fig. 9 is a sectional elevation through the card ejecting mechanism taken on lines 9—9 of Fig. 1.

Fig. 10 is a position view of parts shown in Fig. 7.

Fig. 11 is a diagrammatic view showing the relationship of the various driving gears and shafts of the machine.

Fig. 12 is a plan view of the right end of the machine as viewed in Fig. 1 with the upper mechanism broken away to show the interior construction.

Fig. 14 is a section taken on lines 14—14 of Fig. 1 showing the punches and their relationship to the printing mechanism.

Fig. 15 is a detail view of the card ejecting mechanism.

Fig. 16 is a detail of parts shown in Fig. 15.

Fig. 17 is a diagrammatic view showing the path of travel of the cards from supply hopper to discharge stacker.

Figs. 17a, 17b and 17c show the relationship of the card with respect to mechanism shown in Fig. 5 at different steps in the operation.

Fig. 17d is a section taken on lines 17d—17d of Fig. 17a.

Fig. 17e is an enlarged section through the card clamping device of the program drum.

Fig. 18 is a plan view of the card ejecting mechanism.

Fig. 19 is a section taken on lines 19—19 of Fig. 18.

Fig. 20 is a detail section of a one-revolution clutch, the section being taken generally along lines 20—20 of Fig. 22.

Fig. 21 is a plan section of the punch controlling mechanism taken along lines 21—21 of Fig. 8.

Fig. 22 is a section on lines 22—22 of Fig. 21.

Fig. 23 is an outside view of the central part of the machine looking from the rear showing the location of the removable program drum and the print unit operating mechanism.

Fig. 23a is a detail looking in the direction of lines 23a—23a of Fig. 23.

Fig. 23b is a detail looking in the direction of lines 23b—23b of Fig. 23.

Fig. 24 is a section on lines 24—24 of Fig. 23.

Fig. 25 is a detail section on lines 25—25 of Fig. 24.

Fig. 26 is a section on lines 26—26 of Fig. 24.

Fig. 27 is an enlarged view of the back spacing mechanism looking from the front of the machine.

Fig. 28 is a diagrammatic view showing the manner in which the printing control plate is positioned in accordance with punch selection.

Fig. 29 is an isometric view of the card reading pins and parts controlled thereby.

Figs. 30 and 31 are diagrams showing particular operating positions of one of the sensing pins.

Fig. 32 is a plan view of the controlling keyboard for the machine.

Fig. 33 is a detail taken on lines 33—33 of Fig. 35 showing one set of the contact devices controlled by the keyboard.

Fig. 35 is a sectional elevation of the keyboard taken on lines 35—35 of Fig. 32.

Figs. 36 and 37 are views showing parts of Fig. 35 in different operating positions.

Fig. 37a is an enlarged detail of parts in Fig. 37.

Fig. 38 is a section taken on lines 38—38 of Fig. 35 showing the character selecting combinations.

Figs. 39a, 39b and 39c, taken together and placed one above the other in the order named, constitute a wiring diagram of the electric circuits of the machine.

Fig. 40 is a timing chart of the several mechanical devices and their relative timing for a single card feed cycle of operation.

Fig. 41 is a specimen of a program card.

Fig. 42 is a specimen of a punched and printed card.

Fig. 43 is a time chart of the CF and P cams.

In the following the several component units of the machine will be separately described, after which the complete operation of the machine will be set forth in connection with the explanation of the circuit diagram, at which time the manner in which the various components are controlled to perform their functions will be set forth.

GENERAL ARRANGEMENT

Figure 1:
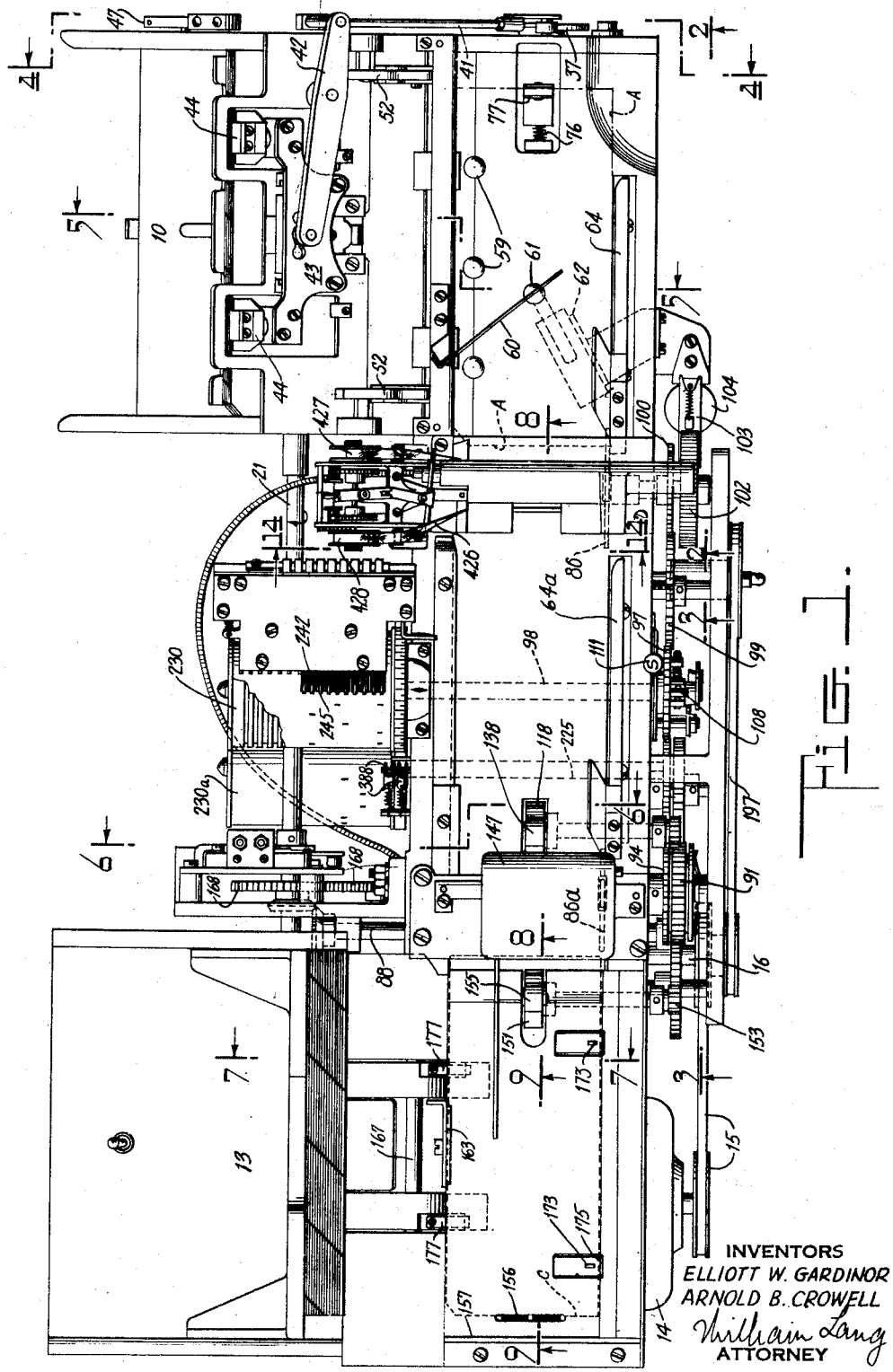
Fig. 1 is a plan view of the complete machine with the exception of the keyboard.

Referring to Fig. 1 and Fig. 17, the card hopper generally designated 10 is shown in the upper right hand corner, from which hopper, cards are fed singly to a position designated A. From this position the card is fed in the direction at right angles toward the left to pass a row of punches arranged along what may be termed a punching line 11 diagrammatically represented in Fig. 17. The movement of the card past the punching line is controlled to occur in a so-called step-by-step or column-by-column manner, which will advance the card toward a line of sensing or reading elements which is indicated at 12 in Fig. 17, so that after the card has been perforated, the perforations pass the reading line 12 where they may be sensed or analyzed step by step or column by column.

After passing the reading line, the card is advanced to a position designated C (see Fig. 1) from where it is shifted at right angles to mechanism which will deliver it to the discharge hopper designated 13, which is located at the left end of the machine.

In transferring a card from hopper 10 and along the path outlined in Fig. 17 to hopper 13, the feeding mechanism initially advances it to a position designated D and then shifts it a short distance to the left to a position designated H during what may be called a first card feed cycle. During a second card feed cycle, the card is shifted from the H position to the A position and thence at right angles to the full line position designated E, where the first column of the card is one step or column to the right of the punching line 11. During the so-called second card feed cycle, while the first card is advancing from the H position and through the A position to the E position, a second card is advanced from the hopper 10 to the D position and shifted to the H position, and in doing so it moves beneath the preceding card which has moved to the E position.

From this point under control of the keyboard or other instrumentalities, the first card is advanced from the E position step by step past the punching line, while the second card remains in the H position. After the first card has traversed the punching line 11, a third card feed cycle is initiated, during which the first card is advanced to a position designated F, where the first column thereof is in position at the reading line 12. During this third cycle, the second card is advanced from the H to the E position, and a third card is brought down into the H position. From here on, the first and second cards are moved concurrently, so that one passes the reading line 12 as the other advances past the punching line 11 until ultimately the second card has completely traversed the punching line.

Thereupon, a fourth card feed cycle is initiated, during which the first card is advanced to the C position from where it is shifted at right angles and delivered into the hopper 13.

Provision is made so that selected cards may be advanced slightly beyond hte C position to what is designated as position G, so that after delivery to the hopper 13 such cards will extend slightly from the main body of cards in what is known as an offset position. Also during this fourth card feeding cycle, the second card advances to the F position while the third card advances to the E position and a fourth card is drawn down from the hopper 10 to the H position.

The record cards are of the well known IBM card type having twelve horizontal rows of designation receiving positions 9, 8, 7, 6, 5, 4, 3, 2, 1, 0, 11 and 12 and eighty vertical columns, which may be suitably numbered along the lower margin.

CARD FEED MECHANISM

The manner in which cards are moved from position to position will now be explained with specific reference to the mechanism involved.

Referring to Figs. 1 and 11, a constantly running motor 14 through belt and pulley connection 15 drives a shaft 16 (see also Fig. 6) which through reduction worm and gear 17 drives a gear 18 in a clockwise direction, as viewed in Fig. 6. This gear, through idler 19, drives a gear 20 freely mounted on shaft 21 and having integral therewith a clutch driving ratchet 22. Secured to shaft 21 is a plate 23 to which dog 24 is pivoted, the dog lying in the plane of the driving ratchet 22. The left end of the dog has a pin 25 therein extending into a slot 26 in a second plate 27 loose on shaft 21. With the card feed clutch magnet 28 in its normal deenergized condition, as in Fig. 6, its armature 29 engages both plates 23 and 27 to hold them in the position shown, while a spring pressed dog 30 engages the plate 23 to prevent retrograde movement thereof.

Upon energization of the magnet, spring 31 will rock plate 27 to the position of Fig. 6a, thereby causing its slot 26 to cam pin 25 toward shaft 21 and effect engagement of the dog 24 with the driving ratchet 22, so that shaft 21 will be driven with gear 20. At the completion of the revolution, during which magnet 28 may be deenergized and its armature dog restored to normal position, the plate 27 will strike the free end of the armature to cause relative movement of the two plates and resulting disengagement of the dog from the driving ratchet.

The foregoing constitutes a well known form of one revolution clutch mechanism whereby the shaft 21 may be given a single revolution. As will be explained later, provision is made to hold magnet 28 energized for longer than one revolution and to deenergize it before completion of the second revolution. Thus, for each energization of magnet 28 there will occur two revolutions of shaft 21, constituting what will be designated hereinafter as a card feed cycle.

Figure 4:
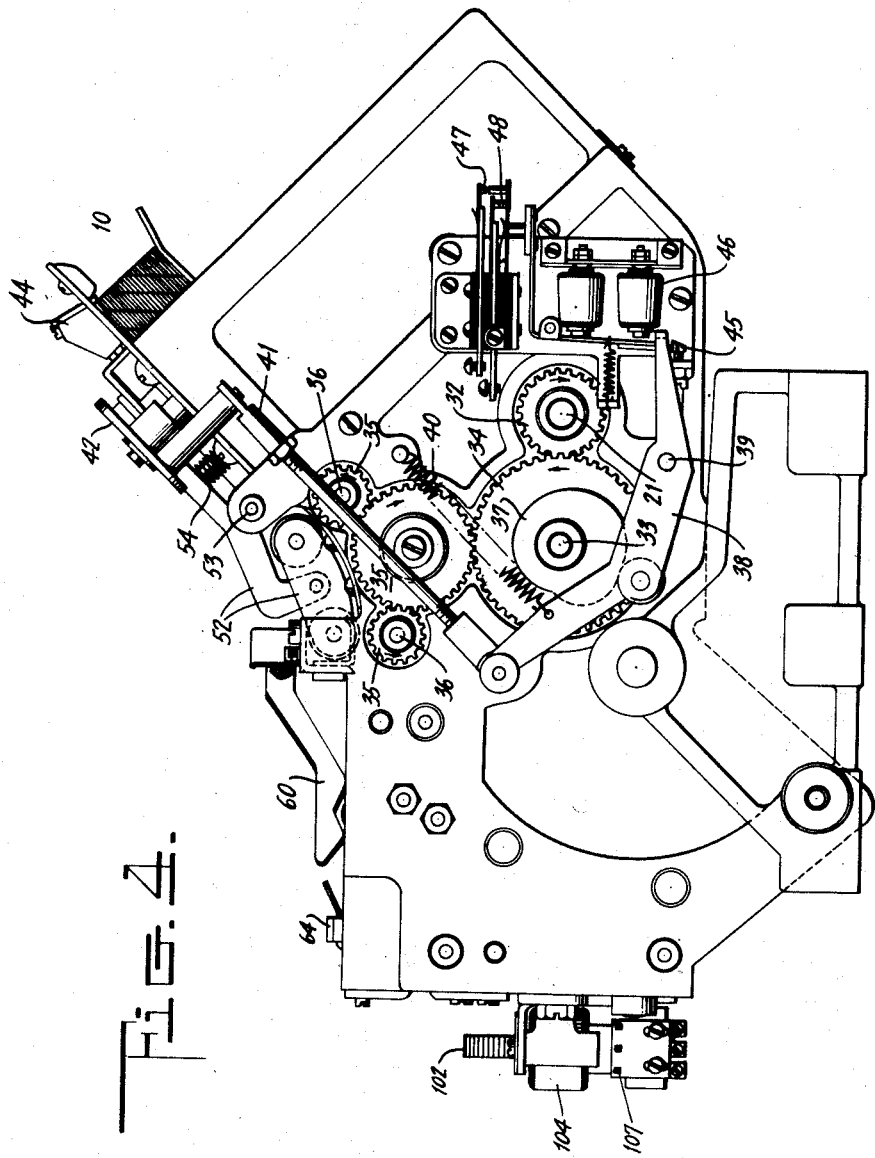
Fig. 4 is an end elevation looking in the direction of lines 4—4 of Fig. 1.

*First card feed cycle.*—Referring now to Fig. 4, shaft 21 has a gear 32 secured to its end which drives the shaft 33 through gear 34 and through further gearing designated 35 drives feed roller shafts 36 (see Fig. 5). Secured to shaft 33 (Fig. 4) is a cam 37 which oscillates a lever 38 about its pivot 39. This lever, under the action of spring 40 and adjustable link 41, serves to oscillate lever 42 (Figs. 1 and 2) to reciprocate plate 43 to which card picker knives 44 are fastened and will accordingly make a reciprocation in suitable guides for each revolution of the shaft 33. The ratio between gears 32 and 34 is 1:2 so that two revolutions of the shaft 21 or one revolution of shaft 33 will constitute one card feed cycle of operations.

Provision is made (Fig. 4) for preventing operation of the pickers. To this end the armature 45 of magnet 46 is arranged upon energization of the magnet to hook under a lateral extension at the right end of lever 38 and thereby block it against following the contour of cam 37, as long as the magnet remains energized. When this occurs, the parts will remain substantially in the position shown in Fig. 4 and the card picker knives 44 will not be reciprocated. As an incident to the energization of magnet 46, pairs of contacts 47 and 48 will be closed. The circuits controlled by these contacts will be explained in connection with the circuit diagram.

Referring to Fig. 5, the downward stroke of picker knife 44 will advance the foremost card in the magazine 10 through the throat 49 to rollers 50 secured on shafts 36 and cooperating pressure rollers 51, which latter are carried in a framework 52 (see Fig. 4) which is pivoted at 53 and biased counterclockwise by springs 54. The rollers 50, 51 will advance the card to a position in Fig. 5 where its right hand or trailing edge is just to the left of the lower pair of rollers.

*Card side-aligner.*—In Fig. 5 a card aligning lever or pusher 55 pivoted at 56 has a roller cooperating with a cam 57 secured on shaft 33. At the beginning of the cycle of this shaft, this lever occupies the normal home position shown. As the shaft turns, lever 55 is rocked slightly in a counterclockwise direction, which is an idle movement during this first card feeding cycle, and thereafter it is rocked clockwise back to the dotted line position shown, which position it reaches before the card being advanced from the hopper 10 has reached the lower pair of feed rollers 50, 51.

The lever 55 remains in its dotted line position while the card passes overhead and, after it has passed completely through the second pair of rollers, the lever is rocked back to its full line position of Fig. 5, and in doing so its upper end will engage the right hand edge of the card to move it to the position D as indicated. Thus, during the first card feed cycle the card is advanced from hopper 10 by picker 44 and feed rollers 50, 51 continue the advance to a position from which lever 55 will push it to the D position, where its right hand edge lies beneath the bar 58 as shown in Fig. 17b, and spring urged buttons 59 (see also Figs. 1 and 17d) bear upwardly against the right edge of the card to press it against the underside of bar 58 and thus constitute a means for holding the card in such position.

As the card moves into this D position, it enters between the spring urged lever 60 (Fig. 5) and button 61 to move the button downwardly and operate the card lever contacts in the form of a well known microswitch designated 62.

Near the end of the cycle, another pusher 74 (Fig. 13) through mechanism about to be described, will engage the right hand end of the card as viewed in this figure, and push it to its H position (Fig. 17), where the left end of the card is a distance of about six card columns to the right of the punching line 11.

*Second card feed cycle.*—A second cycle of shaft 33 is now initiated and, as explained before, the lever 55 (Fig. 5) is given an initial counter-clockwise movement which will shift it from the position of Fig. 17b to that of Fig. 17a, wherein it shifts the card from its H position to its A position, where the spring pressed buttons 59 bearing against the underside of the card snap the right end of the card slightly upward so that it lies against the lower edge of a guide bar 63 and against the vertical face of bar 58. The movement of lever 55 is such that the right end of the card is moved slightly beyond the vertical face of bar 58 and the left end is forced against the guide bar 64, which is carried on resilient member 65 which will flex slightly and serve to urge the card against bar 58 and hold it in such alignment during subsequent advance.

The lever 55 then returns to the dotted line position of Fig. 5, while the second card is advancing from the hopper 10 in the same manner as explained in the first card feed cycle, and this second card advances to its D position as already explained.

It will be noted particularly that with the first card in its A position, its right end is elevated slightly above the path of the second card so that the second card being advanced by rollers 50, 51 will slide under the first card into the position shown in Fig. 17c, where the second card will have its right end beneath bar 58 and urged against such bar by the buttons 59.

Referring to the time chart (Fig. 40), the relative movements of the mechanisms involved in the transport of cards from the hopper 10 to the A and D positions is represented, it will be noted that the card pusher 55 moves to effect a side alignment represented by the position of the parts in Fig. 17a, where it remains for about a tenth of a card feed cycle and then shifts back to its dotted line position of Fig. 5, after which the aligning lever starts to move forward and stops in the full line position of Fig. 5. Correlated with this movement, the picker knives 44 are feeding a card to bring it to the upper feed rollers at the point indicated as "Card Enters Upper Feed Roll."

*Card end pusher.*—During this second card feed cycle, the first card is advanced from its A to its E position, and this is effected by the mechanism shown in Figs. 1, 11, 12 and 13. From shaft 33 a cross shaft 66 is driven through a pair of bevel gears 67 and on this shaft there is secured a cam 68 which, as it rotates clockwise, will engage a roller 69 on a lever 70 urged in a counterclockwise direction about a pivot 71 by a spring 72. The right end of this lever as viewed in Fig. 13 has a roller 73 against which card pusher lever 74 pivoted at 75 is urged by a spring 76. With the parts in normal or home position, the pusher 74 occupies the full line position and, as cam 68 rotates, the pusher rocks to the left hand dotted position, thence clockwise to the right hand dotted position and then back to the full line position shown.

Figure 13:
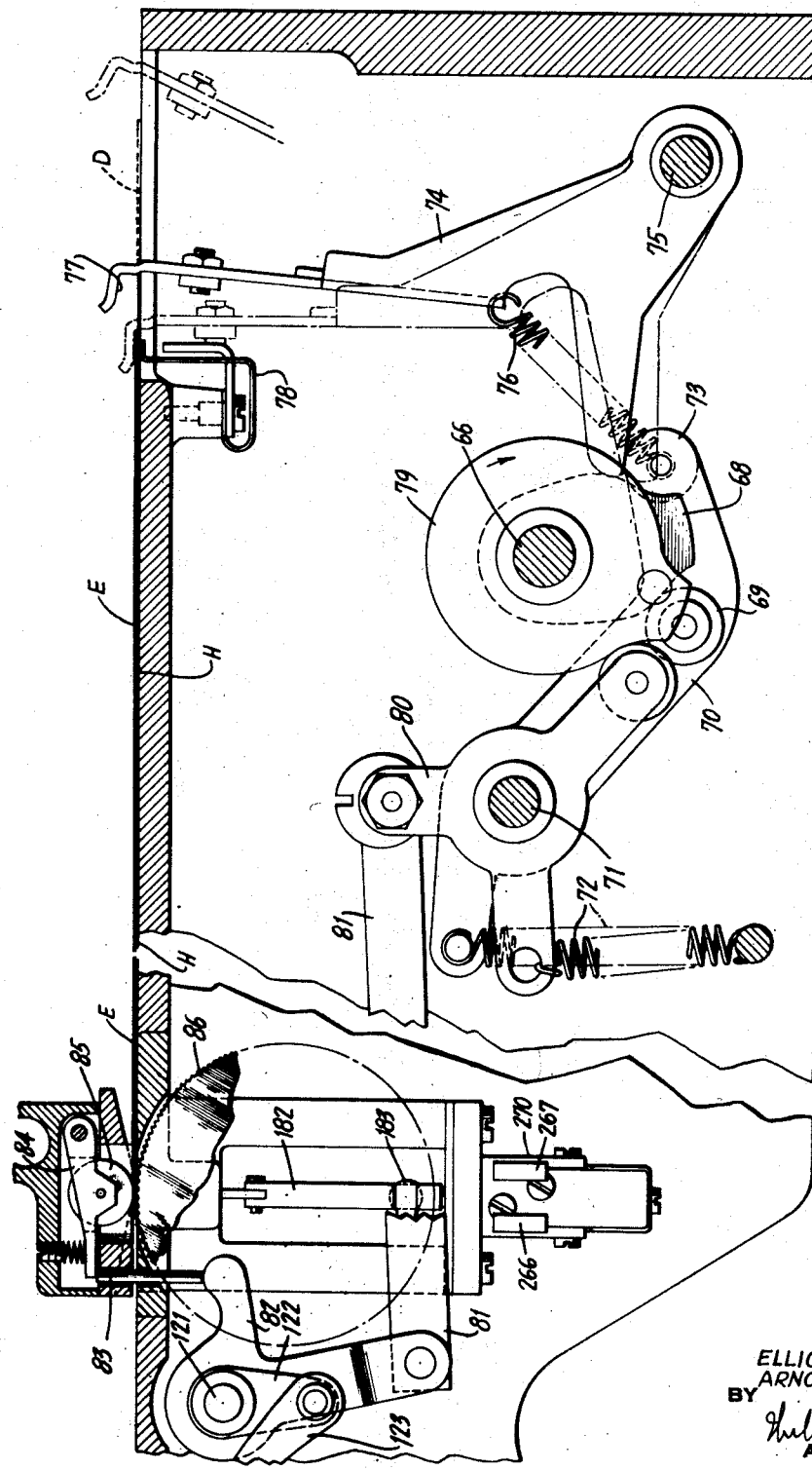
Fig. 13 is a sectional view taken on lines 13—13 of Fig. 12.

During the first movement, it engages the right hand edge of the card as viewed in Fig. 13 and advances it from its H to its E position, wherein the first column of the card is one step or column to the right of the punching line 11 (of Fig. 17). In moving to this position, the upper end of the pusher 74 is configured as indicated at 77 to press downwardly on the margin at the right end of the card, clamping it against a flat spring member 78 to thereby hold the right end of the card in position temporarily. The pusher then rocks to its right hand dotted line position while the next card is advancing from the hopper into its D position, after which pusher 74 will engage the right end of this following card and shift it laterally to position H.

The relationship between the movement of the pusher 74 and the other card feeding devices is indicated in Fig. 48, where it is seen that the initial movement of pusher 74 takes place immediately after the pusher 55 has moved the card from its H to its A position to shift it from such A position to its E position. Thereafter, the pusher 55 swings back out of the way of the next advancing card and the pusher 74 also swings back out of the way of the next card, which will feed into its D position as explained, and will be in such D position when pusher 74 moves back to its home position, carrying the second card from its D to its H position.

*Feed roller mechanism.*—Referring to Fig. 13, a second cam on shaft 66 designated 79 will rock spring urged lever 80 and through link 81 will rock bell crank lever 82 to push a pin 83 located to one side of the path of travel of the card against spring loaded arm 84 carrying pressure roller 85 (see also Fig. 14). The roller 85 is in line with the card feed wheel 86 whose location is indicated on Fig. 14, where it engages one edge of the card and serves as the sole advancing means to step the card from the E position across the punching line under control of escapement mechanism to be explained hereinafter. Again, the timing is such that, as indicated in Fig. 40, the pressure roller 85 is raised out of engagement with the feed roller 86 at the beginning of the cycle and held open while the card pushers 55 and 74 advance the card from H to its A and then to its E position and, while pusher 74 is in its advanced position gripping the trailing end of the card, the roller 85 is lowered to press the card against feed roller 86. After the card has been gripped between the roller 85 and feed wheel 86, the pusher 74 moves back to its opposite extreme position leaving the card held by the pressure roller and wheel.

From this point on, the card will be advanced step by step or column by column, under control of the wheel 86 and the mechanism for doing this will now be described.

*Escapement mechanism.*—Referrfing to Figs. 6 and 11, the constantly running gear 20 on shaft 21 has integral therewith a bevel gear 87 which through a like gear drives a shaft 88 whose opposite end has a gear 89 secured thereto which through an idler gear 90 (Fig. 3) drives a gear 91 freely mounted on shaft 92.

Referring to Figs. 6 and 12, the gear 91 is flanked on both faces by rings 93 of friction material, one of which rings abuts a gear 94 secured to shaft 92 and the other abuts a disk 95 pinned to the shaft for rotation therewith but arranged for slight movement axially upon such shaft. Bearing against the outer face of disk 95 is a cupped leaf spring 96 which urges the parts toward the right as viewed in Fig. 6 against the gear 94, so that there is a frictional drive from the constantly running gear 91 through the friction rings 93 tending to drive gear 94 which is normally held against such rotation by the escapement mechanism, to which it is geared through the following chain.

Gear 94 meshes with a gear 95 (Figs. 3 and 12) secured on a stud 96, which gear drives gear 97 on a shaft 98 which in turn through an idler 99 drives gear 100 (Fig. 2) secured to shaft 101 upon which the escapement wheel 102 is also secured as well as the aforementioned feed wheel 86. The wheel 102 is provided with ratchet teeth that engage with the armature 103 of escapement magnet 104. Through the chain of gearing just traced, it will be noted that constantly running drive gear 91 turns in a counterclockwise direction as viewed in Fig. 3, so that gear 100 and ratchet 102 (Fig. 2) are urged in the same direction through the friction drive coupling but are constrained against such movement by engagement of armature 103 with one of the teeth of the ratchet.

Control circuits for magnet 104 are provided to momentarily energize this magnet, freeing the ratchet for advance under the frictional drive and for deenergizing the magnet in time so that it is returned by its spring 105 to engage the next succeeding tooth of the ratchet. This single tooth advance of the wheel constitutes a step or column of advance of the record card past the line of punches.

Shaft 101 has secured thereto card feed wheel 86 which, as explained, grips the front or lower edge of the card and is provided with serrations about its periphery. These serrations are in the form of finely cut V-shaped teeth which in cooperation with the pressure roller 85 grip the card firmly. It is to be particularly noted that feeding is effected by simply rotating this single feed roller traversing one margin of the card and, as the card is advanced, the resilient guide 64 urges it with a constant pressure against the stationary guide rail 58.

As the card moves toward the reading line, a further resilient guide 64a urges it against the stationary guide rail 58a (Fig. 1), so that the card is kept in alignment against such fixed rails throughout its travel. It has been the practice heretofore in machines of this type to provide a pair of feed rollers, each of which traverses one of two opposite margins of the card at the punching line. With such arrangement, a slight irregularity in card dimension, whereby the card was not perfectly squared along the axis of the pair of rollers, would cause it to feed on a bias and thus punchings would be inaccurately located. Applicants discovered that by providing a single feed roller this difficulty was overcome in that with a single thin roller a card, if slightly askew, would be able to in effect pivot about the point of driving contact and under the influence of the guide bars swing into proper alignment.

Figure 2:
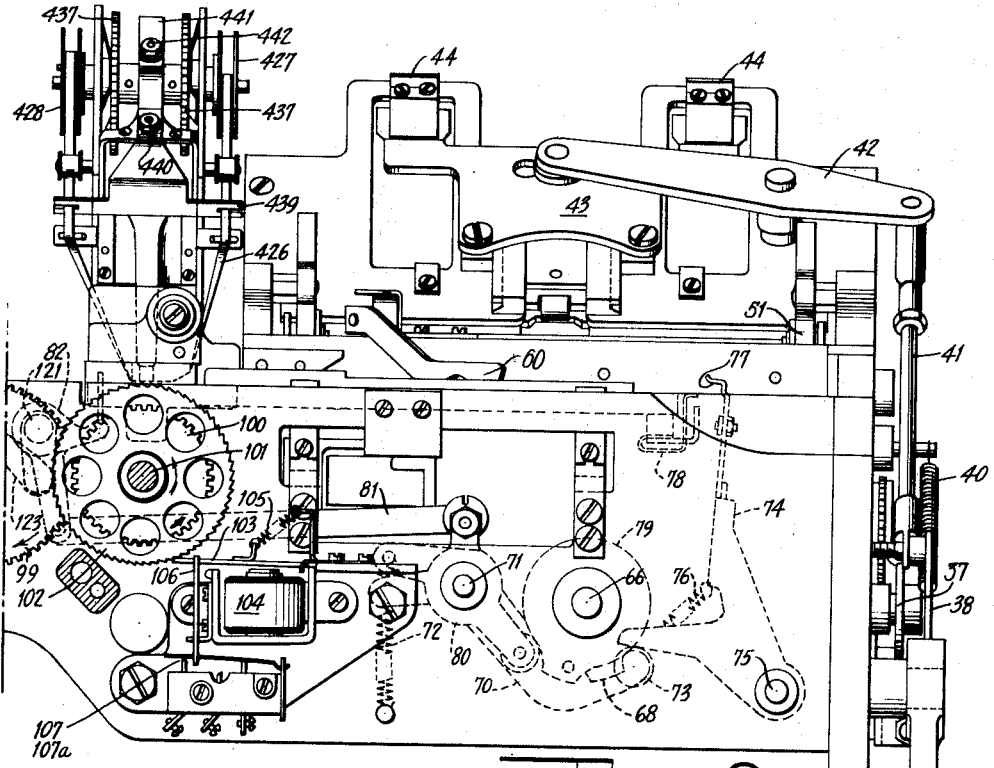
Fig. 2 is a front elevation looking in the direction of lines 2—2 of Fig. 1.

When it is required to advance the card a greater distance than the spacing between successive columns, the magnet 104 is held energized for the required extent so that the shaft 101 and feed wheel 86 will make a continuous movement to advance the record card for the required distance. In Figs. 2 and 14 the armature 103, when attracted by its magnet, will depress an interposer 106 to close two pairs of contacts 107 and 107a whose functions will be explained in connection with the circuit diagram.

As noted in Figs. 6 and 11, the shaft 92 carries a card feed wheel 86a similar to the wheel 86 and located to engage the card at the reading position F with cooperating pressure roller 85a. It will be noted that the shaft 92 through the gearing traced is connected for step-by-step movement with shaft 101 so that, when wheel 86 advances, the companion wheel 86a moves likewise under control of the escapement magnet 104 to concurrently advance a pair of cards past the punching and reading lines 11 and 12, respectively (see Fig. 17).

*Back spacing mechanism.*—Referring to Fig. 27, the gear 91 which is part of the escapement chain has adjustably connected thereto a disk 108 having ratchet teeth around the greater part of its periphery. A spring urged pawl 109 is located in the plane of the disk 108 and normally held out of engagement with the ratchet teeth by a pin 110 in the back space key 111. When it is desired to back space the cards at the punching and reading stations, key 111 is depressed to move pin 110 downwardly, which will permit spring 112 to rock lever 113 counterclockwise. The constantly running gear 91 has driving connection with a gear 115 freely mounted on shaft 96 which has a four lobed cam 116 integral therewith and lying in the plane of lever 113. When the back space key is operated, the nose of the lever 113 rocks into the path of the high points of cam 116, so that the lever is forcibly rocked in a clockwise direction to draw pawl 109 which now engages ratchet 108 downwardly to retract the disk 108 one tooth or step in a clockwise direction, whereby through the connections traced the several gears 94, 95, 97, 99, 100 and also the escapement ratchet 102 will be stepped back one tooth. The card feed wheels 86 and 86a will be likewise moved to effect one step of retrograde movement of the parts.

It will be apparent, of course, that if back space key 111 is held depressed, such backward stepping will be repeated until the unnotched part of the periphery of disk 108 arrives at pawl 109. A contact device designated 117 in the form of a microswitch is provided in Fig. 27 to operate contacts when the back space key is depressed.

*Third card feed cycle.*—The mechanism thus far described serves to advance the record card from the hopper 10 to the punching line 11 and then to advance it step by step past the punching position. After all columns have passed such position, the card will have its leading edge above the roller 118 (Fig. 8). This roller is mounted on a rod 119 whose opposite end has a gear 120 secured thereto which meshes with the constantly running gear 115 (see Figs. 3 and 27). The advance of the card from this position to the F position of Fig. 17 to bring the first column of the first card to the reading line 12, is effected during the card feed cycle of operation, and is concurrent with the advance of the next following card from the H position to the E position, and also with the advance of the third card from the hopper 10 to the H position. The mechanism involved will now be explained.

Figure 3:
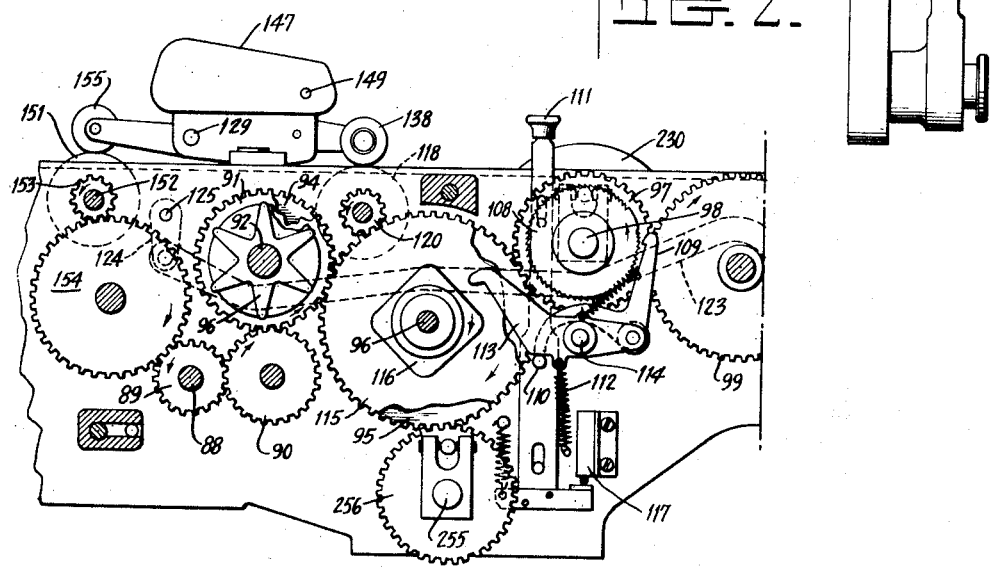
Fig. 3 is a front elevation looking in the direction of lines 3—3 of Fig. 1.

Referring to Figs. 2, 3 and 13, the bell crank 82 which was rocked during a card feed cycle as previously explained is secured to a rod 121 which also carries an arm 122 connected by link 123 to a similar arm 124 attached to a rod 125, so that when rod 121 is rocked during the card feed cycle, the companion rod 125 will be similarly rocked. The latter rod has an arm 126 (Figs. 15, 18, 19) secured thereto which operates on a vertically guided pin 127 to elevate it concurrently with the elevation of pin 83 of Fig. 13.

In Figs. 19 and 15, the pin 127 engages a lever 128 secured to rod 129 rocking it counterclockwise, so that the short arm of this lever engages the free end of a lever 130 freely supported on a rod 131 and biased downwardly by a compression spring 132. The lever 130 has pivoted thereto pressure roller 85a which normally presses the card passing the reading station against the feed wheel 86a. As a result, the pressure roller 85a is raised slightly from contact with the card. Rocking of rod 129 will also rock an arm 133 secured thereto from the position of Fig. 19 to the position of Fig. 15, where adjustable screws 134 (Fig. 18) are moved away from levers 135 and 136. These levers are normally biased to rock in opposite directions by springs 137, so that upon rocking of arm 133 lever 136 is tilted about rod 131 upon which it is freely mounted to bring the roller 138 into engagement with the card to press it against constantly rotating feed roller 118. This will cause the card to be rapidly advanced toward the left, as viewed in Fig. 15, until it is interrupted by a stop 139 which is lowered into the path of the card from the position of Fig. 19 to that of Fig. 15 concurrently with the elevation of pressure roller 85a. This lowering is effected through the following connections.

The arm 133 has a link 140 pivoted thereto at 141 and its opposite end is bifurcated to straddle a pin 142 in an arm 143 secured to rod 131. A spring 144 serves to urge pins 141 and 142 toward one another. Thus, as arm 133 is rocked counterclockwise to the position of Fig. 15, link 140 will move therewith and through spring 144 will rock arm 143 and its connected rod 131, so that card stop 139 which is also secured to this rod will rock counterclockwise into the path of the card so that, when the leading edge of the card strikes the stop, roller 118 will slip against the under surface of the card and serve to hold it against the stop.

*Safety stop.*—A so-called safety stop arm 145 shown in Fig. 16 is provided which is freely pivoted on rod 129 and, when a card is passing the reading station, the free end of this arm rides along the upper surface of the card. When there is no card passing the reading station, the lever drops to the position of Fig. 16. The purpose of this lever is to limit the extent of manual insertion of a card at the reading station. As will be explained later in the operation of the machine, a preperforated record card may be manually inserted between rollers 138 and 118 and manually advanced toward the reading station. The lever 145 will, however, limit the extent of such manual insertion. To continue the advance of the card into the first column reading position, a card feed cycle must be effected during which roller 138 is lowered together with stop 139, and during this operation an arm 146 secured to the rod 129 will engage the under side of lever 145 to rock it out of the path of the card, so that the card may be advanced against the stop 139. The provision of lever 145 is for the purpose of locating the leading edge of the card far enough toward the right as viewed in Fig. 15, so that ample time is provided for stop 139 to drop in front of the card before roller 118 can advance it beyond such point.

*Manual release.*—The mechanism of Figs. 15 and 19 has a cover plate 147 extending across the top which is pivoted at 149, so that the plate may be rocked counterclockwise by manual pressure upon its upper surface. When this is done, a pin 150 will engage the longer arm of lever 128 to rock rod 129 therethrough, and in the same manner as explained for elevation of pin 127 pressure roller 85a will be raised and lever 138 will be lowered.

Plate 147, when tilted, will lower a second pin 150a into the path of an upstanding finger 143a of arm 143 to block the arm against counterclockwise rocking, with spring 144 yielding as rod 129 is rocked. Thus, rollers 118, 138 will advance the card uninterruptedly past the reading station for conveyance to the discharge hopper.

CARD STACKING MECHANISM

The first card is now advanced step by step past the reading line 12 as the second card concurrently passes the punching line 11. Thereafter, a fourth card feed cycle is initiated to cause the first card to be advanced to the stacking mechanism in the following manner.

*Fourth card feed cycle.*—In Figs. 15 and 11, there is shown a roller 151 secured to shaft 152 whose opposite end has a pinion 153 which, through an idler 154, is driven from the constantly rotating gear 89. When the lever 135 is rocked from the position of Fig. 19 to that of Fig. 15, a roller 155 will be lowered against the upper surface of the card to press it against the constantly rotating roller 151, and such card will be rapidly advanced toward the left, (see also Fig. 9) against a card stop 156, in which position the right end of the card will still be between rollers 151 and 155, which will thereupon slip on the card. This is the position designated C in Fig. 17.

*Card offsetting device.*—When it is desired to off-set the card, it is advanced to position G, and this is effected by lowering stop 156 to permit the card to advance under action of rollers 151, 155 to a fixed stop 157. Stop 156 has connection with a link 158 articulated through an arm 161 with the plunger 159 of a solenoid 160 (see also Fig. 7). Thus, when the solenoid is energized, stop 156 will be drawn below the plane of the card and, as an incident to such operation, arm 161 will be rocked clockwise as viewed in Fig. 9 to close a pair of contacts designated 162 (Fig. 7).

The time chart (Fig. 40) indicates the point in the cycle at which the card stops operate and also the points at which feed or slip rollers 138 and 155 engage the card. After the slip roller 155 is raised from the surface of the card, the card is to be shifted toward the right as viewed in Fig. 7. A guide lever 163 is normally in position to guide the card in its endwise movement, and this lever is freely mounted on a rod 164 (see also Fig. 10), which rod has secured thereto cam follower arm 165 with which the card pusher cam 166 cooperates. This cam is secured to shaft 167 which is driven through gearing generally designated 168 from the card feed shaft 21 which, as explained earlier, makes two revolutions for each card feed cycle. The gear ratio is such that the shaft 167 will accordingly make one complete revolution. As the cam 166 rotates from the position of Fig. 7 to that of Fig. 10, follower arm 165 will be rocked counterclockwise to rotate shaft 164 and through an arm 170 also secured to the rod lever 171 be rocked clockwise through the action of connecting safety spring 169 to the position of Fig. 10. This lever is secured to rod 172 to which a pair of pusher fingers 173 are also secured. The upper ends of these fingers extend into suitable openings in a pair of slides 174 which have upwardly extending portions 175 lying to the left of the card as viewed in Fig. 7. Thus, with the fingers rocked clockwise the slide 174 will move toward the right and extension 175 will shift the card in the same direction.

Accompanying this movement, the card guide lever 163 is rocked out of the path of the advancing card, and this is effected through link 176 extending between the lower ends of fingers 173 and lever 163, so that the parts shift from the positions of Fig. 7 to that of Fig. 10, in the latter of which it will be seen that the lever 163 has rocked clockwise so that its upper end is below the card line.

To the right of the card and secured on shaft 167 is the stacker drum which carries well known spring pressed card clips 177 pivoted at 178. As the clips move from their full line position in Fig. 7 to the dotted line position in Fig. 9, the camming surface 179 thereon will strike a fixed pin 180 which will cause opening of the clips so that the leading edge of the card will enter therebetween, after which the clips will ride from the fixed pin 180 and will close on the edge of the card to swing it through an angle of 90° into the stacker 13, where as the leading edge of the card passes the platform 181 the card will be stripped from the clips and, after completion of the revolution of shaft 167, the parts will be back to their normal position of Fig. 7.

The foregoing describes the specific manner in which the card is caused to be advanced from the supply hopper to the punching line, advanced past the punching line, then through a card feed cycle of operations, advanced to the reading line and from there through a further card feed cycle to the stacker.

PUNCHING MECHANISM

Referring to Figs. 8, 14 and 21, a row of twelve punches 182 of rectanguler cross section at their upper ends is mounted for reciprocation and spaced along the punching line at distances corresponding to the spacing of the twelve rows of punching positions of the record card. Each punch 182 is slotted to receive the rounded end of a lever 183. Freely pivoted on a rod 184, the left end of lever 183 has a bell crank 185 pivoted thereto at 186. The end of the bell crank normally engages with the hooked end of armature 187 controlled by magnet 188. A spring 189 serves to hold the latch in engagement with the armature and also serves to hold lever 183 in the position shown in Fig. 8. Upon energization of magnet 188, its armature 187 is rocked to release latch 185 which thereupon under the influence of its spring 189 will rock clockwise to swing its hooked end 190 beneath the actuating bail 191.

Extending across the upper edge of all the latches 185 is a bail 192 pivoted at 193 (see Fig. 21), so that when latch 185 is released for clockwise rocking the bail will be rocked about its pivot to cause closure of two pairs of contacts 194 and 195 (see Fig. 21) located above and at opposite ends of the bail. The function of these contacts is, respectively, to bring about an escapement operation and a cycle or revolution of operation of the punch shaft 196 which carries the mechanism for effecting an oscillation of bail 191, so that the latter on being engaged by the ends 190 of the selected latches 185 will rock the associated lever or levers 183 counterclockwise to elevate related punches 182 through the record card.

*One-revolution clutch.*—Referring to Fig. 11, the motor driven shaft 16 has belt and pulley connection 197 with a pulley 198 which is freely rotatable on shaft 196 (see also Figs. 20, 21 and 22). Secured to the shaft 196 is a stop cam 199 and extending between pulley 198 and the stop cam is a spring 200 coiled about and spaced from the extended hub of pulley 198. One end of this spring is fastened to the stop cam, and the other end is fastened to a sleeve 201. The sleeve is provided with a stop 202 which engages armature 203 of a magnet 204, while cam 199 has a stopping edge 205 engaging against a pivoted lever 206, which is urged toward the armature 203 by a connecting spring 207.

The parts just described constitute a well-known form of one-revolution clutch and, with the parts in normal position, with both stops 202 and 205 engaging their respective levers the spring 200 is held in slightly open position, so that the hub of pulley 198 may rotate freely within the spring.

Upon energization of magnet 204, armature 203 releases stop 202, whereupon spring 200 will tend to close, rocking sleeve 201 and gripping the hub of the pulley so that the spring will be driven thereby and through its connection with the stop cam 199 will drive shaft 196. If magnet 204 is deenergized before completion of a revolution, the stop 202 will reengage the armature to open the spring. The driven parts will be overthrown slightly, so that stop 205 will reengage lever 206, preventing reclosure of the coil spring.

Secured to shaft 196 is a pair of complementary cams designated 208 which, during the revolution of the shaft, will oscillate the bail 191 through the medium of rollers 209. As will be explained in connection with the circuit diagram, the magnets 188 may be selectively energized under control of the keyboard or under control of perforations in a card passing the reading station or under control of a card wrapped around a so-called duplicating drum, which is yet to be described.

As a result of energization of magnet 188 from any of these sources, punch lever 183 will be coupled to the bail 191 which, upon oscillation of shaft 196, will effect the punching operation during which the magnet will be deenergized so that, when the bail restores to the position of Fig. 8, latch 185 will reengage and be restored by the armature to the position shown. For restoring the magnet armatures 187, springs 187a are provided, and as a further means, a bail 208a is provided (see Fig. 8) which is pivoted at 209a and has a spring urged lever 210 with which a cam 211 on shaft 196 cooperates to effect positive restoration of the magnet armatures.

It is to be particularly noted that, if a magnet 188 is reenergized before the bail 191 has returned to its position of Fig. 8, the bell crank latch 185 will not be caused to return to its initial position, but will remain coupled to the bail and will also close the contacts 194 near the end of its return movement to initiate another punching cycle. The timing of the cycle is such that the operation just stated occurs when a code punching position is in a given column and is called for in the next succeeding column according to any of the controlling means, such as the keyboard control, the card passing the reading station, or the card wrapped around the duplicating drum. Bail 191 does not return to its home position of Fig. 8 until the magnets 188 are energized for the next punching cycle. If the same magnet 188 is selectively called into operation under any of the controlling means, repeat punching will occur with the minimum of motion of parts. Thus, in repeat punching the interposer remains coupled to the actuator, since magnet 188 remains continuously energized between the repeated cycles of operation.

CARD READING MECHANISM

Concurrently with the punching operation in the column of the card at the punching line, there is a reading operation of a column of a card at the reading line with the parts so coordinated that, as any column is being punched, the next higher column in the card at the reading station is read or sensed by mechanism shown in Figs. 8, 6 and 29. This mechanism comprises a row of twelve double pins best shown in Fig. 29, where in each of the twelve sensing positions a pair of flat pins 212 pass through a guide opening 213 in bail 214 which is secured to shaft 215. The lower ends of the pair of pins have shouldered offsets 212a extending in opposite directions and carrying insulating buttons 216 that rest upon spring contact blades 217 which separately bias the pins of a pair upwardly. In the normal position of the parts, the bail 214 bears against the shouldered portions 212a to hold the pins in their lowered position against the upward urge of spring 217. When a card column is in position to be sensed, bail 214 is rocked counterclockwise as viewed in Fig. 8 through a link 218 suitably guided and having a roller 219 acted upon by a cam 220 secured to shaft 196. The cam through link 218 will permit spring 221 to rock bail 214 counterclockwise into sensing position, and the cam will thereafter positively return the parts.

Each pair of pins is separated at its upper end by a stationary rectangular rod 222 which extends between all the pairs of pins as seen in Fig. 29 to effect a lateral spacing of their upper ends. This is to permit the pins to respond to holes that may be slightly out of register as illustrated in Figs. 30 and 31, where in the former figure the perforation in a record position is designated at P and is centered above the pair of pins 212, so that when they rise both will pass through the opening P.

In Fig. 31 the perforation P is not centered on the pair of pins but is shifted so that it exposes only one of the pins. Accordingly, when this pair attempts to rise under the influence of the related springs 217, the lower one will be blocked by the card but the upper one is free to move up independently. The springs 217 are conductive and serve to close contacts designated 223, one side of which has common conductor plate 224 suitably insulated from the machine. Each pair of related springs 217 extends into a common U-shaped strip having a terminal 225 through which suitable connections are made to the machine circuits.

Located about centrally of the sensing line is a lever 226 pivoted at 227 and biased clockwise by a blade spring 228. The card passes above this lever and in doing so will engage and rock it in a counterclockwise direction to the position of Fig. 29, where its depending arm is swung clear of the edge of bail 214. When no card is in sensing position, this lever occupies the position of Fig. 8 where its depending arm lies directly above the right hand edge of the bail and will prevent raising of the pins when there is no card at the reading station.

From the foregoing, it is to be noted that the sensing pins 212 and the punches 182 are operated concurrently from the common drive shaft 196. With a column of one card at the punching line, the next higher column of the preceding card is at the reading line, so that while the first column is being punched the second column is being sensed, and through circuit connections to magnets 188 a new punch selector setting is made while the punching is in progress. Accordingly, upon completion of a revolution of punch shaft 196 a second revolution may ensue without interruption, with a resulting increase in operating speed of the machine.

PROGRAM DRUM

Referring to Figs. 11, 27 and 24, the shaft 98 which is part of the gear chain controlled by the escapement mechanism extends toward the rear of the machine and has removably mounted thereon a so-called program drum 230. Secured to the shaft is a disk 231 having a cupped spring 232 secured thereto which cams over a beveled ring 233 on the hub of the drum 230 to hold the drum in the position of Fig. 24. The drum may be removed from the shaft simply by gripping it and drawing it toward the left, whereupon the ring 233 will cam the spring blades 232 outwardly and permit such removal.

The drum 230 is arranged so that a standard size record card may be wrapped around it and held in place by the following devices. As seen in Figs. 17e, 23, 24 and 25, a thin metallic strip 234 extends longitudinally and is integral with the drum to provide a slot into which one end of the card may be inserted. Blade springs 235 have one end of each secured to the inner wall of the drum and are normally biased so their free ends, which are sharpened, engage the under surface of the card ends to hold them in position. A rod 236 supported on the drum extends longitudinally and is provided with cam knobs 237 located so that, when the rod 236 is rocked into the position of Fig. 17e by means of handle 238, the springs 235 holding one end of the card will be cammed out of contact therewith so that this end of the card may be inserted or removed. In placing a card about the drum, the parts are first brought to the position of Fig. 17e and one end of the card inserted between the drum and plate 234 as shown. While held in such position, rod 236 is rocked so that the springs 235 are released to engage and hold the inserted end and other knobs engage the springs associated with the opposite end to rock them away from plate 234.

The card is then wrapped around and the opposite end inserted in position, after which the rod is rocked to its final position of Fig. 25, where the knobs 237 are out of engagement with the springs 235. A further detenting spring 239 (Fig. 23) is provided to resiliently maintain the rod in positions to which it is moved.

As noted in Fig. 24 rod 236 extends slightly toward the right of drum 230 so that, when the drum is slipped upon shaft 98, the rod engages with a hole 240 in disk 231 for locating purposes and also serves as a driving connection between the shaft and the drum.

*Star wheel sensing device.*—Extending across the top of the drum is a row of sensing devices of which twelve are provided, one for each of the twelve rows of perforating positions in the card, and arranged so that as the drum and card thereon to move step by step the card column will be at sensing position concurrently with the location of corresponding columns in the record card at the previously described reading station identified as line 12 in Fig. 17. In this figure the card wrapped around drum 230 is diagrammatically shown, and the reading line is designated as 241. The star wheel sensing device is of the type shown and described in patent application of J. M. Cunningham, Serial No. 770,349, filed August 25, 1947, now U. S. Patent No. 2,517,984, issued August 8, 1950, wherein it is claimed, and a brief description thereof will be given herein.

For each row of perforating positions in the card, there is provided a lever 242 (Figs. 25 and 26) pivoted at 243 to a stationary block 244. Each lever has pivoted thereto a 5-point star wheel 245 which bears against the card on the drum 230 under the influence of a contact spring 246 which engages the opposite end of lever 242, biasing the lever counterclockwise as viewed in Fig. 26. With an imperforate portion of the card beneath the wheel 245, the wheel rests thereon as in Fig. 25 and, as a perforation in the card moves by, a tooth of the wheel will roll therein to be carried along by the edges of the hole to the position of Fig. 26, wherein the pivot point of the star wheel is dropped toward the center of the drum, permitting counterclockwise rotation of the lever 242 and consequent movement of contact spring 246 into engagement with fixed contactor 247.

Where there are perforations in the same row in successive program card columns, the star wheel 245 will drop into the first perforation and close contacts 246, 247. The wheel will then roll into the next perforation without elevating the pivot of the wheel and consequently the contacts 246, 247 will remain closed for the extent that there is a succession of adjacent perforations.

The card wrapped about drum 230 is called the program card (see Fig. 41) and is provided with perforations in rows and columns so as to close contacts 246, 247 at predetermined positions of the cards passing through the machine, and these contacts will complete circuits for controlling spacing, skipping and other functional operations as will be particularly pointed out in connection with the circuit diagram.

In Figs. 25 and 26 a bail 248 extends across the ends of levers 242. This bail is pivoted at 249 and has a lateral extension 250 lying in the plane of a lever 251 which is pivoted at 252 (Fig. 23). In its normal position, an arcuate side of the lever 251 (see also Figs. 24 and 26) rides to the left of the shoulder on the drum 230 to lock it against removal from shaft 98. Thus removal of the drum is prevented until lever 251 has been rocked counterclockwise to the position of Fig. 23. Upon such rocking the upper extremity of lever 251 will bear against the extension 250 of bail 248 and the bail will engage and rock all the levers 242 to raise their wheels 245 above the drum, so that the drum in its removal and reinsertion will not damage the wheels. Pivoted to the lever 251 at 253 (Fig. 26) is a spring urged finger lever 254 which may be manually engaged and pushed toward the right as viewed in Fig. 26, until a notch 255 therein reaches over a stationary pin 256, whereupon the lever will snap over the pin to hold lever 251 in its drum releasing position, where it will remain until fingerpiece 254 is engaged to release the latching connection.

DUPLICATING DRUM

A second drum exactly similar to that just explained is provided and shown in Fig. 23, where it is designated 230a and is mounted on a shaft 255 in the same manner as drum 230. This shaft (Figs. 11, 3 and 27) has a gear 256 secured thereto which meshes with the gear 95 in the escapement chain, so that it rotates step by step in unison with the program drum 230 and also traverses a set of sensing wheels designated 245a in Fig. 23, which are responsive to perforations in the duplicating card as it passes a reading line designated 257 in Fig. 17 to close contacts similar to the ones described for the program drum, and which will control circuits to operate the punches in accordance with data perforated in this so-called duplicating card that is wrapped on drum 230a.

PRINTING MECHANISM

Located on the punching line 11, that is, in line with the row of punches 182, is a group of wires 258 (see Figs. 14 and 28) with the ends thereof disposed in a rectangle, five wire diameters in width and seven wire diameters in length. The ends of these wires constitute a so-called wire printing device which is similar to that described and claimed in the U. S. Letters Patent No. 2,524,127 issued to R. B. Johnson on October 3, 1950. Between the ends of the wires 258 and the record card is an ink ribbon 259 through which impressions are made along the upper margin of the card. With the card positioned at the row of punches, as already explained, the punches will be operated singly or in combination to effect the code perforations and, as each hole or combination is punched in any column, wires 258 will be actuated to print a pattern of the character corresponding to the hole or combination of holes punched. These wire patterns are printed as tangential dots in part of their outline and, due to the tendency of the ink pressed from the ribbon to spread slightly, these portions of the outline will have the appearance of a continuous line.

*Slide positioning devices.*—Referring to Figs. 8 and 14, the lower end of each punch 182 is of a reduced diameter constituting a stem 260 which provides a shoulder 261 upon which a block 262, slidable on the stem, abuts. A spring 263 bears against a collar 264 attached to the lower end of stem 260 and serves to press the block 262 against shoulder 261. With such construction, the block 262 reciprocates with the punch 182, with the block being drawn upwardly through spring 263 and returned downwardly by shoulder 261. Each block 262 has lateral extending flanges 265 at its opposite extremities between which a stationary bar 266 extends on one side and a stationary bar 267 extends on the opposite side. These bars are suitably secured to the framework of the machine, and are dimensioned vertically so as not to interfere with the reciprocation of the blocks 262.

Each block has an interposer 268 positioned between flanges 265 on one side or the other (see Fig. 8) and disposed in the space between bar 266 and a stationary plate 269 or a bar 267 and an opposite plate 270, so that as the block is reciprocated its related interposer 268 also moves up and down in the space between the bar and the plate. The interposer 268 is freely disposed between the flanges 265 so that it may slide laterally. Bar 266 and its related plate 269 are each provided with oppositely facing channels 271 into which rollers 272 extend. Bar 267 and its related plate 270 are similarly channeled to receive rollers 273. These rollers are free to shift laterally in the channels.

Referring to Fig. 28, rollers 272 farthest to the right abut against a fixed stop 274 and the ones farthest to the left abut the slide 275. In line with this slide is a short slide 276 urged by spring 277 against a pin 278 in a lever 279, so that pressure exerted by spring 277 urges all the rollers 272 and interposers 268 therebetween toward the right, as viewed in Fig. 28. On the opposite side of blocks 262 there is a similar arrangement including a fixed stop 280 on plate 269, slides 281, 282, a roller in lever 283 and a spring 284.

In Fig. 28 these parts are shown diagrammatically in exaggerated space relationship and numbered to indicate the particular related punches. Thus, the 12, 11, 0 and 8 punches, when operated, each move up a single interposer 268 of the rear or upper set. The 1, 2, 3, 4, 5 and 7 punches, when operated, each move up a single interposer 268 of the lower or forward set. The 6 and 9 punches, when operated, each move up a pair of interposers, one in each set.

The several interposers 268 have variously configured vertical camming edges, some of which, when the interposer is moved up, will increase the space between adjacent rollers and shift slides 275 and 281 to the left. Others will decrease this distance so that slides 275 and 281 move to the right under the influence of their respective springs 277 and 284.

Slide 275 may move one, two or three steps to the right and one, two or three steps to the left as indicated by the scale while slide 281 may move one, two, three or four steps to the left and one, two or three steps to the right. The several interposers are marked $+1$, $+2$, $+3$ and $+4$ to indicate that, when one of these is elevated, it will shift its related slide one, two, three or four steps to the left, those marked $-1$, $-2$, $-3$ will permit their slides to shift one, two or three steps to the right. Thus, if the 12 punch 182 is operated, the left hand interposer in the upper row is elevated to bring its portion of least width into alignment with the rollers 273, decreasing the spacing and allowing slide 281 to shift one step to the right.

In the following table are listed separately for each possible character to be printed the punching combination and the distance moved, together with the direction taken of the slides 275 and 281.

| Character | Punches | Slide 281 | Slide 275 |
|---|---|---|---|
| A | 12, 1 | $-1$ | $-1$ |
| B | 12, 2 | $-1$ | $-2$ |
| C | 12, 3 | $-1$ | $+1$ |
| D | 12, 4 | $-1$ | $+2$ |
| E | 12, 5 | $-1$ | $-3$ |
| F | 12, 6 | $+3$ | $-2$ |
| G | 12, 7 | $-1$ | $+3$ |
| H | 12, 8 | $+3$ | 0 |
| I | 12, 9 | $+3$ | $-1$ |
| J | 11, 1 | $-2$ | $-1$ |
| K | 11, 2 | $-2$ | $-2$ |
| L | 11, 3 | $-2$ | $+1$ |
| M | 11, 4 | $-2$ | $+2$ |
| N | 11, 5 | $-2$ | $-3$ |
| O | 11, 6 | $+2$ | $-2$ |
| P | 11, 7 | $-2$ | $+3$ |
| Q | 11, 8 | $+2$ | 0 |
| R | 11, 9 | $+2$ | $-1$ |
| S | 0, 2 | $-3$ | $-2$ |
| T | 0, 3 | $-3$ | $+1$ |
| U | 0, 4 | $-3$ | $+2$ |
| V | 0, 5 | $-3$ | $-3$ |
| W | 0, 6 | $+1$ | $-2$ |
| X | 0, 7 | $-3$ | $+3$ |
| Y | 0, 8 | $+1$ | 0 |
| Z | 0, 9 | $+1$ | $-1$ |
| 0 | 0 | $-3$ | 0 |
| 1 | 1 | 0 | $-1$ |
| 2 | 2 | 0 | $-2$ |
| 3 | 3 | 0 | $+1$ |
| 4 | 4 | 0 | $+2$ |
| 5 | 5 | 0 | $-3$ |
| 6 | 6 | $+4$ | $-2$ |
| 7 | 7 | 0 | $+3$ |
| 8 | 8 | $+4$ | 0 |
| 9 | 9 | $+4$ | $-1$ |
| & | 12 | $-1$ | 0 |
| % | 8, 4, 0 | $+1$ | $+2$ |
| # | 8, 3 | $+4$ | $+1$ |
| $ | 8, 3, 11 | $+2$ | $+1$ |
| * | 8, 4, 11 | $+2$ | $+2$ |
| ☐ | 8, 4, 12 | $+3$ | $+2$ |
| / | 0, 1 | $-3$ | $-1$ |
| - | 11 | $-2$ | 0 |
| , | 8, 3, 0 | $+1$ | $+1$ |
| . | 8, 3, 12 | $+3$ | $+1$ |
| @ | 8, 4 | $+4$ | $+2$ |

*Printing plate positioning mechanism.*—In the foregoing manner, the punching of each character hole or combination of holes will be accompanied by a different positioning of slides 275 and 281 in either a leftward or rightward direction. In Figs. 14 and 28, the slide 281 will position lever 283 on rod 287 to move a pin 288 vertically (see also Fig. 23) and through spring connection 289 with a plate 290 the latter is positioned vertically. At its upper end, plate 290 has arms 291 which at their outer ends carry rollers fitted into suitable notches in the printing plate 292. Accordingly, through these connections the plate 292 is moved up one, two, three or four steps as slide 281 is moved toward the left and will descend one, two or three steps accordingly as slide 281 is moved toward the right.

The slide 275 through pin 278 and arm 279 (see also Fig. 23) will rock a rod 293 whose upper end has an arm 294 carrying pin 295 extending into a vertical slot in the printing plate 292, so that the plate is positioned toward the left as viewed in Fig. 28 in accordance with the leftward positioning of slide 275 and is positioned toward the right in accordance with the rightward positioning of the slide. Thus, for each of the forty-seven characters indicated in Fig. 5 the plate 292 will be adjusted into forty-seven different positions from its normal home position to print any selected character.

KEYBOARD

The keyboard shown in Fig. 32 is a separate mechanical unit connected to the punch through electrical connections. Its mechanical construction is similar to that of the keyboard shown in the copending application of James M. Cunningham et al., Serial No. 61,662, filed November 23, 1948, now U. S. Patent No. 2,566,931, issued September 4, 1951. The keys 320 are arranged in conventional manner for operation by a typist for the letters of the alphabet and the symbols in the lower half of the upper row of key caps. Thus, for alphabetic operation two-hand manipulation is possible by a trained typist. The keys representing the numerals 1 to 9 are arranged within the outline 321 in three horizontal rows and four oblique columns for one-hand operation by an operator trained in the use of the well known types of key punches.

Heretofore, in alphabetic key punches two separate keyboards have been provided, one for typists' use and the other for key punch operators' use. By rearranging the character locations as in Fig. 32, a composite keyboard is obtained which is suitable for both classes of operation with the numeric keys located in substantially standard positions. Such composite keyboard is shown and claimed in the copending application of R. B. Johnson, Serial No. 104,462, filed July 13, 1949.

A key 322 designated "Num," when operated, will render the machine responsive to operation of the numeric section of the keyboard and to the upper special characters on others of the key caps. A key 323 designated "Alpha," when operated, will render the machine responsive to the alphabetic keys 320. The keyboard also includes several functional keys such as key 324 designated "Off Stack," which will control the offsetting of a card in the stacker, key 325 designated "Card Feed," key 326 designated "Alt Prog" for controlling alternate programming, key 327 designated "Reg" for controlling card registration, a release key 328 designated "Rel," two "Skip" keys 329 and 330, key 331 designated "Aux Dup" for auxiliary duplicating, and key 332 designated "Dup" for duplicating. In addition, there is the usual space bar 333. Each of the keys is suitably supported for vertical movement and is normally biased upwardly by a spring 334 (see Fig. 35). Each of the keys on the keyboard except keys 322, 323, and 332, when depressed, will rock a bell crank lever 335 to draw a connected link 336 toward the left. The space key 333 has similar bell crank connection to a link 336.

Figure 34:
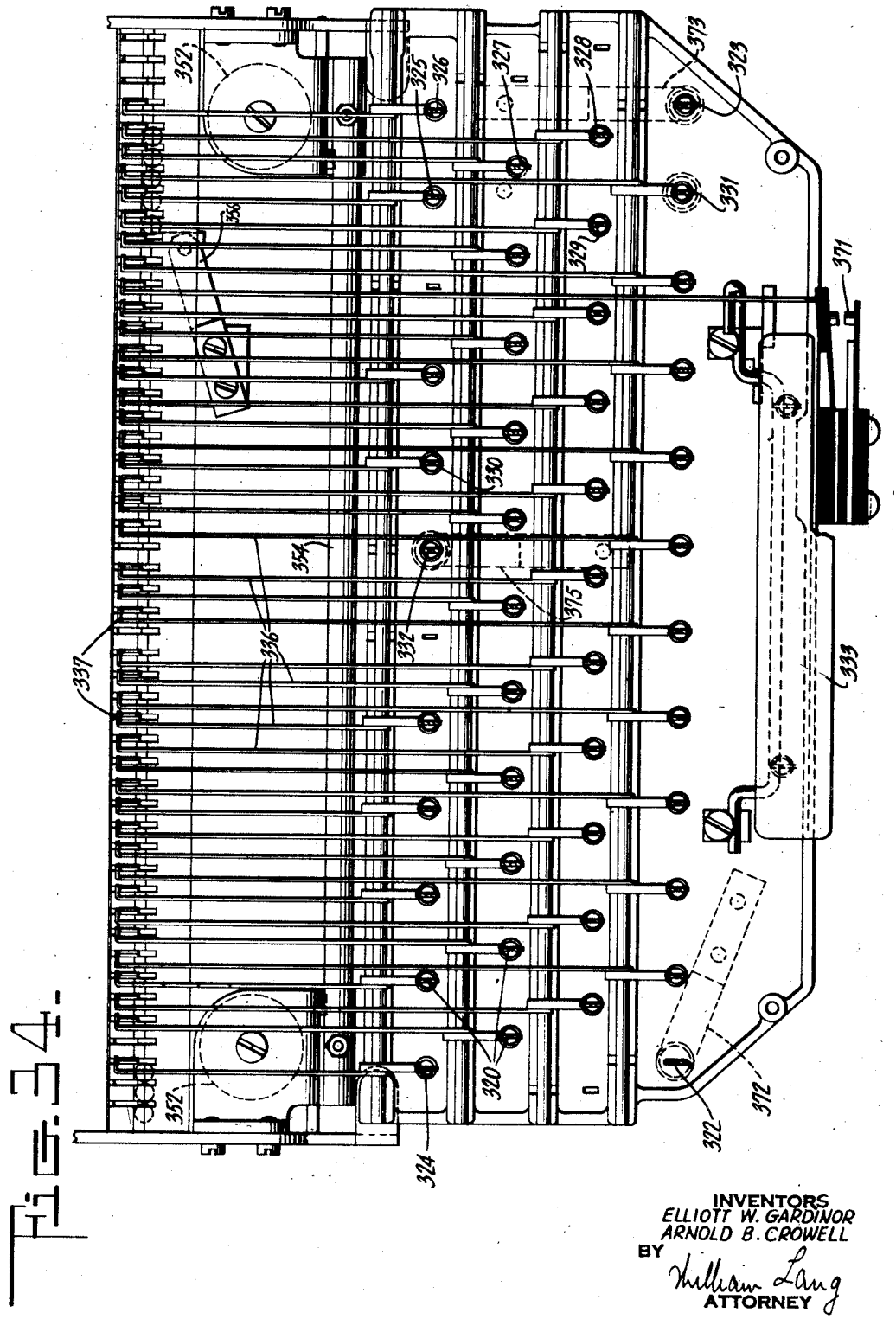
Fig. 34 is a plan section of the keyboard taken on lines 34—34 of Fig. 35.

Each link 336 has a right angle extension 337 at its upper end as viewed in Fig. 34 normally lying in a notch 338 of a latch 339 (see Fig. 36). This latch has a shoulder 340 resting upon a stationary cross bar 341 and is pivoted at 344 to a vertical slide 345. Thus, as shown in Fig. 36 the latch 339 serves to hold slide 345 in its upper position against the action of a spring 343 (see Fig. 35). Operation of any of the keys associated with links 336 will shift its related link to the left as viewed in Fig. 35 and the extension 337 will engage one side of notch 338 to rock latch 339 counterclockwise out of engagement with bar 341. Thereupon, the spring 343 will drive slide 345 down to the position of Fig. 37 with shoulder 340 of the latch passing to the left of bar 341 and bearing against it, due to the influence of a spring 346 compressed between slide 345 and latch 339.

The slides 345 are all provided with a series of notches into which the fingers 347 of a set of fourteen plates 348 extend. Each plate is integral with a rod 349 mounted for oscillation in end plates 350 (see Figs. 32 and 38). Thus, when a slide 345 is lowered, it will through engagement of the upper edge of a notch or notches cause one or more fingers 347 to rock the related rods 349. In Fig. 38 the rods 349 are numbered 0, 1, 2, 3, 4, 5, 6, 7, 8, 9, 11, 12, 14, 15, and the fingers 347 are arranged combinationally so that, when a particular character key is operated, the rods 349 corresponding to the combination for that key, as set forth in the following table, will be rocked:

| Character | Rods 349 Rocked |
| --- | --- |
| A | 12 and 1 |
| B | 12 and 2 |
| C | 12 and 3 |
| D | 12 and 4 |
| E | 12 and 5 |
| F | 12 and 6 |
| G | 12 and 7 |
| H | 12 and 8 |
| I and 2 | 12 and 9 |
| J and 4 | 11 and 1 |
| K and 5 | 11 and 2 |
| L and 6 | 11 and 3 |
| M and 7 | 11 and 4 |
| N | 11 and 5 |
| O and 3 | 11 and 6 |
| P and & | 11 and 7 |
| Q | 11 and 8 |
| R | 11 and 9 |
| S | 0 and 2 |
| T | 0 and 3 |
| U and 1 | 0 and 4 |
| V | 0 and 5 |
| W | 0 and 6 |
| X | 0 and 7 |
| Y | 0 and 8 |
| Z | 0 and 9 |
| # and @ | 8 and 15 |
| , and % | 8, 15 and 14 |
| $ and * | 8 and 15 |
| . and ⌑ | 8 and 15 |
| 0 and / | 14 |
| 8 | 8 |

Referring to Figs. 36 and 37, each slide 345 has pivoted at 344 and adjacent its latch 339 a spring pressed lever 351 which, when the slide is lowered, will assume the position of Fig. 37 where its upper extremity extends slightly above the left edge of notch 338. This lever is to guard against an inadvertent repeat operation when the operator may hold the key depressed in such a position that, when latch 339 is restored upwardly, it may be caught by extension 337 and held to the left. Lever 351 (see also Fig. 37a) prevents this by elevating extension 337 against the tension of leaf spring 342, if the link 336 is not in its restored position, and will maintain it out of the notch 338 until both the notch and extension are returned to the position of Fig. 36.

Restoration of the slides 345 is effected by a pair of magnets 352 (Figs. 32 and 35) whose armatures 353 secured to a rod 354 (see Fig. 34) when attracted will elevate bail 355 to engage extensions of latches 339 and concurrently raise and rock the latches from the position of Fig. 37 to that of Fig. 36. As shown in Fig. 35, the bail 355 has attached thereto an extension for opening a pair of contacts 356 when the bail is actuated.

Located beneath each of a number of the slides 345 is a pair of contacts 390 (Figs. 35 and 36) which are closed by the related slide when the latter descends and will accordingly remain closed until the slides are restored. These contacts are indicated in Fig. 32 where they are identified generally as 390 and in the circuit diagram (Figs. 39a, 39b and 39c) are specifically identified as associated with several of the keys as follows:

| Slide Contacts | Key |
| --- | --- |
| 360 | Reg. 327 |
| 361 | Card Feed 325 |
| 362 | 9 |
| 363 | 7, M |
| 364 | 6, L |
| 365 | 5, K |
| 366 | 4, J |
| 367 | 3, 0 |
| 368 | 2, I |
| 369 | 1, U |
| 370 | 0, / |
| 374 | Aux. Dup. 331 |
| 420 | Skip, 330 |
| 421 | $, * |
| 422 | Skip 329 |
| 423 | &, P |
| 424 | ⌑, . |

It will thus be noted that certain of the slides 345 rock rods 349 to close contacts 381 as explained in connection with Fig. 38. Others of the keys do not rock any rods but close contacts generally designated 390 and located beneath the slides, and others effect both a rocking of the rods to close contacts 381 as well as closure of associated slide contacts 390.

In Figs. 34 and 35, certain other keys control contacts as follows. The space key 333, when operated, will actuate its link 336 to close a pair of contacts 371. The numeral key 322 will open a normally closed pair of contacts 372. The alphabet key 323 will close a pair of contacts 373, duplicating key 332 will close a pair of contacts 375. These various contacts are shown in the circuit diagram (Figs. 39a, 39b and 39c) and their operation will be explained in connection therewith.

Referring to Figs. 32 and 35, each plate 348 on related rod 349 has a single rearwardly extending finger 380 and these are arranged in two vertical rows near the extremities of the rods (Figs. 33 and 38) with alternate fingers at opposite end for more convenient spacing. Each finger 380 extends beneath an insulated contact blade 381 normally out of contact with a common conductor 382 so that, when a rod is rocked, the related finger 380 will shift its blade 381 into contact with common conductor 382. Accordingly, the contacts 381, 382 are closed in combinations corresponding to the combinational arrangement of fingers 347 (Fig. 38) as in the table above and these contacts will close circuits to effect punching operations as will be explained hereinafter.

MISCELLANEOUS CONTACTS

*Card feed contacts.*—Referring to Figs. 5 and 12, the card feed drive shaft 33 carries a number of cams which operate circuit breakers or contacts which are generally designated with the prefix CF to indicate that they operate during card feed operations and their timing is shown in Fig. 43.

*Punch cams.*—Referring to Figs. 8 and 11, the shaft 196 is also provided with cams for operating a number of contacts prefixed P and their timing is also shown in Fig. 43.

In Figs. 23 and 24, the shaft 98 has an arm 384 freely mounted thereon and urged by a spring 385 against pin 386 in the disk 231 which is affixed to the shaft 98. Thus, as the drum is advanced clockwise as viewed in Fig. 23, the arm 384 travels therewith. The arm has a laterally camming extension 387 cooperating with which is a pair of spring pressed levers 388. Each of these is arranged to actuate a pair of contacts in the form of microswitches which are designated PR2, PR3. The configuration of the camming surface of 387 is such that through one of the levers 388 contacts PR2 will be closed when the drum has been advanced past the 80th column sensing position and will reopen eight steps later, before the column 1 position is at the sensing line. Contacts PR3 shift when the drum has advanced a column and a half past the 80th column position and restore six and a half columns later. The spring 385 is provided to permit the arm 384 to yield if the drum is moved in a retrograde direction to the column 1 position.

*Program handle contacts.*—In Fig. 23 the drum locking lever 251 carries a plate 425 which, when the lever is in drum releasing position, as in Fig. 23, will operate micro switch contacts 398 and 399 shown in the circuit diagram (Figs. 39b and 39c).

CIRCUIT DIAGRAM

The operation of the circuit diagram will now be explained with particular reference to a representative example, such as is illustrated in Figs. 41 and 42, of which the latter represents what may be termed a detail card in which punching and printing are to be effected as shown, and which is subdivided into multicolumn fields. The card 444 of Fig. 41 represents a program card which is wrapped about the drum 230 (Fig. 26) and whose manner of perforation will be particularly pointed out as the description proceeds.

As stated, this card is wrapped about the program drum, which is then positioned so that column 1 of the program card 444 is in reading position with respect to the star wheel sensing elements 245. Blank detail cards are placed in hopper 10 and the machine is in readiness to function.

*First card feed cycle.*—It requires two card feed cycles to advance a card from the hopper to the punching station. During the first of these, the card advances only to the intermediate position H of Fig. 17, and this is brought about as follows. Referring to Fig. 39a, current is supplied from suitable source through main line switch 400 to a full wave rectifier, generally designated 401, from which a plus line carrying 115 volts extends and is designated 402. The negative or zero voltage line is designated 403. The motor 14 is wired directly across the supply line and is, therefore, in constant operation when switch 400 is closed. The primary of a transformer 404 is also wired directly across the line, and its secondary winding serves to provide current for filaments 405 of the number of well known 25L6 tubes employed in the circuits. From the transformer a tube bias line of —35 volts designated 406 extends to the bias resistors 407 (Figs. 39b and 39c) of the several tubes designated with the prefix T, such as T1, T2, T3, etc.

Referring to Fig. 39b, operation of the card feed key 325 will close related slide contacts 361 and a circuit will thereupon extend from 0 line 403 to c contacts of relay R3, feed key slide contacts 361 (now closed), the card feed clutch magnet 28 to plus line 402. As has been pointed out, energization of this magnet will bring about a revolution of shaft 21 (Fig. 6). This shaft is geared at the ratio of 2:1 to the shaft 33 on which cam contacts CF are mounted. Of these, cam contacts CF2 close shortly after the beginning of the revolution and hold for the period indicated in Fig. 43, so that the card feed clutch will remain energized beyond the unlatching point and therefore goes through a second revolution. These two revolutions, as previously explained, constitute a card feed cycle and bring about a single revolution of shaft 33 and of the card feed cams prefixed CF, which will result in advance of the first card from the supply hopper to the H position (Fig. 17). During this cycle, contacts CF5 (Fig. 39b) close to energize the keyboard contact slide restoring magnet 352 to restore the keyboard-set contacts 361. The circuit extends from line 403, through contacts CF5 directly to the keyboard slide restoring magnet 352 and to line 402.

*Second card feed cycle.*—A second card feed cycle is now initiated in the same way by operation of the card feed key 325 and closure of the related slide contacts 361 related to this key, so that the card feed clutch magnet 28 is again energized to bring about a further revolution of shaft 33. During this cycle, the first card is advanced to the E position of Fig. 17 with the mechanical devices functioning to raise the pressure roller 85, so the card may feed to a position where the first column thereof is one step or column to the right of the line of punches, after which the pressure roller is permitted to descend and clamp the card against the escapement driven feed roller 86.

In moving to the H position and in the latter part of the first feed cycle, the card engages and closes the card lever contacts 62 (Figs. 5 and 39b) so that, when contacts CF4 close in the second card feed cycle, a circuit is completed from line 403 to contacts CF4, card lever operated contacts 62 and card lever relay R3 to line 402. This circuit extends through the so-called pickup winding designated P of this double wound relay, and its second or H winding provides a holding circuit extending from line 402, through the H winding of relay R3, its d contacts and normally closed program drum contacts PR3, which are now in the position shown, to line 403. These contacts PR3 remain in the position shown until the card has completely passed the line of punches.

*Key punch circuits.*—At the completion of this card feed cycle, the first detail card will be at the line of punches and the first column of the program card 444 will be in sensing position. It will be assumed that the first column of the detail card is to be key punched in accordance with the digit 4. The operator will accordingly depress the 4 key 320 (Fig. 32), resulting in closure of the slide contacts 366 (Fig. 39a) related to the J4 key, thus completing a circuit from line 403 (Fig. 39b), c contacts of relay R3 (now shifted), wire 445 (Fig. 39a), the restoring magnet contacts 356, c contacts of relay R4, common wire 408, J4 contacts 366, the 4 interposer magnet 188, winding P of relay R31 to line 402. Energization of magnet 188 as seen from Fig. 8 will trip the related interposer 190 and close contacts 194, 195 (Fig. 39b) to complete a circuit traceable from line 403, b contacts of relay R3 (now closed), interposer contacts 194, 195 in parallel, d contacts of relay R24, a half wave rectifier designated 409, c contacts of relay R23, c contacts of relay R22 to the grid of tube T4, thus short circuiting the bias resistor 407 and causing the tube to become conductive. The plate of this tube is connected to the escape magnet 104, whose other side is connected through wire 446 (Fig. 39c) and cam contacts P1 to line 402.

Escape magnet 104 will operate to advance the card one step to bring its first punching column beneath the row of punches 182, and upon energization it will close its contacts 107 and 107a, of which contacts 107a will short circuit the bias resistor 407 of tube T3, so that it becomes conductive to energize relay R22 through wire 446 and the cam contacts P1. This relay will thereupon open its c contacts in the grid circuit of tube T4, causing deenergization of the escape magnet before the card has advanced more than a single column or step.

Relay R22 also shifts its d contacts (Fig. 39c), completing a circuit from line 403 (Fig. 39b) to the b contacts of relay R3 (now closed), wire 447 (Fig. 39c), shifted d contacts of relay R22, to the grid of tube T7, rendering it conductive so that the punch clutch magnet 204 in the plate circuit thereof will be energized through contacts P1. This will result in tripping of the one revolution clutch, causing shaft 196 of Fig. 8 to make a single revolution during which the punch 182 in the 4 position will be reciprocated to punch a 4 hole in column 1 of the detail card.

Also as explained in the mechanical description, the operation of this 4 punch will position the printing plate 292 so that, concurrently with the punching operation, the appropriate group of printing wires 258 are selected and actuated to print a 4 in the upper margin of the card in line with column 1 as shown in Fig. 42.

A circuit is also traceable from line 403, b contacts of relay R3 (Fig. 39b), interposer contacts 194, 195, c contacts of relay R26, c contacts of relay R24, to fire tube T1, and through its plate circuit energize the keyboard restore magnet 352.

In Fig. 39c, relay R22 closes its a contacts to provide a holding circuit through punch shaft contacts P2 to prevent any reenergization of the escape magnet during the punching cycle.

The operator next depresses the 8 key 320 and the same sequence of operations is repeated to select the 8 punch, advance the card to its column 2 position, and then perforate and print the 8. In the same manner also, the remaining digits in the first field of the card, namely, 6, 3, 1, are punched and printed. This constitutes a simple punching operation where, for each key operated, the card is first advanced and then punched and printed upon.

*Automatic skip circuits.*—The next field of the card (columns 6 to 11) is to be skipped automatically, and accordingly the program card of Fig. 41 is provided with perforations in the 12 positions of the corresponding columns. The manner in which such automatic skipping is brought about under control of the program card is as follows. Keeping in mind that at this point column 5 of the detail card is in line with the punches, while the next higher column 6 of the program card is in line with the reading star wheels of the program device, so that the 12 star wheel will have dropped through the 12 hole in column 6 to close the related program contacts 246. This will complete a circuit from line 403 (Fig. 39b), b contacts of R3 (closed), wire 447 (Fig. 39c), normally closed back space switch contacts 117, d contacts of relay R23, wire 410 (Fig. 39b), the 12 program drum, contacts 246 (now closed) a contacts of relay R33, auto skip and duplicate switch 448 to the grid of tube T5, rendering it conductive to energize relay R24 in the plate circuit thereof.

It will be noted that the last key operation (to punch 1) resulted in the escape magnet 104 becoming energized and also the relay R22. The relay R24 through the circuit traced becomes energized as soon as the escapement is effected, and it shifts its d contacts and also its a contacts (Fig. 39b) to partially establish a circuit for reenergization of the escape magnet.

The circuit, to be presently traced, includes the c contacts of relay R22, and the escape magnet circuit includes contacts P1. The timing is such that during the key initiated successive escape and punch operation contacts P1 open before the c contacts of relay R22 close, so that when relay R22 is energized magnet 104 cannot be reenergized until after the punches have been reciprocated through the card. Thereupon, the circuit through the 12 contacts 246 (Fig. 39b) branches through the switch 448, a contacts of relay R24 (closed), the shifted d contacts of relay R24, through rectifier 409, c contacts of relay R23, c contacts of relay R22 to the grid of tube T4 to energize the escape magnet 104.

Thus, the 12 hole in column 6 of the program card 444 will reenergize the escape magnet upon completion of punching in column 5 and the card will advance to column 6. It is noted that the program card has a succession of 12 holes in the second field and, as explained in connection with the mechanical description, under such conditions the star wheel rolls from the one hole to the succeeding one, so that the related contacts 246 remain closed throughout the succession of holes. This results, in the circuit diagram, in maintaining the escape magnet 104 energized continuously, so that the card is advanced with a continuous motion until the star wheel rides out of the last 12 hole in column 11 to present column 12 of the program card to the star wheels, at which point column 11 of the detail card is in line with the punches. The opening of the 12 contacts 246 will break the circuit to the grids of tubes T5 and T4 and relay R24 as well as escape magnet 104 which will become deenergized and the card advance interrupted at this point.

During this automatic skipping operation, a pair of c contacts of relay R24 (Fig. 39b) are held shifted to complete a circuit from line 403, c contacts of relay R24 (shifted) to the grid of tube T1 to fire the tube and energize the keyboard restore magnet 352. With this magnet held energized, no slide contacts can be made effective during the skipping period. It will, of course, be understood that the number of 12 holes in the program card will be determined by the extent of automatic skipping desired, which may be one or more columns.

*X skip circuits.*—The third field of the card comprising columns 12 to 16 is to be X skipped, that is, the first column of the field (column 12) is to receive the so-called X or 11 punching and the remaining columns are to be automatically skipped. For this purpose the program card 444 in the corresponding columns is provided with punchings in the 11 position in all columns of the field, except the first, which is unperforated.

With this arrangement of programming, the field of the detail card may be key punched if desired or X skipped, or the data therein may be duplicated from the immediately preceding card. In the present case, of course, since this is the first card through the machine, there is no preceding card. If it is not desired to X skip this card, the operator would simply manipulate the keys as for the first field to effect punching and printing as explained for such first field.

In some accounting procedures, it is desired to have a definite indication that a field of a card is intentionally skipped, and this is done by perforating the 11 position in the first column of such card, and the field is generally termed an X skipped field. In some cases, however, it is not desirable to make this indicative punching, and the entire field is left blank. For the latter case, the operator will close the skip contacts 422 (Fig. 39a) through operation of key 329, which will complete the circuit from line 403, c contacts of relay R3 (shifted) (Fig. 39b), wire 445 (Fig. 39a), restoring magnet contacts 356, wire 411, skip key contacts 422, and pickup winding of X skip relay R27 to line 402. Relay R27 closes its c contacts (Fig. 39b), completing a circuit from line 403, b contacts of relay R3 (closed), c contacts of relay R27, d contacts of relay R24, rectifier 409, c contacts of relay R23 and R22 to the grid of tube T4 to energize the escape magnet 104.

If an X skip were desired, the operator would close the contacts 420 (Fig. 39a) associated with the key 330, whereby the initial circuit would extend from line 403, c contacts of relay R3 (Fig. 39b), wire 445 (Fig. 39a), keyboard restore contacts 356, wire 411, contacts 420, the 11 interposer magnet 188, d contacts of relay R4 and relay R27 to line 402. Thus, for the X skip condition the 11 interposer magnet 186 is energized along with the skip relay R27. The resulting energization of the escape magnet 104 will, as before, result in energization of relay R22, which in turn brings about an operation of the punch clutch.

In the first case (skipping without the X punching) this is an idle operation while in the second (skipping with the X punching) it causes actuation of the selected 11 punch to perforate the skip designation in column 12 of the card as in Fig. 42, after the card has been escaped to present this column to the punches. It will be noted that the 11 or skip hole in the record card is accompanied by the printing of a dash (—) in the upper margin of the card. Relay R27 closes a pair of b contacts (Fig. 39c) to provide a holding circuit through the second or H winding of the relay, which is traceable from line 403, b contacts of relay R3 (closed) (Fig. 39b), wire 447 (Fig. 39c), e contacts of relay R22, b contacts of relay R27, the hold winding H of relay R27 to line 402. The relay also closes a pair of a contacts to provide a further holding circuit from line 403, contacts P2, a contacts of relay R27 and the holding winding to line 402. Relay R27 is thus held energized until relay R22 has been energized following an escapement, and contacts P2 open during a punch and print cycle.

During the punch cycle, cam contacts P4 (Fig. 39b) close (see Fig. 43) in the early part thereof (after the card has advanced a column to present column 13 to the program star wheels which sense the 11 hole), and a circuit is thereupon completed from line 403, b contacts of relay R3, wire 447 (Fig. 39c), back space switch 117, d contacts of relay R23, wire 410 (Fig. 39b), 11 contacts 246 (closed by the star wheel), a pair of a contacts of relay R33, the *b* contacts of relay R26, *d* contacts of relay R27 (now closed), contacts P4 to the grid of tube T5 to energize relay R24 which, as before, will shift its *d* contacts so that for the series of holes in the 11 position (which will maintain the 11 contacts 246 continuously closed), the circuit through the escape magnet 104 will be maintained for so-called fast skip operation and until the 11 contacts open, so that the machine comes to rest with column 16 of the detail card in punching position and column 17 of the program card 444 in reading position.

*Duplicating circuits.*—The next field of the card comprising columns 17 to 22 is to be duplicated from similar perforations in the corresponding field of the preceding card.

For the purposes of explanation, it will be assumed that there is a preceding card at the reading station traversing the reading pins 212, so that with the cards in the position stated the preceding card has its column 17 in reading position. The program card will have the zero position in each column of this field perforated as shown in Fig. 41. The reading pins are, of course, in inactive position, and in order to take a reading it is necessary to bring about a punch and print cycle of operations, since as explained in the mechanical description the reading pins are elevated through operation of the punch and print shaft 196 of Fig. 8.

With the first zero hole in the program card in sensing position, the zero star wheel contacts 246 (Fig. 39c) are closed, completing a circuit from line 403, *b* contacts of relay R3 (Fig. 39b), wire 447, back space switch contacts 117, *d* contacts of relay R23, wire 410, zero contacts 246, *a* contacts of relay R33, switch 413, grid of tube T14, which will thereby become conductive and energize relay R26. This relay closes its *a* contacts to provide a holding circuit from line 403, through *b* contacts of relay R3 (Fig. 39b), wire 447 (Fig. 39c), wire 450, *d* contacts of relay R22, *a* contacts of relay R26 to the grid of tube T6, whose plate circuit is in parallel with that of tube T14. Relay R26 closes its *d* contacts to complete a circuit from line 403, contacts P2, *d* contacts of relay R25, *d* contacts of relay R26, *b* contacts of relay R22 and relay R2 to line. This relay in turn closes its *a* contacts to complete a circuit from line 403, *b* contacts of relay R3 (Fig. 39b), wire 447 (Fig. 39c), wire 450, *a* contacts of relay R2 now closed, to the grid of tube T7 to fire this tube and cause energization of punch clutch magnet 204, thus bringing about operation of the punches 182 and also of the reading pins 212, which will sense the column 17 of the preceding card (in which there is presumed to be a perforation in the 2 position).

Relay R2 also closes its *b* contacts so that during the punch cycle, when contacts P3 close, a circuit is completed from line 403, through contacts P3, *b* contacts of relay R2 and P winding of relay R25 to line 402. Relay R25 closes its *a* contacts, setting up a holding circuit in parallel with relay R26, and they remain held together through the plate circuit of tube T6.

Relay R25 closes its *e* contacts (Fig. 39a), so that the closure of the 2 pin contacts 223 will complete a circuit when contacts P6 close, which is traceable from line 403, through contacts P6, *e* contacts of relay R25, *c* contacts of a relay R9, wire 414, 2 contacts 223, a pair of *a* contacts of relay R32, to the 2 interposer magnet 188, and relay R31 to line 402. As a result, the punch interposer bail contacts 194, 195 (Fig. 39b) close and complete a circuit to the escape magnet 104 as already traced, which results in advance of the detail card to present its column 17 to the punches and subsequent operation of the punches and print wires to perforate and print the 2 in such column.

Concurrently with such punching, column 18 in the preceding card is sensed by the reading pins and, with a 3 punched in such column the 3 interposer magnet 188 is now energized so that the escape and following punch and print operations are repeated to bring column 18 of the detail card to the punches and perforate a 3 therein. In successive order thereafter, columns 19, 20, 21 and 22 are also punched and printed.

The succession of zero holes in program card 444 will keep the zero contact 246 (Fig. 39c) continuously closed, so that relays R26 and R25 will remain energized for the extent of this automatically duplicated field. The relay R25 opens its *d* contacts to deenergize relay R2. The printing in the upper margin, of course, is effected as an accompaniment to the punching in the perforating positions.

Ultimately, the cards come to rest with column 23 of the program card in reading position, and the field of the detail card comprising columns 23 to 33 is to be key punched or duplicated. The program card in this field is provided with 11 holes in all columns except the first, so that under control of these holes the skip key 329 is operated in the first column, the field will be skipped in the same manner and through the same circuits as explained for the field comprising columns 12 to 16.

*Alphabetic punching.*—The program card 444 has also the 1 position perforated in all columns, and as seen in the circuit with the 1 contacts 246 closed there is a circuit from line 403 (Fig. 39b) to the *b* contacts of relay R3 (closed), wire 447 (Fig. 39c), switch 117, *d* contacts of relay R23, wire 410, 1 contacts 246, *a* contacts of relay R33, the numeric key contacts 372 (normally closed), to the grid of tube T8 whose plate circuit includes the relay R4. This relay shifts its *c* contacts in Fig. 39a so that the slide contacts are disconnected from the circuit and the bail contacts 381 are rendered effective. In other words, the alphabetic keys are effective and the digit set of keys is rendered ineffective for this field. If the field is skipped, then, of course, the 1 holes have no effect since no punching is to take place.

Relay R4 shifts its *d* contacts (Fig. 39a) so that any circuit through the 11 interposer magnet 188 will not extend through the skip relay R27, for the reason that in alphabetic combinations the 11 interposer may be energized in combination with some other magnet to represent an alphabetic character, and therefore the skip function is disconnected.

*Alphabetic duplication.*—If it is again presupposed that there is a preceding card with perforations in the field (column 23 to 33), it is first necessary to effect a space operation to bring column 23 into punching position. This is effected by operating the duplicating key 331 to close contacts 375 (Fig. 39c) so that a circuit is completed from line 403, *b* contacts of relay R3 (Fig. 39b), wire 447 (Fig. 39c), duplicating key contacts 375, contacts CF1, *b* contacts of relay R25, *c* contacts of relay R27, *b* contacts of relay R24 to the grid of tube T6, resulting in energization of relay R26 and its holding through maintenance of the grid circuit of the tube T6 through the *a* contacts of relay R26 and the *d* contacts of relay R22. As before, relay R26 closes its d contacts to energize relay R2 which in turn closes its a contacts to render tube T7 conductive to energize the punch clutch magnet 204.

Since in this field there is a succession of 11 holes, the 11 program contacts 246 close to complete the circuit to the grid of tube T6 to hold relay R26 energized through the circuit from wire 410 (Fig. 39b), a contacts of relay R33, b contacts of relay R26 (shifted), wire 451 (Fig. 39c), c contacts of relay R27, b contacts of relay R24 to the grid of tube T6.

During the ensuing operation, the sensing pins are elevated to read column 23 of the preceding card in which, in the example shown, perforations are made in the 12 and 4 positions representing the letter D. With relays R2 and R25 energized as before, the sensing circuit extends from line 403, contacts P6 (Fig. 39a), e contacts of relay R25, c contacts of relay R9, wire 414, the 12 and 4 contacts 223, a contacts of relay R32, to the 12 and 4 interposer magnets 188 and thence to line 402 as already traced. These magnets 188 will close the interposer bail contacts 194, 195 to effect an escapement and a succeeding punch operation, during which latter the next column in the preceding card is sensed to effect a new setting of the punching interposers.

During the above punching of the letter D, relay R22 is energized but the breaking of the hold circuit for relay R26 through opening of the d contacts of relay R22 is delayed by the condenser 453 shunting these contacts sufficiently to permit the 11 hole in program card 444 to set up the new hold circuit for relay R26 through the 11 contacts 246. Relay R25 is energized through the b contacts of relay R2 when contacts P3 close and in turn through their a contacts connect relay R25 for holding in parallel with relay R26 for the duration of the succession of 11 holes.

In an alphabetic punching field, all the columns thereof do not necessarily contain perforations, so that there may be one or more blank columns within the field, over which it is necessary to space. For this reason, the pair of a contacts of relay R4 (Fig. 39b) are provided in series with a pair of c contacts of relay R25 which together short circuit the interposer bail contacts 194, 195. As long as there are successive perforations in the 1 position of the program card, the 1 contacts are maintained in closed position and tube T8 is maintained in conductive condition to hold relay R4 energized. The relay R25 is held energized with relay R26 as stated, so that the a contacts of relay R4 and the c contacts of relay R25 short circuit the punch interposer contacts and bring about a repetition of escape and punch operations across this field. Thus, when a blank column of the preceding card is in reading position, the escapement circuit will be completed from line 403, b contacts of relay R3 (shifted), a contacts of relay R4, c contacts of relay R25, d contacts of relay R24, rectifier 409, c contacts of relays R23 and R22 to the grid of tube T4 to energize magnet 104.

It is to be noted that, when column 23 of the program card 444 is in reading position, operation of skip key 329 will cause skipping of the field as explained. However, operation of the skip-dash key 330 will not effect skipping because the 1 hole in column 23 will have effected energization of the relay R4, shifting its d contacts (Fig. 39a) so that contacts 420 closed by key 330 energized only the 11 interposer magnet 188. As a result, the 11 hole is punched and a dash is printed in this column of the detail card.

*Zero print elimination.*—Ultimately, the first column of the next field, namely, column 34 of the program card, reaches the sensing position. The next field comprising columns 34 to 41 is to be key punched with a numerical value (00012305 for example) and with the printing of zeros to the left of the first significant digit eliminated. For this condition the program card is perforated in the 2 position in each column except the first. The operation may best be explained by following the example illustrated where the number 00012305 is to be punched. The operator will first press the zero key to close the zero contacts 370 and also the 14 bail contacts 381 (Fig. 39a), completing the circuit from line 403, c contacts of relay R3 (Fig. 39b), wire 445 (Fig. 39a), contacts 356, wire 411, the 14 bail contacts 381 which are closed as a result of the key operation and zero interposer magnet 188. This will result in the closure of interposer bail contacts 194 and 195 (Fig. 39b) and the initial escapement to be followed by the punching operation.

During the escapement and before actual punching is effected, column 35 of the program card 444 arrives in reading position and the circuit is immediately completed through the hole in the 2 position, which is traceable from line 403, b contacts of relay R3 (Fig. 39b), wire 447 (Fig. 39c), back space switch 117, d contacts of relay R23, wire 410, the 2 contacts 246, a contacts of relay R33 to the grid of tube T11, which is thereby rendered conductive to energize relay R7. This relay closes its a contacts, completing a circuit from line 403, contacts P2, a contacts of relay R7, a contacts of relay R31 to the grid of tube T10, which is rendered conductive to energize the print suppress magnet 315 which, as previously explained, disconnects the print mechanism from the punch operating devices so that printing does not accompany punching. The next column 35 is also to receive a zero punching, and the same sequence of events is followed with the print suppress magnet 315 energized a second and again a third time for the example chosen.

For punching in column 37, the operator depresses the 1 key which completes a circuit through the 1 contacts 369 (Fig. 39a) and the 1 interposer magnet 188, through now familiar circuits, with the circuit extending through relay R31 causing it to shift its a contacts (Fig. 39c) so that the circuit through the a contacts of relay R7 does not extend to the grid of tube T10 but is diverted through the shifted a contact of relay R31 to the grid of tube T12, whose plate circuit will energize the holding winding of relay R31 with the b contacts of the relay maintaining the tube T12 conductive through the circuit from line 403, through b contacts of relay R3, to wire 447, f contacts of relay R22, b contacts of relay R31 to the grid of the tube T12, thus short circuiting its biasing resistor 407 until relay R22 opens.

Accordingly, tube T10 is not conductive for a significant digit punching operation, and the print suppress magnet will not be energized, so that the normal connection is in effect to cause printing to accompany the punching. This condition will be maintained to the end of the field as long as there are perforations in the 2 position in the program card and will also hold through any subsequent zero punching as in the example. With relay R31 energized, there is a holding circuit extending from line 403 to the b contacts of relay 3 and wire 447 (Fig. 39c), back space switch 117, d contacts of relay R23, the 2 program contacts 246, a contacts of relay R31 (shifted) to the grid of tube T12, thus holding relay R31 energized as long as the 2 program contacts remain closed.

*Print suppression.*—The next following field, columns 42 to 47, is to be punched with complete elimination of printing. In such case, the 3 positions in all columns of the program card are punched as shown. The star wheel of the program drum for sensing the 3 positions is carried by a lever 242 (see Figs. 25 and 26) this is slightly longer than the levers in other positions, so that this 3 wheel senses each card column one step later than its companion wheels. Thus, the 3 position of column 42 of card 444 is read while the other positions in column 43 are being read. The timing is such, however, that this late reading of column 43 occurs prior to the actual punching operation in column 42 of the detail card, and the sensing is in time to suppress printing, if there is a perforation present. The circuit extends from line 403, b contacts of relay R3, wire 447 (Fig. 39c), contacts 117, d contacts of relay R23, wire 410, the 3 program contacts 246, a pair of a contacts of relay R33 to the grid of tube T9, whose plate circuit is in parallel with that of tube T10 and will energize the print suppress magnet to suppress printing in column 42 of the detail card.

With a succession of perforations in the 3 position, this program contact will remain closed to hold the print suppress magnet 315 energized across this field. The punching operations will, of course, take place in the manner already explained.

*Alternate program selection.*—The program card (Fig. 41) is divided into two sections, an upper and a lower, so that there are six perforating positions in each section, in each of which a different programming arrangement may be set up. The positions are paired, for example, perforations in the 4 positions will bring about the same operation as perforations in the 12 positions; perforations in the 5 positions will bring about the same operation as perforations in the 11 positions and so on. The different functions are indicated in Fig. 41. Normally, for the detail card passing the punching station the upper field is effective. For certain cards it may be desirable to have the lower section effective, and where this is the case a key designated alternate program key 326 is operated to close its contacts 454 (Fig. 39a) and will complete a circuit from the wire 411 to energize relay R10 which will close its a contacts to provide a holding circuit through a second winding H which extends from line 402, through the H winding of relay R10, its a contacts, wire 455 (Fig. 17b), the program drum contacts PR3 to line 403. This key is operated generally at the commencement of perforating operations for the card, and the circuit will accordingly be maintained through the program drum contacts PR3 throughout the movement of this card past the punching position. Relay R33 is wired in parallel with the H winding of relay R10 and shifts a set of contacts generally designated a in Figs. 39b and 39c, so that the 4, 5, 6, 7, 8 and 9 program contacts 246 will parallel the 12, 11, 0, 1, 2 and 3 contacts, respectively, while the latter are effectively disconnected.

*Auxiliary duplicating drum.*—As explained, the auxiliary drum 230a of Fig. 23 may have a perforated card wrapped thereon, with data in certain columns or fields. Where it is desired to have the punching controlled by a field of such card, the corresponding field of the program card 444 is punched in the 11 position in all but the first column and is punched in the 3 position in all columns as, for example, in the field comprising columns 48 to 53 (Fig. 41).

When column 48 of the card 444 is in reading position, the key 332 is operated to close contacts 374 (Fig. 39a) completing a circuit from wire 411, contacts 374, and windings of relays R9 and R20 in parallel. Relay R9 closes its a contacts to energize relay R32 through the c contacts of relay R3.

Relay R32 shifts its a contacts to connect the auxiliary drum, star wheel contacts 246a (Fig. 39a) to the interposer magnets 188, so that as these contacts close in response to holes in the card on drum 230a, the magnets 188 will be energized accordingly. The 11 holes in the program card 444 will fire tube T6 to hold relays R26 and R25 energized as before, and the 3 holes will cause print suppression as has already been explained for the field of columns 23 to 33.

*Automatic skip and duplicate switches.*—The switches 413 (Fig. 39c) and 448 (Fig. 39b) are mechanically connected to operate together and, if they are opened before a field of the program card containing 12's or 0's is reached, the automatic skipping and automatic duplicating operations will not take place and the operator may manually punch selected data in these fields.

Such automatic fields of the program card 44 are generally punched with the manual field designations in the 11 position as shown in Fig. 41 for the field of columns 54 to 58, so that when, for example, column 48 reaches the reading position the operator has the option of X-skipping or non-X-skipping the field, or he may key punch or initiate duplicating through key 331 (if the field is set for automatic skipping).

*Multiple punching in a column.*—In certain numeric columns of the detail card, it may be desired to punch an extra hole to indicate by a special hole that the field is a credit or debit field or the like. To do this, the space bar is first operated to close contacts 371 and 371a (Fig. 39b), of which 371 are closed by a slide and 371a are closed by direct action of the space key. The contacts 371 will shunt the interposer contacts 194, 195 and cause an escapement without punching in the now familiar manner, during which the keyboard restore magnet effects opening of the slide contacts 371. The space key is held depressed so that contacts 371a remain closed and the digit keys operated in succession, while the space key is held down. During the initial escapement, contacts 107 close firing tube T2, thus completing a circuit from line 403, b contacts of relay R3, contacts 371, 107, f contacts of relay R26, contacts 371a to grid of tube T2, resulting in energization of relay R23 which closes its a contacts to hold from line 403, b contacts of relay R3, a contacts of relay R23, f contacts of relay R26 and space key contacts 371a, as long as the latter are held closed.

Upon operation of a digit key, a punch will be selected as before, but the escapement circuit will be incomplete because the c contacts of relay R23 are now shifted to energize only relay R22 for bringing about an operation of the punch clutch when interposer contacts 194, 195 close. The selected punches will thus be operated in succession without accompanying escapement, and upon release of the space key relay R23 will become deenergized.

Where the extra punching is to be in the last or 80th column of the card, a pair of *b* contacts of relay R23 are opened, to prevent program drum contacts PR2 (which close when column 80 of the detail card moves into punching position) from completing the circuit to tube T5 and relay R24.

*Last column punching.*—Assuming that the detail card has now been advanced by space key, digit key or automatically to its last column punching position, i. e. with column 79 at the line of punches, a punch operation will, as before, effect the initial spacing and then punch column 80. During their spacing, the program drum contacts PR2 (Fig. 39b) close to fire tube T5 through the *b* contacts of relay R23, which energizes relay R24. This relay will shift its *d* and *a* contacts, setting up a circuit completed when relay R22 is deenergized and punch shaft contacts P1 have reclosed upon completion of punching in column 80, traceable from line 403, contacts PR2, *b* contacts of relay R23, *a* contacts of relay R24 (closed), *d* contacts of relay R24 (closed), rectifier 409, *c* contacts of relay R23, *c* contacts of relay R22, and tube T4 to energize escape magnet 104, which will be held until the program drum contacts PR2 reopen just prior to the column 1 sensing position of the program drum to latch the drum in such position.

At such time the detail card will have been advanced out of its feed wheel and a preceding card will also have been similarly advanced.

*Automatic feed circuits.*—The first detail card is now fully punched and, if the auto feed switch 456 (Fig. 39b) is in closed position, contacts PR3 which shift after about a two column advance beyond the 80th column will complete the circuit traceable from line 403, upper contacts PR3, switch 456, and card feed clutch magnet 28 to line 402. As a result, the detail card is fed to bring its column 1 to the reading line and a new card is advanced to the E position beneath the punches, while any preceding card is fed to the stacker and a card is also advanced from the supply hopper to the A position.

*Release key circuits.*—When it is desired to feed out a card from any position, release key 328 is operated to close a pair of slide contacts 457 (Fig. 39b), which will energize relay R1 through its P winding, closing its *a* contacts to set up a holding circuit through the lower PR3 contacts to thereby hold until the card is fed beyond its 80th column punching position.

Relay R1 closes its *b* contacts to complete a circuit directly to the keyboard restore magnet 352 to reopen contacts 457. It also closes its *c* contacts completing a circuit from line 403, *c* contacts of relay R1 (closed), *c* contacts of relay R3 (shifted), program handle contacts 398 (upper), *c* contacts of relay R24, *c* contacts of relay R26, *d* contacts of relay R24, rectifier 409, *c* contacts of relay R23, *c* contacts of relay R22 to tube T4, and thus energizing the escape magnet 104. This is followed as before by energization of relay R22 and the punch clutch magnet 204. As long as the *c* contacts of relay R1 remain closed, this sequence of escape and punch will be repeated to step the card past the punching line to beyond its 80th column position.

If the program handle contacts 398 are in shifted position, the release is a so-called fast skip with the circuit extending from line 403, *c* contacts of relay R1, *c* contacts of relay R3 (shifted), contacts 398 (shifted), *c* contacts of relay R23, *c* contacts of relay R22 to tube T4 and escape magnet 104. This circuit holds the magnet 104 continuously energized until relay R1 is deenergized.

If there is a program card on the drum and containing perforations calling for manual field control (i. e., a series of 11 holes) in columns not yet passed, the release key operation will cause repeated stepping of the card until the first column of the manual field is reached, whereupon the circuit to relay R24 is completed through the 11 contacts 246 (Fig. 17b), *a* contacts of relay R33, *b* contacts of relay R26, a pair of *d* contacts of relay R1 (closed) to tube T5 to energize relay R24 which completes the circuit to tube T4 and the escape magnet 104 which will be held as long as the series of 11 holes extends. This circuit completion causes a higher speed of the column to column advancement.

If the program card calls for automatic duplication (a series of zero holes), the step-by-step release extends to the first auto duplicate field, when the zero contacts 246 take over to energize relay R26 (Fig. 39c) through tube T14. Relay R26 opens its *c* contacts (Fig. 39b) to disable the stepping circuit through the *c* contacts of relay R1. It also brings about automatic duplicating under control of a preceding card, as explained under the heading "Duplicating circuits" hereinabove, for the extent of the series of zero holes, after which relay R26 is deenergized and step-by-step advance resumes.

From the foregoing, it is seen that when the release key is operated, which may occur with any column of the card in punching position, a so-called step-by-step or slow skip is initiated, and if during such advance auto skipped fields occur such will be traversed by a fast skip; if auto duplicate fields occur, such duplication will occur.

When the detail card is escaped out of its 80th column position, contacts PR2 (Fig. 39b) close to effect energization of relay R24, which opens its *c* contacts to interrupt the slow skip and initiate a fast skip to bring the program drum up to its column 1 position in readiness for operations on the next following card.

At this point, the detail card is located between the reading and punching lines and is free of restraint so that, if desired, it may be manually removed. The card may also be advanced from this position past the reading line by rocking the release plate which, as explained in the mechanical description, will feed the card by means of the continuously running slip rollers to a position beneath the preceding card that may be in position in front of the stacker drum. Upon the next card feed cycle, therefore, both these cards will be pushed toward the drum and concurrently swinging into the hopper.

*Register key circuits.*—If the auto feed switch 456 opens, the machine will come to rest after a detail card has passed the punches into its freed position, from which it can be removed as stated. At such time, a following card is in the H position ready to be fed to the punching line. If the register key 327 is now operated to close its slide contacts 360 (Fig. 39b), a circuit is completed from line 403, *c* contacts of relay R3 (in normal position, since contacts CF4 are open and the holding circuit has been opened by contacts PR3), contacts 360 and card feed latch magnet 46 to line 402. The magnet 46 is held through its contacts 47 and CF3 (see Fig. 43) and through contacts 48 the card feed clutch magnet 28 is energized to effect a card feed cycle, during which the card in the H position is advanced to the line of punches, but no card is fed from hopper 10. The operator may then insert a card manually into the H position to be advanced to the punching line during the next card feed cycle. This is usually done where the inserted card may have been missing from the file.

*Offset stacker circuits.*—When a card is to be offset in the stacker, the offset stacker key is operated to close slide contacts 458 (Fig. 39b) and this will complete a circuit to energize magnet 160, which closes its contacts 162 to hold through contacts CF3, which open near the middle of the following card feed cycle, so that the card passing the reading line is offset.

Also, when the alternate program key is operated and relay R10 energized and held as explained, a pair of b contacts of this relay (Fig. 39b) energize magnet 160, so that the card passing the reading line with the lower half of the program card in control will be offset when it has been fully advanced.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a perforating machine, a record supply hopper, an intermediate station, code punching means at a punching station, means for advancing a record from said hopper along a predetermined path to said intermediate station, said intermediate station and said punching station being in respective sequence along a second path at right angles to said first-named path, means for advancing the record from said intermediate station to said punching station along said second named path, and means for coordinating said advancing means so that while the first record is advanced to and past the punching station a second record is advanced from the hopper to said intermediate station.

2. The invention set forth in claim 1 in which the two stations are relatively located so that upon completion of the operation of said advancing means a record in the punching station partly overlaps a record in the intermediate station.

3. The invention set forth in claim 2 in which means is provided for advancing the record in the punching station step by step, and means for engaging the overlapped record in the intermediate station to hold it against advance with the other record.

4. The invention set forth in claim 2 in which means is provided for advancing the record in the punching station step by step, and means for frictionally engaging the overlapped record in the intermediate station to hold it against advance with the other record.

5. In a perforating machine for step-by-step code punching of a rectangular record in columns along the width of the record, a line of punches, an actuator, an interposer for each punch with means for coupling the same to the actuator, an armature normally holding the interposer out of coupling with the actuator, a magnet for actuating said armature, means to energize the magnet, energization of the magnet freeing the coupling means on the interposer for coupling to the actuator, means directly controlled by any interposer, when freed, for causing a single operation of the actuator whereby the related punch will be operated through its coupled interposer, means to deenergize the magnet, said armature acting upon deenergization of the magnet and actuation of a restoring means to engage and release the interposer from the actuator at the completion of the single operation of the actuator.

6. In a perforating machine for step-by-step code punching of a rectangular record in columns along the width of the record, a line of punches, an actuator, an interposer for each punch with means for coupling the same to the actuator, an armature normally holding the interposer out of coupling with the actuator, a magnet for actuating said armature, means to energize the magnet, energization of the magnet freeing the coupling on the interposer for coupling to the actuator, means directly controlled by any interposer, when freed, for causing a single operation of the actuator whereby the related punch will be operated through its coupled interposer, said armature acting upon deenergization of the magnet and actuation of the restoring means to engage and release the interposer from the actuator at the completion of the single operation of the actuator, and said magnet means energizing timed for maintaining said magnet energized whereby the interposer will remain coupled to the actuator and will effect repeated operation thereof to cause repeated punching.

7. In a perforating machine for code punching of a record while the record is motionless in a punching station, a punch, an actuator therefor, a power source, means including a one-revolution clutch for connecting the actuator to the power source to effect a single operation of the actuator, means for coupling the punch to the actuator for operation therewith, means directly controlled by said coupling means for rendering said connecting means effective, means for disconnecting the punch and actuator at the end of the single operation thereof, and automatically selectively operable means for rendering said disconnecting magnetic means ineffective thereby the punch and actuator will remain coupled and the coupling means will render said connecting means effective for a repeat operation.

8. In a perforating machine, a line of punches, means for advancing a record having columns of punching positions past said line of punches, escapement mechanism for controlling said advancing means to effect column-by-column advance of the record, punch selecting means, punch actuating mechanism, and selecting means which effects an operation of said escapement mechanism for each column to present a column of the card to the line of punches and of said actuating mechanism to effect punching in said presented column in that successive order, whereby a column of the record will be advanced to the punches prior to actuation of a selected punch to effect punching in such column.

9. In a machine of the class described, recording mechanism, means for advancing a record having columns of punching stations past said mechanism, escapement mechanism for controlling said advancing means to effect column-by-column advance of the record, selecting means for the recording mechanism, actuating means for the recording mechanism, and means controlled by said selecting means for effecting an operation of said escapement mechanism for each column to present a column of the card to the line of punches and of said actuating mechanism to effect punching in said presented column in that successive order, whereby a column of the record will be advanced to the punches prior to actuation of the recording mechanism to effect punching in such column.

10. The invention set forth in claim 9, in which control means is provided for said selecting means, comprising devices for repeatedly operating said selecting means and for initiating operation of the selecting means during the operation of the actuating means which was in response to the immediately preceding operation of the selecting means.

11. In a perforating machine a line of punches, a line of sensing elements, means for advancing two records, one past each of said lines, said records having columns of designation receiving positions thereon, escapement mechanism for controlling said advancing means to effect column-by-column advance of the records, and means controlled by said sensing elements upon sensing a designation in any column of one of the records for effecting an operation of said escapement mechanism and of said punches in that successive order to advance the cards one column and punch in the next following column of the record passing the line of punches.

12. In a perforating machine, a punching station, a sensing station, means for advancing each of a single group of record cards past said stations in succession, said cards having columns of punching positions and said advancing means moving the cards column by column, so that as any column of a card is at the sensing station the corresponding column of the succeeding card is spaced from the punching station, control devices for said advancing means, recording devices at said punching station, card reading devices at said sensing station, means controlled by said reading devices responsive to designations in the card column thereat for causing said control devices to effect an advance of the cards to bring the corresponding column of the succeeding card to said punching station, and for causing the recording devices thereat to record therein in response to the designations sensed.

13. The invention set forth in claim 12 in which the control devices cause concurrent advance of cards past both stations, so that the next column is at the sensing station when the column of the following card is at the punching station, said reading and recording devices being coordinated so that designations in said next column are read concurrently with the recording in the following card, of data sensed in the preceding column of the sensed card.

14. In a record perforating machine, a set of punches, means for advancing a card past said punches, step by step escapement mechanism therefor, settable punch selecting devices, means for effecting a setting of said selecting devices, means controlled thereby to effect in succession an operation of said escapement mechanism to cause a step of advance of the card, and an operation of the punches in accordance with the setting of said selecting devices, means for restoring said selecting devices, and means for effecting a further setting of said selecting devices during the operation of the punches, said further setting being effective upon completion of said first punching operation to cause a second operation of the escapement mechanism and a second operation of the punches in accordance with the said further setting of said selecting devices.

15. In a recording machine, a set of recording elements, means for advancing a record past said punches, step by step escapement mechanism therefor, settable selecting devices, means for effecting a setting of said selecting devices, means controlled thereby to effect in succession an operation of said escapement mechanism to cause a step of advance of the record, and an operation of the recording elements in accordance with the setting of said selecting devices, means for restoring said selecting devices, and means for effecting a further setting of said selecting devices during the operation of the recording elements, said further setting being effective upon completion of said first recording operation to cause a second operation of the escapement mechanism and a second operation of the recording elements in accordance with the said further setting of said selecting devices.

16. In a machine of the class described, recording mechanism, means for advancing a record card column by column to present the columns in succession to said recording mechanism, a plurality of recording elements selectively operable to record numeric data or alphabetic data in the columns as they are presented, a set of keys, devices controlled by the keys for causing the recording mechanism to record numeric data, further devices controlled by the keys for causing the recording mechanism to record alphabetic data, and means controlled by said record card advancing means for rendering either of said devices selectively effective in predetermined card columns, whereby operation of a certain key in a certain column will effect recording of either a numeric or an alphabetic designation.

17. In a punching machine, punching mechanism, means for advancing a record card column by column to present the columns in succession to said mechanism, a plurality of punches operable singly or in combination to perforate numeric or alphabetic data in the column as they are presented, a set of alphabetic keys, a set of numeric keys, each set being effective to operate the said punches, and means controlled by said record card advancing means for selectively rendering either of said set of keys effective in predetermined columns.

ELLIOTT W. GARDINOR.
ARNOLD B. CROWELL.

References Cited in the file of this patent
UNITED STATES PATENTS

| Number | Name | Date |
|---|---|---|
| Re. 21,133 | Lake | June 27, 1939 |
| 1,327,546 | Glass | Jan. 6, 1920 |
| 1,761,682 | Reynolds | June 3, 1930 |
| 1,976,618 | Lee and Daly | Oct. 9, 1934 |
| 1,994,012 | Broadmeyer | Mar. 12, 1935 |
| 2,030,405 | Schaaff | Feb. 11, 1936 |
| 2,045,434 | Bryce | June 23, 1936 |
| 2,046,082 | Mills | June 30, 1936 |
| 2,048,396 | Lasker | July 21, 1936 |

(Other references on following page)

UNITED STATES PATENTS

| Number | Name | Date |
|---|---|---|
| 2,064,340 | Davis | Dec. 15, 1936 |
| 2,067,505 | Sieger | Jan. 12, 1937 |
| 2,165,161 | Spiess | July 4, 1939 |
| 2,199,541 | Harrison | May 7, 1940 |
| 2,217,209 | Von Pein | Oct. 8, 1940 |
| 2,335,949 | Lewis | Dec. 7, 1943 |
| 2,346,263 | Lewis | Apr. 11, 1944 |
| 2,346,268 | Mills | Apr. 11, 1944 |
| 2,372,909 | Page | Apr. 3, 1945 |
| 2,394,604 | Ford | Feb. 12, 1946 |
| 2,398,014 | Lake | Apr. 9, 1946 |
| 2,451,752 | Lake | Oct. 19, 1948 |
| 2,540,029 | Hamilton | Jan. 30, 1951 |
| 2,547,445 | Daly | Apr. 3, 1951 |

FOREIGN PATENTS

| Number | Country | Date |
|---|---|---|
| 29,389 | Great Britain | July 21, 1913 |